United States Patent
Nakatani et al.

(10) Patent No.: US 6,388,416 B1
(45) Date of Patent: May 14, 2002

(54) MOTOR CONTROL DEVICE AND MOTOR CONTROL METHOD

(75) Inventors: Masaji Nakatani, Nara; Hideshi Ohtsuka, Tenri, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/632,656

(22) Filed: Aug. 4, 2000

(30) Foreign Application Priority Data

| Aug. 5, 1999 | (JP) | 11-222155 |
| Aug. 5, 1999 | (JP) | 11-222284 |
| Aug. 5, 1999 | (JP) | 11-222285 |
| Feb. 22, 2000 | (JP) | 2000-044279 |

(51) Int. Cl.⁷ ............................................... H02P 1/46
(52) U.S. Cl. ............... 318/700; 318/138; 318/254; 318/701; 318/705; 318/721; 318/722; 318/800; 318/802; 318/805; 318/811
(58) Field of Search .................. 318/700, 701, 318/705, 254, 802, 805, 811, 138, 721, 722, 800

(56) References Cited

U.S. PATENT DOCUMENTS

| 3,997,825 A | * | 12/1976 | Miyashita et al. | 318/171 |
| 4,240,020 A | * | 12/1980 | Okuyama et al. | 318/721 |
| 4,328,454 A | * | 5/1982 | Okuyama et al. | 318/803 |
| 4,743,825 A | * | 5/1988 | Nashiki | 318/723 |
| 5,475,292 A | * | 12/1995 | Nakanishi et al. | 318/705 |
| 5,537,020 A | * | 7/1996 | Couture et al. | 318/720 |
| 5,699,240 A | * | 12/1997 | Obayashi | 363/98 |
| 6,208,109 B1 | * | 3/2001 | Yamai et al. | 318/716 |

FOREIGN PATENT DOCUMENTS

| JP | 61-88784 | 5/1986 | | |
| JP | 5-236789 | 9/1993 | | |
| JP | 05236789 A | * 10/1993 | | H02P/6/02 |
| JP | 7-87783 | 3/1995 | | |
| JP | WO95/27328 | 10/1995 | | |

OTHER PUBLICATIONS

"Rotary Machines Employing Reluctant Torque", by Nobuyuki Matsui et al. T.EEE Japan vol. 114–D, No. 9, 1994, pp. 824–832.

* cited by examiner

*Primary Examiner*—Robert E. Nappi
*Assistant Examiner*—Tyrone Smith
(74) *Attorney, Agent, or Firm*—Dike, Bronstein, Roberts & Cushman IP Group; David G. Conlin; David A. Tucker

(57) ABSTRACT

A motor current detection amplifier detects a motor current's areas in two phase periods with reference to a motor voltage. A controlling microcomputer computed the ratio of the motor current areas of the two phase periods and provides the same as phase difference information which is in turn used to control a motor drive voltage to apply a sine wave of a predetermined period to the motor's coil to allow 180°-driving including a sine wave conduction resistant to noise and achieving a reduced cost hike.

42 Claims, 38 Drawing Sheets

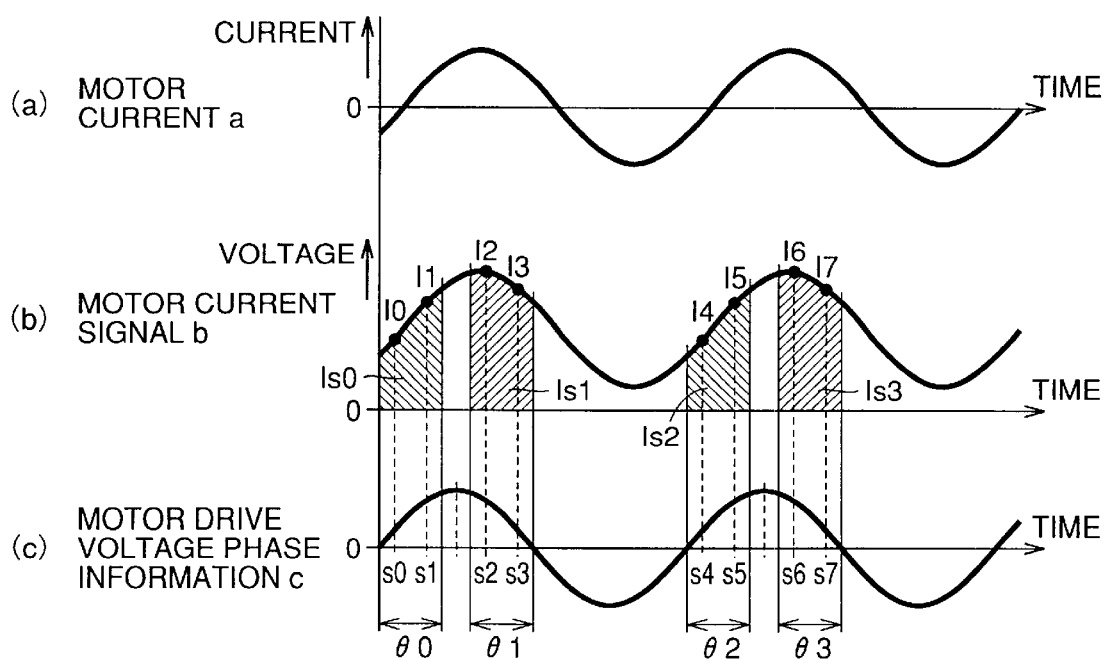

FIG.5A

START OF PHASE DIFFERENCE DETECTION ROUTINE
↓
SP1: SET A TIMING OF SAMPLING OPERATION / SET A VARIABLE
↓
START OF LOOP
↓
SP2: MOTOR CURRENT SAMPLED ?
— N → (to SP10 join)
— Y ↓
SP3: READ CURRENT SAMPLE VALUE → I(n)
↓
SP4: n=n+1
↓
SP5: PHASE PERIOD θ0 ?
— N → SP7: n=4 ?
  — N → (join)
  — Y → SP9: CALCULATE MOTOR CURRENT SIGNAL AREA Is1=I2+I3
— Y ↓
SP6: n=2 ?
— N → (join)
— Y → SP8: CALCULATE MOTOR CURRENT SIGNAL AREA Is0=I0+I1
↓
SP10: MOTOR CURRENT SIGNAL AREA CALCULATED COMPLETELY ?
— Y → SP11: DETECT PHASE DIFFERENCE INFORMATION (Is0/Is1) → END
— N ↓
END OF LOOP

FIG.5B

START OF SAMPLING START ROUTINE (TIMER INTERRUPT ROUTINE)
↓
SP12: SET A TIMING OF A SUBSEQUENT SAMPLING OPERATION
↓
SP13: DIRECT A/D TO START CURRENT-SAMPLING
↓
END

FIG.16

| NAME OF PROCESS | MAIN LOOP | PWM INTERRUPT | TIMER INTERRUPT |
|---|---|---|---|
| INTERRUPT FACTOR | — | PWM CARRIER PERIOD | COMPARE AN INTERRUPT VALUE WITH TIMER TO KNOW WHETHER THEY MATCH |
| MAIN PROCESS CONTENTS | • ACKNOWLEDGE INSTRUCTION STOPPING/ROTATING THE MOTOR<br>• <u>DETECT PHASE DIFFERENCE INFORMATION</u> | • REFER TO SINE WAVE DATA<br>• DETECT REFERENCE PHASE OF MOTOR VOLTAGE PHASE<br>• SET TIMING OF CURRENT-SAMPLING OPERATION (CALCULATE A SAMPLING TIMING)<br>• PERFORM PI OPERATION<br>• SET OUTPUT DUTY | • ISSUE AN INSTRUCTION TO START A/D SAMPLING OPERATION<br>• SET A TIMING OF A SUBSEQUENT CURRENT SAMPLING OPERATION (INTERRUPT VALUE) |

180° SINE-WAVE CONDUCTION WAVEFORM

120° RECTANGLE-WAVE CONDUCTION WAVEFORM

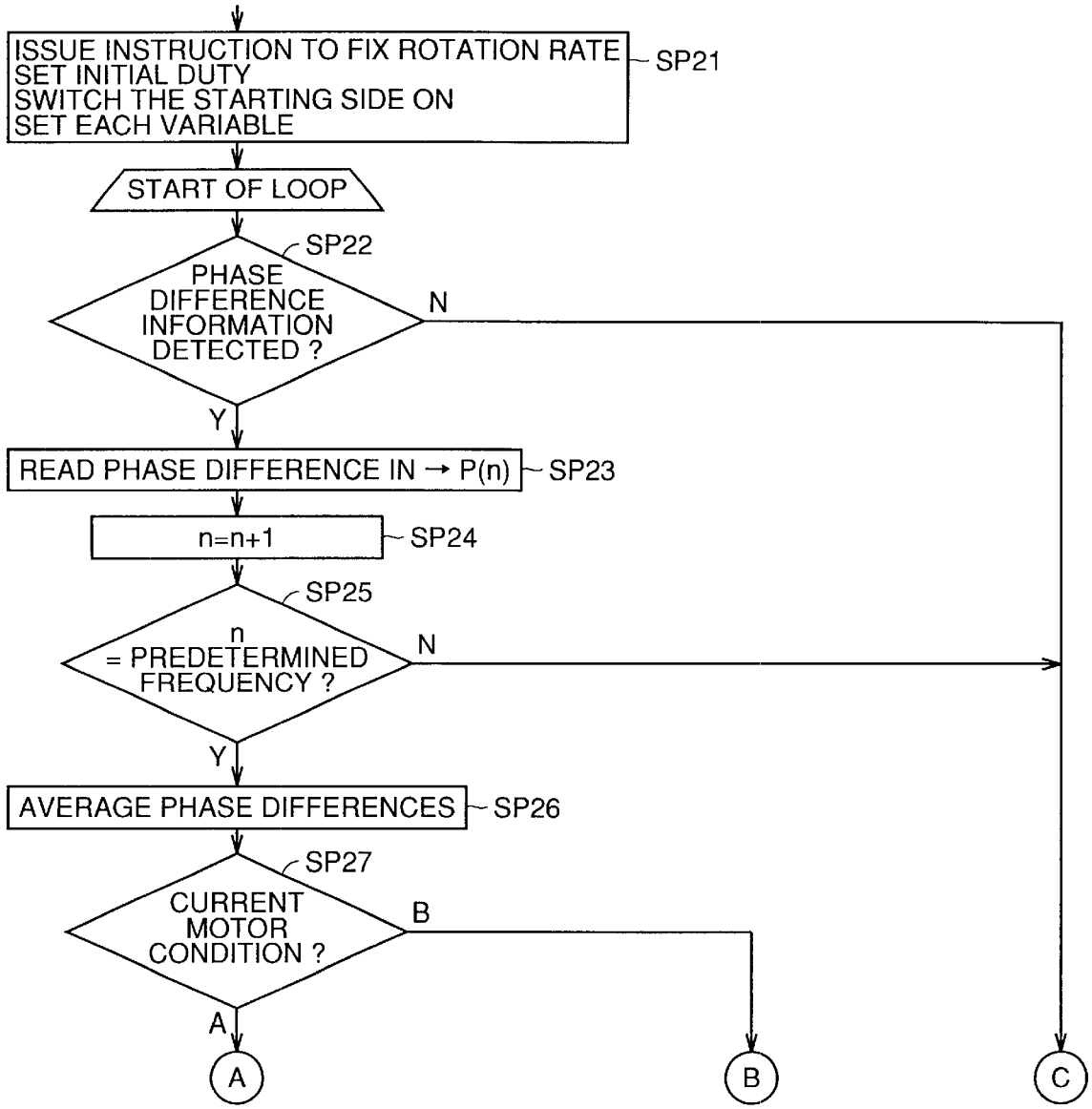

MOTOR CONTROL DEVICE AND MOTOR CONTROL METHOD

BACKGROUND OF THE INVENTION

1. Field of the Invention

The present invention relates generally to motor control devices and motor control methods. More specifically, the present invention relates to motor control devices and motor control methods driving without using a sensor a synchronous motor having a plurality of phase windings and used for example for compressors of air conditioners.

2. Description of the Background Art

In recent years, environmental issues have become social issues and energy-saving has become an important issue. In particular, in the field of motors there is an acute need for a small, high-efficiency, high-output motor to save energy, while there has also been provided a motor distinguished in configuration from conventional motors.

FIG. 45 shows a representative configuration of a conventional motor with a rotor and a stator cut in half and thus shown in a 1/2 model. In FIG. 45, rotor 121 is provided in the form of a column formed of a stacked steel plates. Rotor 121 is provided at an outer circumference thereof with a permanent magnet 122 arranged with its N pole and S pole alternate circumferencially. Permanent magnet 122 has an outer peripheral surface having fixed thereto a non-magnetic SUS tube 123 to prevent the magnet from scattering while it rotates. Stator 125 is provided with a plurality of protruding poles 126 extending radially. Between protruding poles 126 is formed a slot 127 with a coil (not shown) wound therearound.

This motor is a surface permanent magnet (SPM) motor employing a Fleming torque according to Fleming's rules attributed to a magnetic field created by permanent magnet 122 and a coil current (not shown). It is significantly suitable for mass production.

To enhance efficiency, however, an interior permanent magnet (IPM) motor is also noted. This motor has a permanent magnet embedded in its rotor to employ a reluctance torque in addition to a Fleming torque.

FIG. 46 shows an exemplary configuration of an IPM motor. As shown in FIG. 46, the IPM motor includes a rotor 130 with a permanent magnet 132 embedded in a rotor core 131 in the form of a circular column formed of a highly permeable iron core or stacked silicone steel plates. FIG. 46 shows a 4-pole motor, with 4-pole permanent magnet 132 arranged in rotor 130, with their N and S poles alternate circumferencially, although in FIG. 46 the four poles are shown in a 1/2 model. Rotor core 131 is circumferentially provided with a stator 135 having a protruding pole 136.

Such configuration provides a difference between an inductance Ld along an axis d corresponding to a direction extending between the center of permanent magnet 132 and that of rotor 131 and an inductance Lq along an axis q corresponding a direction rotated relative to axis d by an electrical angle of 90°, and in addition to a Fleming torque caused by permanent magnet 132 a reluctance torque is also caused. Such relationship, as described in *Rotary Machines Employing Reluctance Torque*, Nobuyuki Matsui et al, T. EEE Japan Vol.114-D, No.9, 1994, is provided by the following expression (1):

$$T = Pn \times \phi a \times iq + Pn \times 1/2 \times (Ld - Lq) \times id \times iq \qquad (1)$$

wherein

Pn: the number of pole pairs

φa: interlinkage flux

Ld: inductance along axis d

Lq: inductance along axis q id: current along axis d iq: current along axis q

The FIG. 45 SPM motor has a permanent magnet substantially equal in permeability to air. Thus, in expression (1) both inductances Ld and Lq have substantially the same value and in expression (1) at the second item no reluctance torque is caused. In the FIG. 46 IPM motor, however, the inductance along axis d is a direction in which a magnetic flux of the permanent magnet is caused, and the flux along axis d flows through the permanent magnet, which is substantially equal in permeability to air. This would result in an increased magnetic resistance and a reduced inductance Ld along axis d.

In contrast, the inductance along axis q passes through a gap of the permanent magnet, which results in a reduced magnetic resistance and an increased inductance Lq along axis q. Thus, there would be introduced a difference between inductance Ld along axis d and inductance Lq along axis q and passing a current Id along axis d would cause a reluctance torque in expression (1) at the second item.

If the above relationship is seen in terms of flux vector, a Fleming torque Tm is caused by multiplying a magnetic flux φa by a current Iq flowing in a direction electrically orthogonal. Similarly, a reluctance torque Tr is provided by fluxes Ld·Id and Lq·Iq attributed to inductance and current come by electrically orthogonal currents Id and Iq, respectively. These two torques added together correspond to a total torque Tt.

This total torque varies with a current phase β input. Herein current phase β is an representation in electrical angle of a phase of a motor current relative to a positional relationship between the permanent magnet and the coil. If this is considered in expression (1) then an expression (2) is provided:

$$Tt = Pn \times \phi a \times ia \times \cos \beta + Pn \times 1/2 \times (Ld - Lq) \times ia^2 \times \sin 2\beta \qquad (2)$$

wherein,

Pn: the number of pole pairs

φa: interlinkage flux

Ld: inductance along axis d

Lq: inductance along axis q id: current along axis d iq: current along axis q

β: current phase ia: magnitude of current vector

FIG. 47 represents a relationship between Fleming torque Tm and reluctance torque Tr and the summation thereof or total torque Tt with current phase β varied. Herein, when the center of the permanent magnet is located at that of the coil (e.g., that of the coil at a phase windings U, the winding's current phase is 90°. Fleming torque Tm is maximized for a current phase of 90°. As the current phase advances Fleming torque Tm is reduced, and for a current phase of 180° it reaches zero.

In contrast, reluctance torque Tr is maximized for a current phase of 135°. As such, the summation of the both torques or total torque Tt, although varying depending on their respective torque ratios, is maximized for a current phase of approximately 115°, as shown in FIG. 47 by a solid line. As such, if an IPM motor's current is equal to an SPM motor's current, the IPM motor, which effectively uses a reluctance torque, can provide an output with a higher torque than the SPM motor, which only employs a Fleming torque.

The magnitude of a torque is determined depending on various factors, among which is also important is a current drive method.

FIGS. 48A–48D are waveform diagrams showing one example of 120° rectangular-wave drive corresponding to a conventional current drive method. FIGS. 48A, 48B and 48C represent their respective current waveforms of phase windings U, V, W, respectively. As shown in FIGS. 48A–48C, in the current drive method an inverter is controlled to link current conductions of two of three phase windings (U, V, W) for each 120° to provide a direct current. It can be seen that for each phase winding there is provided a pause period, during which an induced voltage caused at a stator coil as a rotor magnet rotates is detected to control the rotor's rotation.

For an IPM motor employing a reluctance torque, as described above, controlling a timing of conduction is an important factor in obtaining a maximized torque, and conventionally a rotor phase can only be detected by a 120° rectangular-wave drive method employing an induced voltage to detect the rotor phase. This method, however, has a pause period for detecting the induced voltage and is thus disadvantageous in terms of motor efficiency, oscillation and noise.

To overcome such disadvantages, a method has been proposed as described in International Publication No. WO95/27328. In this method, a motor has a permanent magnet embedded therein, with a conduction width set to correspond to an electrical angle of 180°, and a magnetic pole is positionally detected depending on a difference between a potential of a first neutral point of the motor's coil and that of a second neutral point attributed to a bridge circuit in electrically parallel with the coil.

FIG. 49 is a block diagram showing a configuration of a brushless DC motor drive control device allowing a 120° conduction. As shown in FIG. 49, between terminals of a direct current power supply 211 three pairs of switching transistors 212$u$, 212$v$, 212$w$ are each connected in series to configure an inverter and a voltage of a point connecting each pair of transistors together is applied to brushless DC motor 213 at the respective one of Y-connected windings 213$u$, 213$v$, 213$w$ of a stator and also at the respective one of Y-connected resistors 214$u$, 214$v$, 214$w$.

Furthermore, stator windings 213$u$, 213$v$, 213$w$ have therebetween a neutral point 213$d$ connected to an interconnection 213$e$, and resistors 214$u$, 214$v$, 214$w$ have therebetween a neutral point 214$d$ connected to interconnection 214$e$. The neutral point 213$d$ voltage is fed via a resistor 215$a$ to an amplifier 215 at an inverted input terminal, and the neutral point 214$d$ voltage is transparently fed to amplifier 215 at a non-inverted input terminal. Between the amplifier 215 output terminal and non-inverted input terminal a resistor 215$b$ is connected to allow amplifier 215 to operate as a differential amplifier.

Herein, the neutral point 213$d$ voltage En0 is a sum of a waveform of an output from the inverter and a 3n-order harmonic component included in a waveform of an induced voltage of the motor, wherein n represents an integer. In contrast, the neutral point 214$d$ voltage only corresponds to the waveform of an output from the inverter. Thus, the 3n-order harmonic component can be extracted by obtaining the difference between the neutral point 213$d$ voltage and the neutral point 214$d$ voltages. As such, a waveform of an induced voltage of the motor or a position of the rotor can be detected without employing a magnetic-pole position sensor.

The above-described conventional example, however, also has a setback as described below: more specifically, a magnet-embedded IPM motor is most efficiently operated with an optimal current condition phase angle advance. In setting such advance, detecting a phase of a rotor relative to a stator is an important factor. Accordingly, International Publication No. WO95/27328 discloses that, with a 180° sine-wave conduction applied, there are provided an interconnection for outputting a neutral-point voltage from a motor coil connection, an interconnection for outputting a neutral-point voltage from a resistor connection 14$u$, 14$v$, 14$w$, and a differential amplifier and other external circuits and additional circuits, to allow the rotor's phase to be detected. However, it requires interconnections, a discriminator and detector circuit, resistors, and other components for detection, which would increase the number of components and the cost thereof. In particular, an interconnection providing neutral point 13$d$ from a motor coil connection is disadvantageous, since it requires that the motor configuration and the terminal configuration be changed and thus not applicable to conventional motors.

The conventional system is also disadvantageous as it is hard to control; with a 180° sine-wave conduction applied, a voltage induced by a magnet and a magnetic flux with a reluctance torque generated would cause a phase difference between an applied voltage and a coil terminal current and the efficiency characteristic of the applied voltage relative to the conduction phase id steeper than when a 120° conduction is applied. As such, inaccurate phase control would disadvantageously result in efficiency varying significantly.

SUMMARY OF THE INVENTION

A main object of the present invention therefore is to provide a motor control device and method capable of reducing the number of components to reduce the cost therefor and reliably controlling a motor.

Another object of the present invention is to provide a motor control device and method capable of readily and accurately detecting phase difference information to drive a synchronous motor with reduced noise, reduced oscillation and increased efficiency.

Still another object of the present invention is to provide a motor control device and method capable of detecting a motor current area in a simplified manner and thus at low cost and also with high precision.

The present invention provides a motor start control device controlling a synchronous motor, including motor current detection means detecting a motor current flowing through a coil of the synchronous motor, detection means detecting information of a phase difference between the motor current and a drive voltage supplied to the coil, and control means referring to the phase difference information to detect the current condition of the synchronous motor and referring to the condition of the synchronous motor to control the drive voltage applied to a terminal of the coil and a frequency of a conduction to the terminal of the coil.

Thus, in the present invention, a phase difference between a motor drive voltage and a motor current may be referred to to detect the current condition of the motor's rotation to start and drive the motor. Furthermore, phase difference information may be referred to to detect whether the synchronous motor has been completely started and thus rotates in stable manner. As such, the motor can be reliably, completely started in a sensorless system without a motor position detector and thus does not fail to start and thus rotates in stable manner. Adopting a sensorless system can eliminate a position detector and thus save the cost therefor.

The present invention provides preferable embodiments, as described below:

Phase difference information may be obtained by calculating an area of a motor current waveform in a predetermined phase period of a drive voltage waveform to facilitate calculating a phase difference. Since an area of a motor current is used to detect phase difference information, the present invention is more resistant to noise than edge detection, such as zero-cross detection, and without being affected by an oscillation of the motor current can reliably detect phase difference information. As such, the motor can be free of erroneous operation and completely started and thus rotates in stable manner.

Furthermore, phase difference information may be obtained by calculating a ratio between a first area of a motor current waveform in a first predetermined phase period of a drive voltage waveform and a second area of the motor current waveform in a second predetermined phase period of the drive voltage phase. Thus a phase difference can be accurately and readily calculated. Since an area of a motor current may be used to detect phase difference information, the present invention is more resistant to noise than an edge detection method, such as zero-cross detection, and without being affected by an oscillation of the motor current can reliably detect phase difference information. As such, the motor can be free of erroneous operation and completely started and thus rotate in stable manner.

Furthermore, an area of a motor current can be calculated by accumulating values obtained by analog-digital (A-D) sampling the motor current in a predetermined phase period at predetermined intervals. As such, the area can be calculated with a simple circuit configuration. Thus a control system can be simply configured to reduce the cost therefor.

Furthermore, the first area may be an accumulation of values obtained by A-D sampling a current motor in the first predetermined phase period at predetermined intervals, and the second area may be an accumulation of values obtained by A-D sampling the motor current in the second predetermined phase period at predetermined intervals. As such, a simple circuit configuration may be used to sample the motor current and thus calculate such areas and further to calculate a ratio thereof. As such, a control system can be simply configured to reduce the cost therefor.

Furthermore, the control means may refer to a variation of phase difference information to detect that the synchronous motor has been completely started and thus rotates in stable manner. As such, the present invention does not require a sensorless system to detect an unstable rotation state associated with a varying phase difference, while the control means may refer to a variation of a phase difference in a sensorless system to reliably detect that the motor has been completely started. As such, the motor does not fail to start and thus rotates in stable manner.

Furthermore, the control means may refer to a variation of phase difference information to detect that the synchronous motor is rotating in unstable manner and in response to the detection of the unstable rotation state the control means may refer to a variation of phase difference information to detect that the synchronous motor has been completely started and thus rotates in stable manner. Thus, the control means can reliably detect that the motor has been completely started (or is rotating in stable manner) after it rotates in unstable manner. As such, the motor does not fail to start and the control means can more reliably determine as to whether the motor has been completely started. That is, the motor control device can be enhanced in reliability.

Phase difference has a limited variation when the synchronous motor has been completely started and thus rotates in stable manner, and the control means may also compare a variation of phase difference information with a predetermined value to detect that the synchronous motor has been completely started and thus rotates in stable manner so as to precisely detect that the motor has been completely started and thus rotates in stable manner.

Furthermore, the control means may compare a variation of phase difference information with a first predetermined value to detect that the motor is rotating in unstable manner and the control means may compare a variation of phase difference information with a second predetermined value to detect that the synchronous motor has been completely started and thus rotates in stable manner. The control means can precisely detect an unstable rotation state with a phase difference having a large variation and thereafter a stable rotation state with a phase difference having a limited variation, i.e., that the motor has been completely started.

Furthermore, from the start of starting the synchronous motor until the motor has been completely started and thus rotates in stable manner, the control means may maintain a conduction frequency of a predetermined value while varying a reference duty value of a drive voltage with time. By varying a reference duty value the synchronous motor can transition rapidly and thus be completely started rapidly (or rotate in stable manner) to reduce the time required for completely starting the motor. Furthermore, the control means can detect that the motor rotates in unstable manner and then that the motor has been completely started (or rotates in stable manner). As such the motor does not fail to start.

Furthermore, from the start of starting the synchronous motor until the motor has been completely started and thus rotates in stable manner, the control means may maintain a drive voltage of a predetermined value while varying a conduction frequency with time. By varying a conduction frequency the motor can transition rapidly and thus be completely started rapidly and thus rotate in stable manner to reduce the time required for completely starting the motor. Furthermore, the control means can detect that the motor rotates in unstable manner and then that the motor has been completely started (and rotates in stable manner). As such, the motor does not fail to start.

Furthermore, from the start of starting the synchronous motor until the motor has been completely started and thus rotates in stable manner, the control means sets a conduction frequency and a drive voltage each to a value corresponding to the synchronous motor having been completely started and thus rotating in stable manner. Thus, the motor can transition rapidly and thus be completely started rapidly and thus rotate in stable manner to reduce the time required for completely starting the motor. Furthermore, the control means may detect that the motor rotates in unstable manner and then that the motor has been completely started (and thus rotates in stable manner). As such the motor does not fail to start.

Furthermore, in starting the synchronous motor the control means may refer to a variation of phase difference information to set an amount in variation of a reference duty value of a drive voltage. Since the control means may refer to a variation of phase difference information to vary a reference duty value, the motor can transition rapidly and thus be completely started rapidly and thus rotate in stable manner to reduce the time required for completely starting the motor. Furthermore, referring to a variation of a phase difference and thus setting an amount in variation of a reference duty value of a drive voltage, also allows the motor to rapidly transition through a condition often associated with oscillation or stepping-out. As such the motor can be increased in longevity and its peripherals can be enhanced in reliability.

Furthermore, in starting the synchronous motor the control means may refer to the current condition of the synchronous motor to set an amount in variation of a reference duty value of a drive voltage. As such, the motor can transition rapidly and thus be completely started rapidly and thus rotate in stable manner to reduce the time required for completely starting the motor. Furthermore, the motor can rapidly transition through a condition oftentimes associated with oscillation or stepping-out. As such, the motor can be increased in longevity and its peripherals can be enhanced in reliability.

Furthermore, the control means may limit to a value a reference duty value of a drive voltage. Limiting a PWM duty value can prevent the value from being increased to too large a value to allow an excessive current to flow through an inverter and the motor and damage them. As such, the device can be enhanced in reliability.

Furthermore, in starting the synchronous motor the control means may refer to a variation of phase difference information to set an amount in variation of a conduction frequency. Referring to a variation of phase difference information to vary a conduction frequency allows the motor to transition rapidly and thus be completely started rapidly and thus rotate in stable manner so as to reduce the time required for completely starting the motor. Furthermore, the motor can rapidly transition through a condition oftentimes associated with oscillation or stepping-out. As such the motor can be increased in longevity and its peripherals can be enhanced in reliability.

Furthermore, in starting the synchronous motor the control means may refer to a condition of the synchronous motor to set an amount in variation of a conduction frequency. Varying a conduction frequency allows the motor to transition rapidly and thus be completely started rapidly and thus rotate in stable manner so as to reduce the time required for completely starting the motor. Furthermore, the motor can rapidly transition through a condition oftentimes associated with oscillation or stepping-out. As such the motor can be increased in longevity and its peripherals an be enhanced in reliability.

Furthermore, after the control means has detected that the synchronous motor has been completely started and thus rotates in stable manner, the control means drives the synchronous motor to allow phase difference information to have a predetermined value. Driving the motor in the normal operation under phase difference control does not entail changing a method of detecting phase difference information to another. This eliminates the necessity of switching an operation method for example from a synchronous operation to start the motor to an counter-electromotive operation in the normal operation, as conventional. As such, the synchronous motor can smoothly transition from its starting condition to its normal operation. Thus, torque variation, noise and oscillation can be reduced and the motor can also be prevented from stopping when its operation method would otherwise fail to switch successfully. Since it is not necessary to switch the currently applied method of detecting phase difference information, a control system can have its burden reduced to further reduce the cost therefor.

Furthermore, after the control means has detected that the synchronous motor has been completely started and thus rotates in stable manner, the control means may increase a rotation rate of the synchronous motor to a rotation rate allowing a counter-electromotive force to be detected in a coil of the motor and the control means may refer to the counter-electromotive force to switch conduction to drive the synchronous motor. While the synchronous motor is being started it may be driven with reference to a phase difference, and when it normally operates it may be driven with reference to a counter-electromotive voltage. Thus the motor can be reliably started, and referring a counter-electromotive force in the normal operation to switch conduction allows a simple configuration to be used to provide a control system.

Furthermore, at least in starting the synchronous motor the control means drives the motor with 180° conduction. The motor can be started without a conduction pause period introduced in a motor drive waveform, such as when 120° rectangular-waveform is applied, to detect a counter-electromotive force. As such, torque variation, noise, oscillation and the like can be reduced to start the motor smoothly. Furthermore, a magnet flux can be effectively used to achieve high efficiency.

The present invention in another aspect provides a device controlling a motor with a rotor having a magnet embedded therein, employing a reluctance torque to rotate the rotor, including: current detection means for detecting a current flowing through a coil of the motor to output current phase information; means for setting information of a phase of a voltage applied to the coil; compare means for comparing the current phase information output from the current detection means with the voltage phase information set by the means for setting, to detect a difference between the phases; reference phase difference value storage means previously storing a desired reference phase difference value; and drive means for driving the motor to allow a difference between the phase difference detected by the compare means and the reference phase difference value stored in the reference phase difference value storage means, i.e., phase difference information to attain a desired value.

Thus, in the present invention, without a change introduced into its configuration the motor can be applied to conventional motors and also superior in controllablity.

The present invention provides preferable embodiments, as follows:

Phase information setting means includes means for setting a rotation rate of a motor, a sine wave table previously storing sine wave data corresponding to a rotation rate, and a sine wave data creation means referring to a set rotation rate to read corresponding sine wave data from the sine wave table, and outputting information of a phase of a voltage applied to a coil. The drive means includes pulse width modulated (PWM signal generation means referring to phase difference information corresponding to a difference between a phase difference detected by the compare means and a reference phase difference value stored in the reference phase difference value storage means and to sine wave data output from the sine wave data creation means, for generating a PWM signal for each phase winding, and inverter means including a switching element provided for each phase winding, referring to a PWM signal generated by the PWM signal generation means, for switching a corresponding switching element.

Furthermore, a current through the motor coil and a voltage applied to the motor coil has therebetween a phase difference of zero, and the motor coil voltage has a conduction width corresponding to an electrical angle of 180° and has a conduction waveform selected to be a sine wave.

The present invention in still another aspect provides a motor control device driving and controlling a synchronous motor having a motor coil with a plurality of phase windings, including: drive-wave data creation means responsive to issuance of an instruction to set a rotation rate for creating drive-wave data used to drive the synchronous motor for each of the plurality of phase windings; motor current detection means for detecting a motor current of any specific one of the plurality of phase windings to output a motor current signal; phase difference detection means for detecting a motor drive voltage phase of a specific phase winding from drive wave data created by the drive wave data creation means, and detecting a phase difference between the motor drive voltage phase of the specific phase winding and a motor current signal output from the motor current detection means, to output phase difference information; phase difference control means for calculating a reference duty value used to control phase difference information output from the phase difference detection means to have a target value; duty calculation means for multiplying drive wave data for each phase winding output from the drive wave data creation means by a reference duty value output from the phase difference control means, to calculate an output duty for each phase winding; inverter means including a plurality of switching elements, responsive to a calculated output duty for each phase winding for generating a PWM signal to control conduction of each switching element to provide conduction through each motor coil, wherein the phase difference detection means obtains a motor current signal area of each of two phase periods with reference to a motor drive voltage phase of any specific phase winding and calculates the ratio of the motor current signal areas of the two phase periods and provides the area ratio as phase difference information.

Thus, in the present invention, in driving the synchronous motor a sine wave can effectively achieve characteristics of 180° conduction, i.e., reduced noise, reduced oscillation, high efficiency, and reduced power consumption.

Furthermore, the present invention can prevent phase difference information from being affected e.g. by noise and thus erroneously detected. As such, the phase difference information can be obtained accurately. Furthermore, if a phase of zero, which is hard to detect with zero-cross, is associated with a flat current waveform, phase difference information can be obtained accurately. Furthermore, the present invention can prevent the erroneous detection of phase difference information that is attributed to a variation of a low frequency component superimposed on a motor current. Thus, phase difference information can be obtained accurately.

Thus, even in disadvantageous, e.g., noisy environment or even with different rotation rates, phase difference control can be achieved with high precision. It is not necessary to provide a current sensor used to detect a current that is in particular provided internal to the motor; it may be accommodated in a motor control substrate. As such, interconnections may readily be provided and circuits can readily be designed. Furthermore, in the present invention, a motor current phase may be obtained from an area obtained by accumulating results of sampling a motor current, rather than from an edge such as zero-cross. As such, phase difference information can be detected accurately.

The present invention provides embodiments, as follows:

The phase difference detection means samples n times a motor current signal flowing through each of two phase periods with reference to a motor drive voltage, n being an integer no less than one, and accumulates each current sample data for output as a motor current signal area.

Furthermore, the phase difference detection means samples a motor current signal at equal intervals for a phase period with reference to a motor drive voltage phase. The phase difference detection means refers to a rotation rate to set a sampling interval. As such, a motor current can be sampled at timing designed through a calculation simplified. As such, a controlling microcomputer can provide its processing in a reduced period of time. Thus, rapid and precision phase-difference control can be achieved. Furthermore, an inexpensive controlling microcomputer may be used to achieve a cost reduction.

Furthermore, since the sampling rate n may be set depending on the rotation rate, a phase difference can be detected in accordance with the processing rate of the controlling microcomputer. As such, any controlling microcomputer can achieve its best performance in accordance with its ability. Furthermore, if an inexpensive controlling microcomputer is used, accurate phase-difference control can still be achieved and a cost reduction can thus be achieved. Furthermore, the controlling microcomputer does not overflow in the number of process steps. As such, high-precision phase difference control can be achieved.

Furthermore, two phase periods with reference to a motor drive voltage phase are a first period selected corresponding to a 0°–90° period of the motor drive voltage phase and a second period selected corresponding to a 90°–180° period of the motor drive voltage phase, or a first period selected corresponding to a 180°–270° period of the motor drive voltage phase and a second period selected corresponding to a 270°–360° period of the motor drive voltage phase. Thus, the two phase periods are symmetrical in phase and their phase difference has a value with one as the center. As such, control-designing can be facilitated and the controlling microcomputer's processing can be alleviated. Thus, rapid and high-precision phase difference control can be achieved. Furthermore, an inexpensive controlling microcomputer may be used and a cost reduction can thus be achieved.

Furthermore, after two phase periods starts with reference to a motor drive voltage phase, a first motor current sampling operation starts at a timing set by correcting an amount of drive-wave data exceeding a reference phase of drive-wave data of a specific phase winding. As such, an accurate motor voltage phase can be obtained. Thus accurate phase difference information can be detected and high-precision phase difference control can be achieved.

Furthermore, phase difference information may be obtained by averaging m ratios of motor current signal areas, m being an integer no less than one. Thus, accurate phase difference information can be obtained. As such, high-precision phase difference control can be achieved if the motor is in a poor, for example noisy environment, at a rotation rate with a motor current waveform distorting and varying significantly.

Furthermore, phase difference information may be obtained depending on an averaging frequency m set depending on the current rotation rate. As such, phase difference information can be detected according to a control band range as required and a phase difference information error as desired. Thus, stable phase-difference control can be achieved ensuring a controlling band range and a phase difference information error as desired.

Furthermore, the phase difference control means corresponds to a proportional and integral control operation on error data between phase difference information and target phase difference information. Since phase difference control may be provided through the PI control operation, residual error data existing in phase difference information can be converged at zero. Thus, phase difference control can be provided with high precision, matching a target phase difference. Furthermore, efficient phase difference control can be achieved.

Furthermore, the phase difference control means may set a control gain depending on a condition for the motor's rotation or on target phase difference information. As such, if a condition for the motor's rotation causes a difference in a phase-difference characteristic or a non-linearity more or less appearing in a phase-difference characteristic, they still can be compensated for. As such, in any conditions optimal phase-difference control can be achieved. As such, the motor can be driven efficiently to reduce power consumption.

Furthermore, target phase difference information may be set to an optimal value depending on a condition for the motor's rotation. Since target phase difference information may be set depending on the rotation rate, a phase difference can be constantly tracked for that, varying depending on the rotation rate, can achieve maximized efficiency. Furthermore, there can also be eliminated an error between the motor current signal areas of two motor voltage phase periods that is attributed to an effect of a distortion of a motor current waveform. As such, under any rotating condition, the motor can be driven most efficiently and its power consumption can thus be reduced.

Furthermore, after two phase periods have completed with reference to one motor drive voltage phase, there may be provided a time period for calculating a ratio of motor current signal areas and averaging obtained area ratios to obtain phase difference information while the phase difference detection process is not performed. Since there may be provided a time period for an operation to detect phase difference information, target phase difference information may be set depending on the rotation rate and a phase difference can be constantly tracked for that, varying with the rotation rate, can achieve maximized efficiency. As such, under any rotating condition, the motor can be driven most efficiently and its power consumption can thus be reduced.

Furthermore, at least the phase difference detection means may provide its processing in a main loop of a process routine of a controlling microcomputer. As such, its processing would not be affected by any interrupt time. As such, if a slow-processing, inexpensive controlling microcomputer is used, accurate phase-difference control still can be achieved. Furthermore, a cost reduction can be achieved.

When a drive wave is set to allow a sine waveform or a current waveform to be substantially identical in waveform to a rotor magnet flux waveform, a more effective torque can be created to achieve high efficiency or reduce a conduction pause period. Furthermore the present invention may dispense with a position detection sensor to achieve a cost reduction.

Furthermore, a control gain may be set depending on an offset value set by the motor current detection means or a motor current signal amplitude value. As such, a phase difference control gain can be constantly set to an optimal value to achieve high-precision controllability to drive the motor in stable manner.

Furthermore, target phase difference information or a method of calculating phase difference information may be set with reference to a motor drive voltage phase. As such, phase difference information can be detected in a reduced period to allow the motor's behavior to be detected more elaborately, and precision phase-difference control can also be achieved to drive the motor in more stable manner and more reliably.

Furthermore, the present invention in another aspect provides a method of controlling a motor having a rotor with a magnet embedded therein, and employing a reluctance torque to rotate the rotor, wherein a current flowing through a coil of the motor is detected to output current phase information and there also be set information of a phase of a voltage applied to the coil of the motor, the output current phase information is compared with the set information of the phase of the voltage applied to the coil to detect a phase difference, and the motor is driven to allow a difference between the detected phase difference and a previously stored reference phase-difference value, i.e., phase difference information to attain a desired value. Thus, without a change in its configuration the motor can be applied to conventional motors and it is also superior in controllability. More specifically, as is apparent from a result of an experiment using an IPM motor with a fixed rotation rate and a fixed load torque to examine an efficiency characteristic with respect to an applied voltage and a voltage-current phase difference, the present invention exhibits less steep an efficiency characteristic than a conventional example. Thus, the present invention can effectively provide a wider tolerable range in setting an optimal phase angle to obtain maximized frequency, and if the phase angle varies slightly, efficiency varies less frequently.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 represents a motor current waveform and a timing of sampling the motor current in the first embodiment of the present invention.

FIGS. 5A and 5B are a flow chart of an operation of the first embodiment of the present invention.

FIG. 16 describes a configuration of a process in the second embodiment of the present invention.

FIGS. 41A and 41B are flow charts representing a process provided by a start control unit 16 to detect whether a motor has been completely started and thus rotates in stable manner while a reference duty value is varied.

DESCRIPTION OF THE PREFERRED EMBODIMENTS

Figure 1:
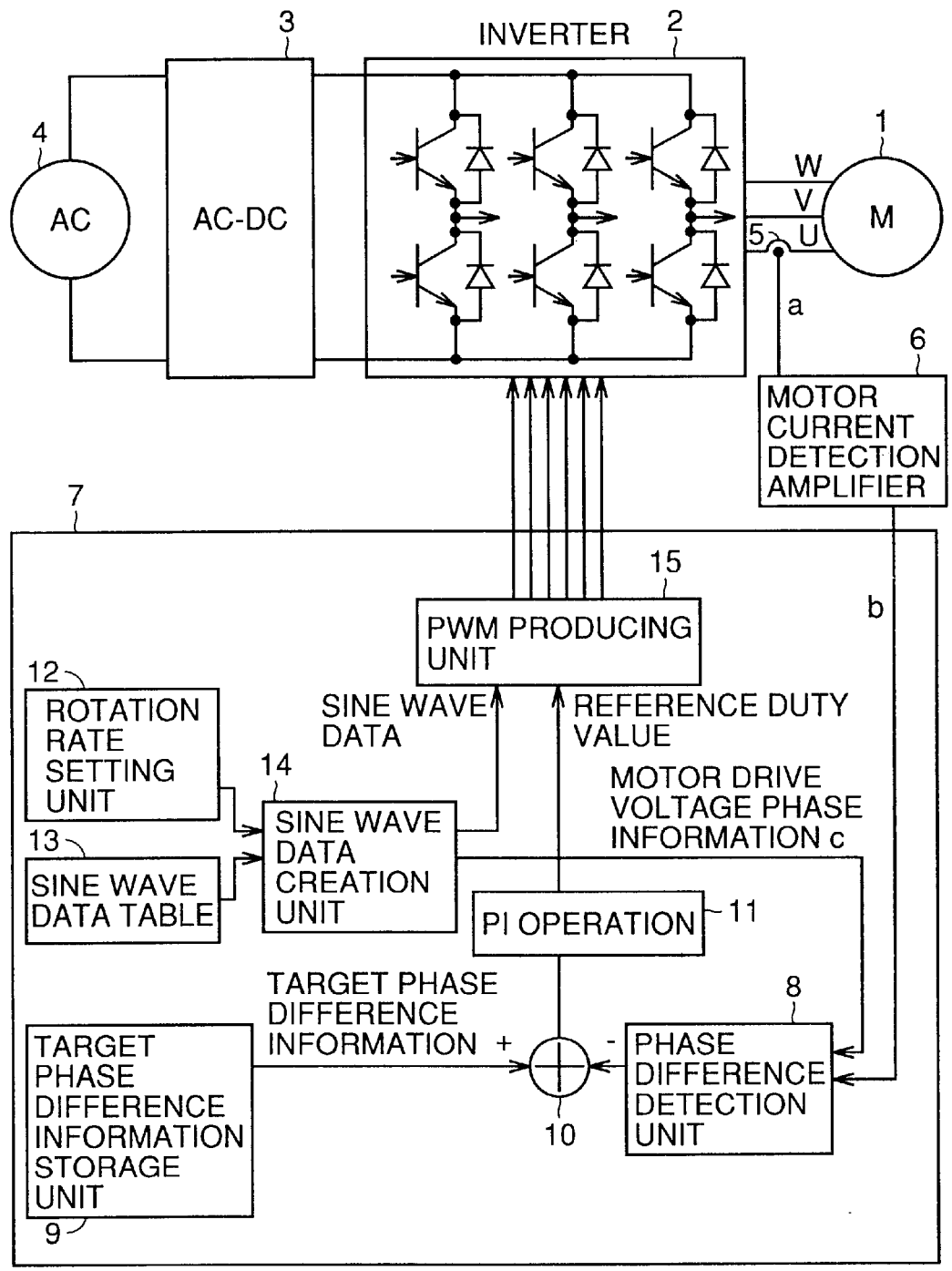
FIG. 1 is a block diagram of a first embodiment of the present invention.

FIG. 1 is a block diagram of a motor control device in one embodiment of the present invention. In the figure, a synchronous motor 1 has a stator with a multi-phase-winding (3-phase-winding) coil wound therearound and a rotor provided with a permanent magnet. Synchronous motor 1 is driven by a motor control device configured of an inverter unit 2, an AC-DC converter circuit 3, an AC power supply 4, a current sensor 5, a motor current detection and amplification unit 6 and a microcomputer 7.

Synchronous motor 1 is driven by an output from inverter 2. AC power supply 4 provides an AC voltage. Converter circuit 3 converts the AC voltage to a DC voltage. Inverter 2 receives the DC voltage. Current sensor 5 detects a motor current a passing through a specific one of phase windings U, V and W of a motor coil terminal (in the figure, phase winding U). A motor current detected by current sensor 5 is fed to motor current detection and amplification unit 6 and amplified by a predetermined amount and subjected to an offset addition to provide a motor current signal b which is in turn applied to microcomputer 7.

Microcomputer 7 includes a phase difference detection unit 8, a target phase difference information storage unit 9, an adder 10, PI operation unit 11, a rotation rate setting unit 12, a sine wave data table 13, a sine wave data creation unit 14 and a PWM producing unit 15 and provides their processings in software. Phase difference detection unit 8 A-D converts and takes thereinto at a predetermined timing a motor current signal fed from motor current detection and amplification unit 6, accumulates each current sample data sampled for each of two motor drive voltage phase periods, to provide a motor current signal area, and outputs a ratio between the two motor current signal areas as phase difference information. Phase difference information as a target is stored in target phase difference information storage unit 9. Adder 10 calculates an error data between target phase difference information and phase difference information and feeds the error data to PI operation unit 11. PI operation unit 11 calculates proportional error data and integral error data for the error data calculated by adder 10 and outputs a reference duty value. It should be noted that adder 10 and PI operation unit 11 together configure a phase difference control unit.

Rotation rate setting unit 12 sets a synchronous motor 1 rotation rate instruction, and sine wave data table 13 includes a table having a predetermined number of data. Sine wave data creation unit 14 responds to the rotation rate instruction and the passage of time by reading from sine wave data table 13 the sine wave data corresponding to each of motor coil phase windings U, V, W as well as by outputting motor drive voltage phase information c of phase winding U from the sine wave data of phase winding U. PWM producing unit 15 uses the sine wave data and the reference duty value to output for each phase winding a PWM waveform to a drive element of inverter 2.

Current sensor 5 may be a so-called current sensor configured of a coil and a Hall element or it may be a current transformer. Current can be detected with higher precision if not only one but each phase winding may have its motor current detected. Furthermore, the sine wave data may be created through an operation rather than using sine wave data table 13. Furthermore, while the elements 8–15 components correspond to processings provided by microcomputer 7, they may be alternatively configured in hardware as long as they provide similar processings.

It should be noted that the motor is driven by a sine wave, which allows a motor current to be smoothly supplied to reduce oscillation and noise. However, it is not limited to sine wave; if a driving waveform that can provide a motor current matching a magnetic flux of the rotor of the motor conducts the motor can be driven more efficiently.

Furthermore, the contents of a program for the microcomputer 7 processing in software may be stored in a memory device such as a ROM when it is shipped. Furthermore, if it is stored in a rewritable memory such as a flash ROM, it can for example be updated and modified whenever necessary.

Two motor current signal areas detected in two motor drive voltage phase periods have their area ratio therebetween calculated by phase difference detection unit 8 and the result of the calculation serves as phase difference information. PI operation unit 11 performs a PI operation for the amount of the error between the phase difference information and target phase difference information. PWM producing unit 15 uses a reference duty value corresponding to an output from PI operation unit 11 and sine wave data separately obtained in response to a rotation instruction, to calculate the current, output duty ratio to generate and apply a PWM signal to the motor coil via inverter 2 to drive synchronous motor 1.

That is, the magnitude of a drive voltage is determined by a phase difference control feedback loop for controlling a phase difference of a motor current relative to a motor drive voltage (an output duty) to be constant, and the motor's rotation rate is determined according to sine wave data output with a desired frequency to rotate synchronous motor 1 at a desired rotation rate. Thus the motor can be driven and controlled with a desired phase difference and a desired rotation rate.

It should be noted that in starting the motor a forced conduction is made for each phase winding, applying a rotating magnetic field, to apply a forced excitation, and in normally driving the motor the above-described process may be applied to control the motor.

Figure 46:
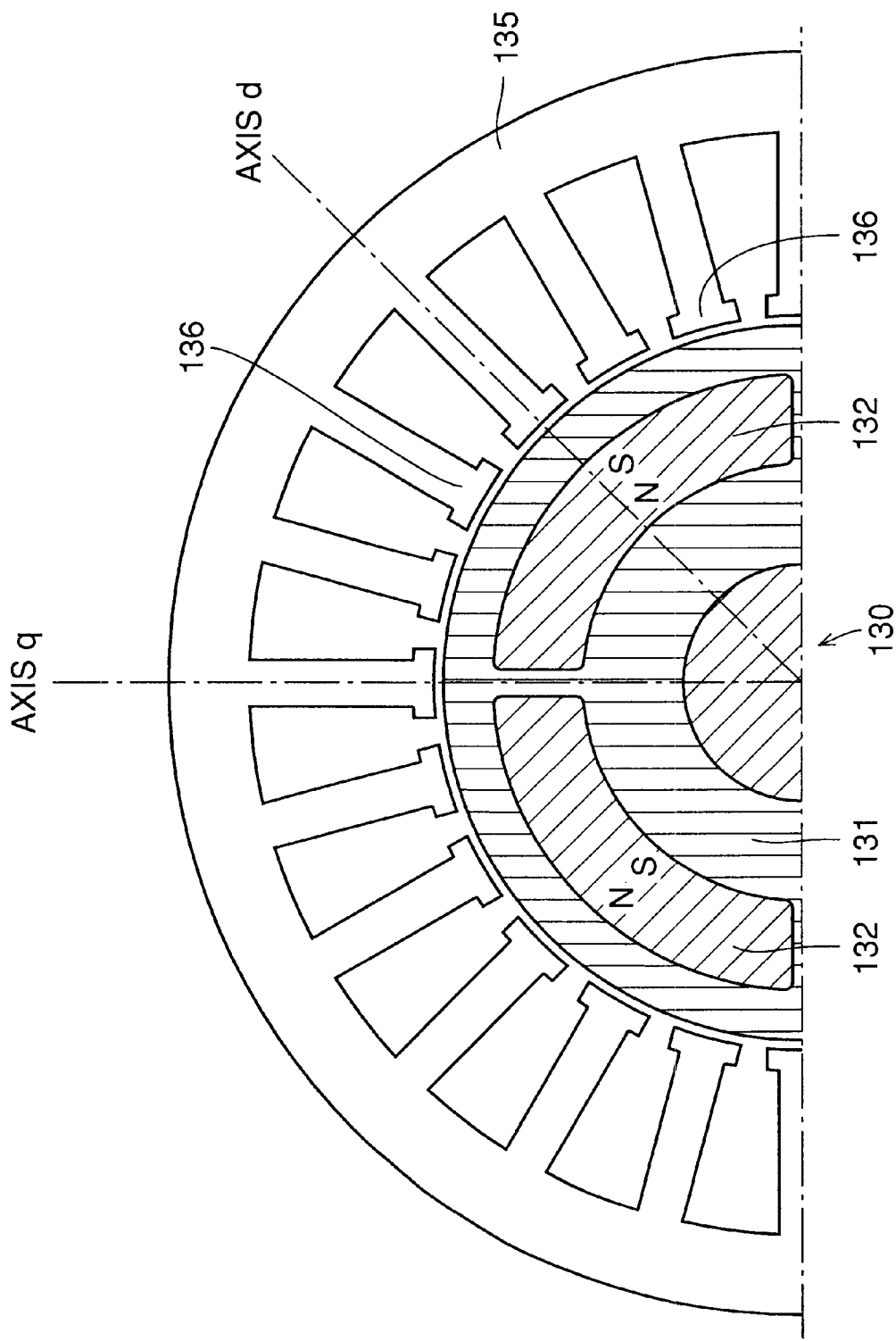
FIG. 46 is a cross section of an IPM motor.
Figure 47:
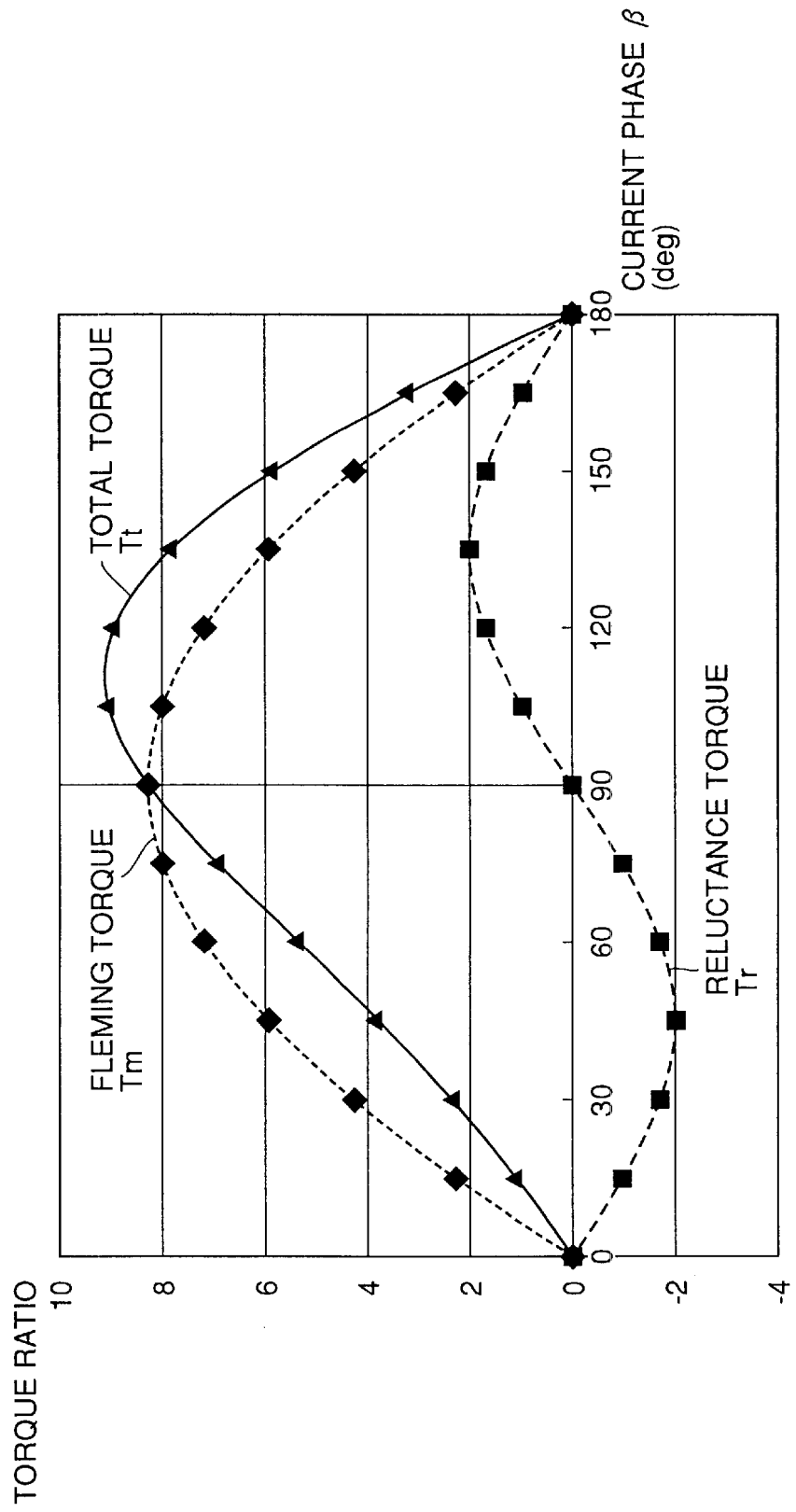
FIG. 47 is a graph representing a relationship between a Fleming torque, a reluctance torque and a total torque for a permanent-magnet IPM motor.
Figure 48A:
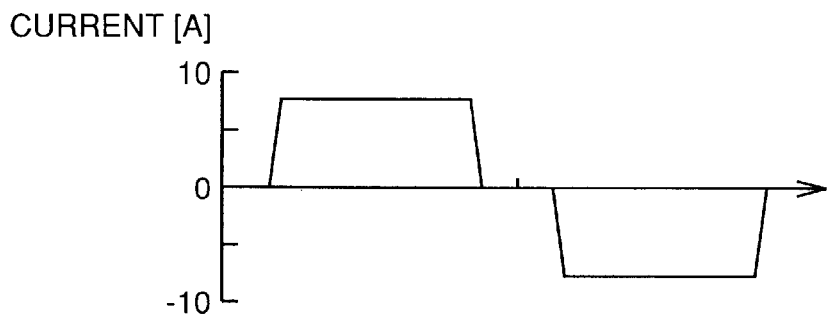
FIGS. 48A–48D are waveform diagrams representing a configuration of a conventional art.
Figure 48B:
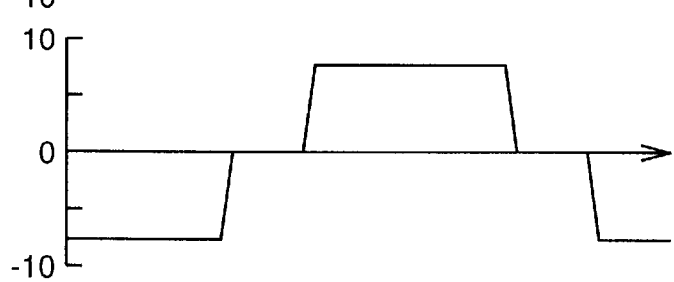
Figure 48C:
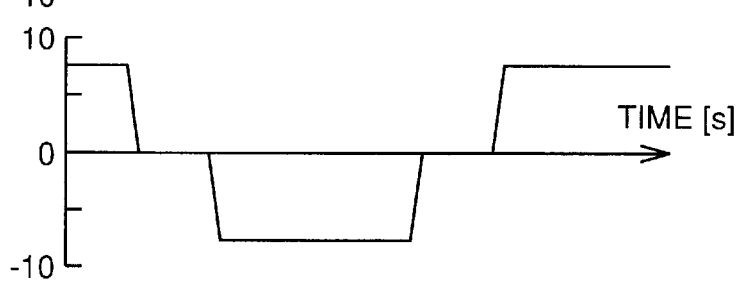
Figure 48D:
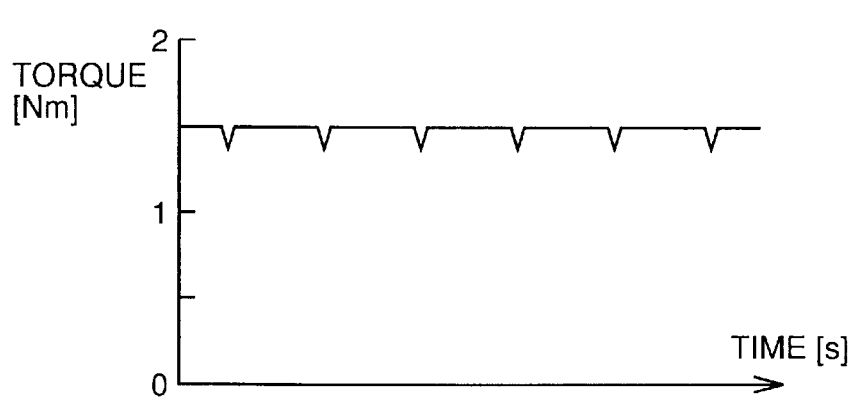
Figure 49:
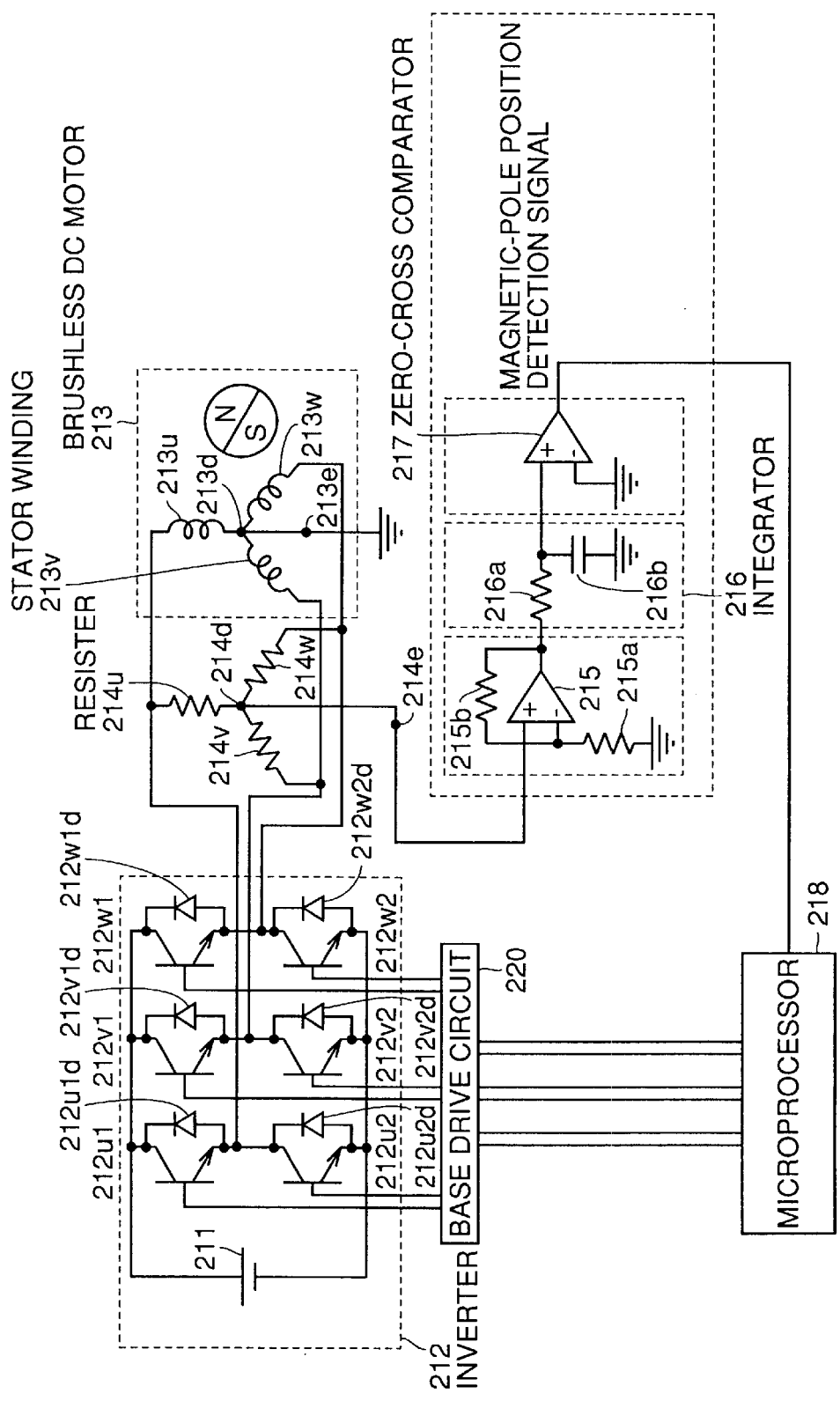
FIG. 49 shows a conventional art 120° drive system.

A synchronous motor can be driven and controlled by the phase difference control in the first embodiment of the present invention, as will now be described according to a result of an experiment with an interior permanent magnet (IPM) motor. It is known that the FIG. 46 so-called IPM motor with a permanent magnet embedded internal to its rotor uses in parallel both of a Fleming torque (also referred to as a "magnet torque") produced in association with a magnet flux and a coil current and a reluctance torque exploiting the fact that the motor coil's inductance varies with the shape of the rotor and that the relative, positional relationship between the rotor and the stator that maximizes the sum of the Fleming torque and the reluctance torque varies with a condition for the motor's rotation.

To efficiently drive the IPM motor the relative, positional relationship between the rotor and the stator needs to be detected, and to achieve conduction through the motor coil in an optimal positional relationship the conduction needs to be timed, as optimized. Furthermore, for a synchronous motor, if it is simply driven with no consideration given to whether it is driven efficiently or not the conduction still must be timed, as limited to a certain range of values; otherwise a brake torque would be produced and the motor could stop.

Figure 2:
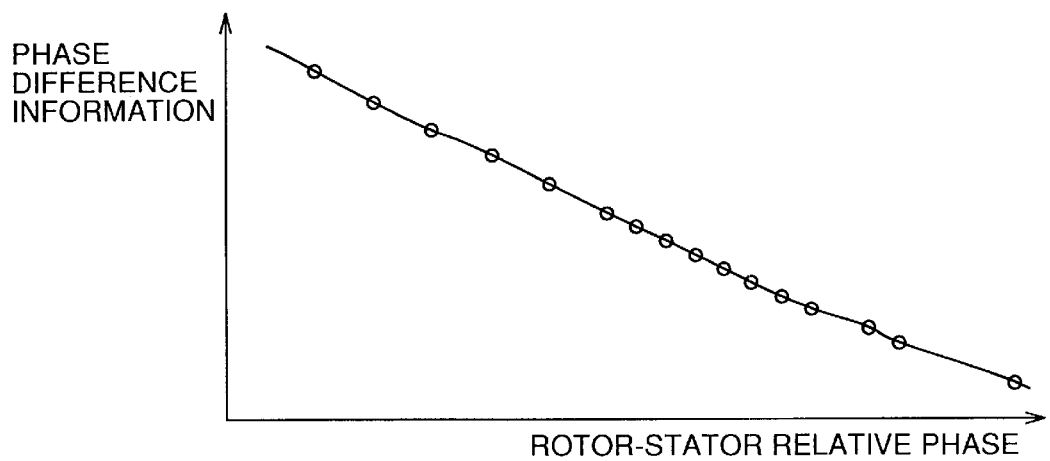
FIG. 2 shows an result of an experiment in the first embodiment of the present invention, a graph of phase difference information versus rotor-stator relative phase.

FIG. 2 plots a result of an experiment with a motor driven under the phase difference control in the first embodiment of the present invention, in a graph of phase difference information versus a relative, positional relationship between the rotor and the stator, as measured with an encoder. It should be noted that the motor is rotated at a rotation rate of 1000 rpm/torque 15 kgfcm.

The phase difference control in the first embodiment does not directly detects the rotor's position or the stator's position relative to each other. However, as shown in FIG. 2, it is understood that phase difference information and the rotor-stator relative, positional relationship are substantially proportional to each other. As such, controlling phase differende information to have a predetermined value can indirectly control the rotor position and the stator position relative to each other and optimizing target phase difference information allows the motor to be driven at a timing of conduction achieving maximized efficiency.

Figure 3:
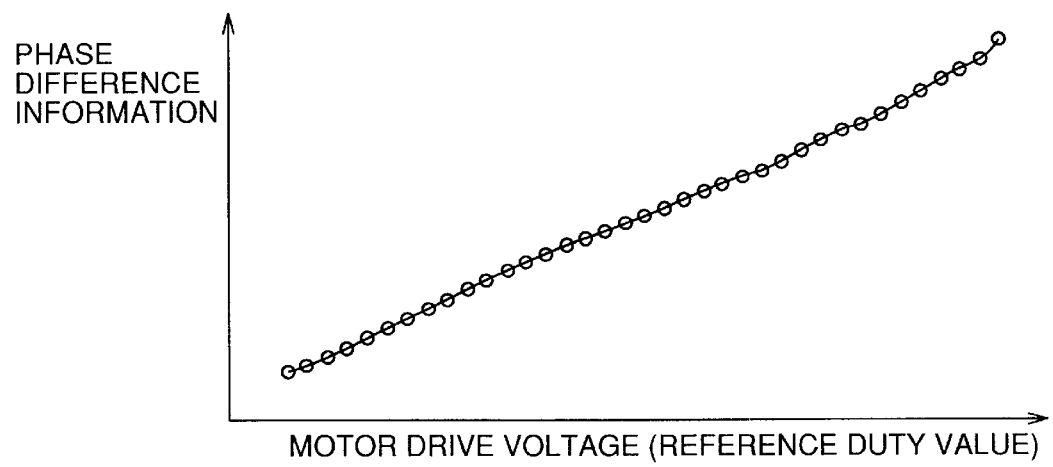
FIG. 3 shows a result of an experiment in the first embodiment of the present invention, a graph of phase difference information versus motor drive voltage.

FIG. 3 is a graph of phase difference information versus motor drive voltage (reference duty value), as measured in an experiment with a motor actually driven under the same conditions as in FIG. 2. It can be found that increasing and decreasing the motor drive voltage (the reference duty value) can control the phase difference information.

Increasing/decreasing a motor drive voltage (a reference duty value) when a motor rotates at a constant rotation rate varies a current/voltage phase difference (or phase difference information) and it can be seen that a phase difference control feedback is effective which uses the phase difference information as configured in the present embodiment to increase/decrease a motor drive voltage (a reference duty value).

It can also be seen from a result of the above embodiment that although the actual motor current is not a complete sine wave, having superimposed thereon a distortion component related to the rotor's magnetic flux and the like, the phase difference control of the present embodiment still can be applicable; it can be seen that this phase difference detection method or the detection of phase difference information based on an area ratio is achieved with good precision, and it can overcome the disadvantages as described above, as compared to a phase difference detection method detecting a certain point of a motor current, such as zero cross, to detect a phase difference with enhanced precision.

Although in the results of the experiments each characteristic is almost proportional, strictly it is not a completely straight line. Apparently this is attributed to a measuring error as well as a distortion of the motor current. As such, the phase difference control system would have a control-system gain varying with the phase difference value. This, however, can be overcome by allowing for the non-linearity in setting a gain as the control system. Furthermore, if a phase difference value is used to vary a gain of the control system the control system can be configured with still higher precision.

Furthermore, a condition for the motor's rotation can be a cause of a variation in the gradient of each characteristic. However, such a variation can be overcome by allowing for that level in variation of a gain of the control system attributed to the condition for the motor's rotation in configuring the control system. Furthermore, if the condition for the motor's rotation is referred to to vary the amplification level of the control system a higher precision control can then be configured. It should be noted that in this experiment the motor current detection and amplification unit is an inverting amplifier.

In setting a rotation rate the sine wave data table and the PWM output are used, as described below.

The phase difference control system of the first embodiment is distinguished from a conventional system detecting, e.g., a counter-electromotive voltage pulse to provide speed-control and it is a so-called forced excitation driving, with which a motor's rotation rate is determined by a frequency of a sine wave voltage (PWM) providing conduction through the motor's coil.

Sine wave data table 13 is a lookup table (LUT) stored in a nonvolatile memory. The lookup table stores a data train allowing a sine waveform to be output when it is successively D-A converted. For example, if sine wave data of one period correspond to 360 sine wave data then each sine wave data has a value corresponding for an electrical angle of 1°.

Hereinafter a description will be made of a sine wave data table configured of a train of 360 sine wave data for one period. A PWM carrier f is adapted to have a frequency f of 3 kHz and the synchronous motor is adapted to rotate once in two periods of the sine wave for one pair.

For sine wave 180° conduction, a motor drive voltage (an output duty) needs to be provided in the form of a sine wave and the sine wave data accordingly needs to be updated for each period of the PWM carrier. Furthermore, one rotation of the synchronous motor requires updating the sine wave data 360×2=720 times.

If herein in the sine wave data table, reference data is updated one for each PWM carrier period, then a PWM carrier period T would be:

$$1/3000 [Hz] = 0.333 [msec]$$

and one rotation of the motor requires:

$$720 \times 0.333 [msec] = 0.24 [sec]$$

so that the motor would rotate at a rotation rate of approximately 250 rpm. In other words, if the motor's structure is not considered, the motor's rotation rate is determined by the PWM carrier frequency and the interval at which the sine wave data table 13 reference data is updated. Furthermore, if the coil has three phase windings, then sine wave data offset by an electrical angle of 120° may be referred to for each winding's data. A sine wave operation may also be performed when necessary to create sine wave data.

The sine wave data obtained for each phase winding is multiplied by a reference duty value calculated by the phase difference control and the product is input to PWM producing unit 15 such as a so-called PWM waveform generator to output a PWM waveform. In the PWM waveform generator, for example a triangular wave is produced in the PWM carrier period, the triangular wave's value in wave height is compared with the aforementioned product, and based on the comparison a signal of the high/low level is output.

A PWM waveform generator is configured of a dedicated IC or often provided as a function of a controlling microcomputer. Using them allows a PWM waveform corresponding to each drive element to be readily obtained. Hereinafter a description will be made of a characteristic of the present invention, i.e., a process and configuration starting from the detection of phase difference information to the calculation of a reference duty value.

FIG. 4 is a waveform for illustrating the principle of the detection of phase difference information. The phase winding U passes motor current a substantially in the waveform of a sine wave with the zero level centered. Motor current a is passed to motor current detection and amplification unit 6 and there amplified and has an offset set to produce motor current signal b, so that motor current a falls within a range of voltage convertible by an A-D converter incorporated in microcomputer 7 (for example, 0 to +5V).

Furthermore, the U winding's motor drive voltage phase information c is produced by sine wave data creation unit 14 from the U winding's sine wave data. It should be noted that motor drive voltage phase information c is in effect not required to be a sine wave and phase information suffices.

Phase difference detection unit 8 receives motor current signal b as shown in FIG. 4(b) and motor drive voltage phase information c shown in FIG. 4(c). In phase difference detection unit 8, motor current signal b is sampled in phase periods θ0 and θ1 predetermined according to motor drive voltage phase information c, at predetermined sampling phases (a timing at which the signal is sampled) s0 to s3. Motor current signal b is sampled n times (in FIG. 4, twice) for each phase period. For phase periods θ0 and θ1 their respective motor current signal areas are labeled Is0 and Is1, respectively, and each current sample data is accumulated as in the following expressions:

$$Is0 = I0 + I1$$

$$Is1 = I2 + I3$$

Then the ratio between motor current signal areas Is0 and Is1 is calculated and provided as phase difference information. This process will now be described with reference to the flow chart shown in FIGS. 5A and 5B.

FIG. 5A shows a phase difference detection routine for detecting phase difference information, and FIG. 5B shows a sampling start routine (a timer interrupt routine) using a timer value or the like to detect whether a timing of the sampling operation has arrived, to start the sampling operation. It should be noted that the process is not limited to the configuration as described herein and it may be any process based on a similar concept.

At step (SP) 1, the motor's rotation rate and the timer's counting period are referred to to set a sampling timing of sampling phase s0 as an interrupt value of the sampling start routine and initialize each variable such as a sampling rate n. This is done only once immediately after the motor starts its rotation or immediately after or before phase period θ0 and thereafter the sampling operation is timed as set by the sampling start routine.

SP2 and those subsequent thereto form a loop process. After SP1, this loop process is repeated until phase difference information is completely detected, and in a subsequent phase period θ0 the loop process is again performed. At SP2, control detects whether a sampling operation which the sampling start routine issues an instruction to start has been completed. If it has then control goes to SP3, and if not then a process as described below is performed although since the loop process is proceeding, control continues to detect whether the sampling operation has been completed.

At SP4, the sampling rate is updated by one. At SP5, whether the current phase period is θ0 or θ1 is determined and depending on the decision the SP6 or SP7 step is performed. This decision may be made depending on sampling rate n.

At SP6 or SP7, whether the sampling rate has reached a predetermined frequency (twice or four times) is determined and if so then the SP8 or SP9 step is performed. At SP8 or SP9, assuming that in each phase period the sampling operation has been completed, current sample data are accumulated (I0+I1, I2+I3) to calculate motor current signal areas Is0 and Is1. At SP10, control determines whether both of motor current signal areas Is0 and Is1 have been calculated and if not then control returns to the loop process.

At SP11, assuming that the motor current signal areas Is0 and Is1 have been calculated, the ratio between the both areas' data (Is0/Is1) is calculated and provided as phase difference information. Thus the phase difference detection routine (the loop process) is completed.

The FIG. 5B sampling start routine (the timer interrupt routine) starts at a sampling timing with a timer interruption set, and at SP12 a predetermined sampling phase is referred to to set a subsequent sampling timing as the sampling start routine's interrupt value. At SP13, an instruction to start current-sampling is issued to the A-D converter and the routine is competed.

As has been described above, in the sampling start routine a subsequent sampling timing is set, because the current timer count value is known, nearly equal to the current timer interrupt value, and because the current motor voltage phase is known, nearly equal to the current sampling phase, and this eliminates the necessity of again referring to a timer count value and a motor voltage phase, which provides the process efficiently. Strictly speaking, however, the current timer interrupt value and the current sampling phase are values obtained when an interrupt occurs, and they are slightly different from those when the SP12 step is performed. As such, if a sampling timing should be set with precision, desirably a timer count value and a motor voltage phase should be referred to whenever it is set.

A timing of sampling a motor current may be determined as desired by referring to a predetermined sampling phase and to a motor rotation rate and a timer period to set a timer interrupt value to a predetermined value whenever it is determined. In setting it, more specifically, as described above, for two periods of a sine wave the motor rotates once, and for a motor rotation rate of 3000 rpm with a motor voltage phase of 30° a sampling operation starts. Furthermore if for a motor voltage phase of 0° a timing of a sampling operation is set and the current-sampling timer counts with a resolution of 1 μsec, then the time elapsing before a motor voltage phase of 0° reaches that of 30°, with one period of the sine wave corresponding to a time period of 10 msec, can be determined as follows:

$$0.01[s]*30[°]/360[°]=833\ [\mu sec].$$

the current-sampling timer's count value can be determined as follows:

$$833\ [\mu sec]/1\ [\mu sec/count]=833\ [counts].$$

More specifically, the time's count value for the motor voltage phase of 0° and 833 are added together and if the sum is used as a timer interrupt value then at the motor voltage phase of 30° a timer interruption occurs and a current-sampling operation starts. It should be noted that, as has been described above, a motor rotation rate is determined by a period of sine wave data, i.e., by microcomputer 7 and this allows an accurate sampling operation with reference to a motor voltage phase.

Furthermore, in two phase periods any sampling timing may be set that allows each sampling operation to be constantly timed at the same phase of the motor voltage, and, as shown in the FIGS. 2 and 3, maintains a substantially proportional relationship and provides one rotor-stator relative positional relationship or motor drive voltage (one output duty) for one phase difference information. However, as shown in FIG. 4, if current is sampled in each phase period with a phase in line-symmetry with respect to a motor voltage phase of 90°, the phase difference control can be readily designed. More specifically, current is preferably sampled at a timing having a phase, as measured from a phase of 90°, that does not vary among phase periods, in other words, a phase allowing both motor current signal areas detected to be equal when a phase difference is in effect zero.

Furthermore, a motor voltage phase does not need to have collective phase periods. For example, in FIG. 4 the accumulation of I0 and I5 may correspond to a motor current signal area of a first phase period and the accumulation of I2 and I7 may correspond to a motor current signal area of a second phase period and they may be determined depending on the margin of the processing time of the control system. Furthermore, after phase periods θ0 and θ1 are referred to and phase difference information (Is0/Is1) is thus detected, phase periods θ1 and θ2 may be referred to to calculate phase difference information (Is2/Is1) to allow rapid detection of phase difference information.

Figure 6:
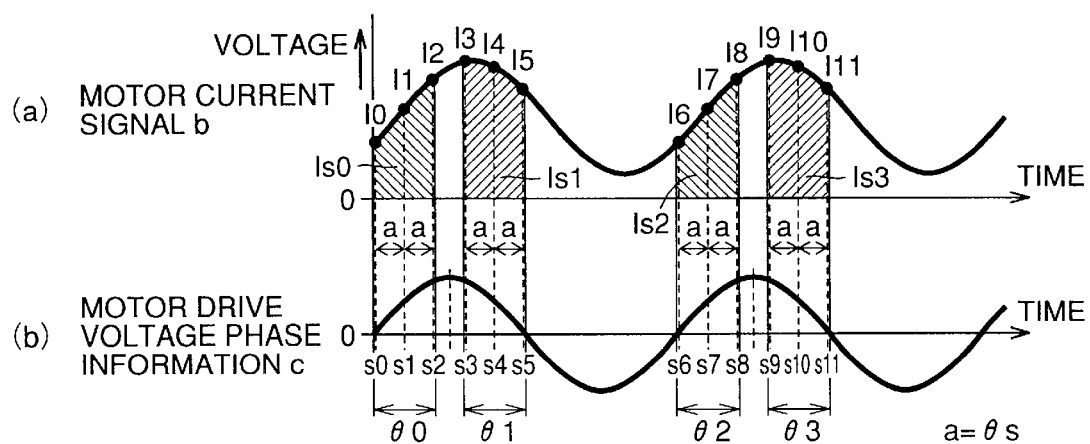
FIG. 6 represents a motor current waveform and a timing of sampling the motor current in the first embodiment of the present invention.

A timing of sampling a motor current or a timer interrupt value can be set in a manner simplified as described e below:

FIG. 6(a) is a waveform diagram of motor current signal h and FIG. 6(b) is a waveform of motor drive voltage phase information c. In FIG. 6, the motor current is sampled three times in each of phase periods θ0 and θ1 predetermined with reference to motor drive voltage phase information c. It should be noted that in each phase period the current is sampled at a timing having the same value or a sampling period θs=a. In other words the motor current is sampled at the same intervals.

Figure 7A:
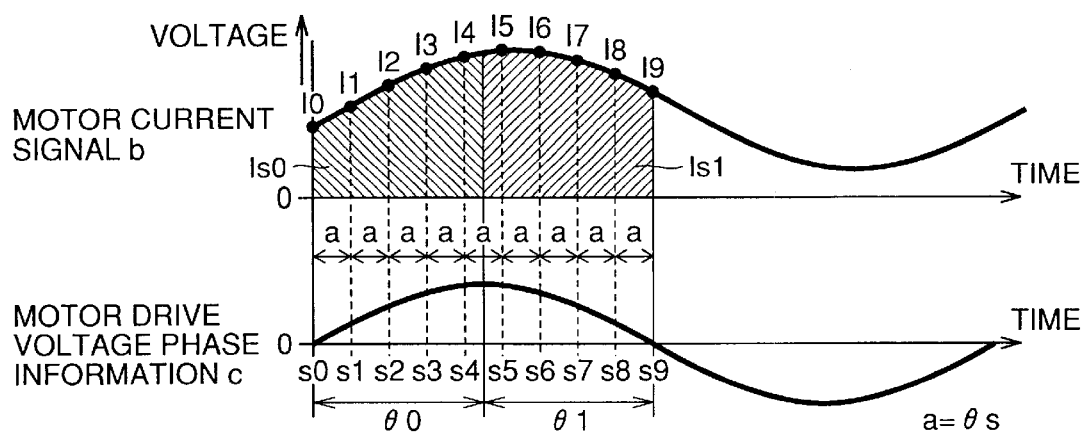
FIGS. 7A and 7B represents a motor current waveform and a timing of sampling the motor current in the first embodiment of the present invention.

Once θs is calculated at the start of each phase period, as described above, thereafter for a timer interrupt value the current timer count value θs may be simply added. A fixed timing obtained as above can reduce the load of setting a sampling timing at SP12 or that of the calculation of a timer interrupt value. A sampling timing and two phase periods can be set effectively, as will now be described below:

FIG. 7A is wave diagrams when a motor voltage phase has a first phase period corresponding to a motor voltage phase of 0° to 90° and a second phase period corresponding to 90° to 180°. Furthermore, each sampling timing is set to sample the current n times at equal phase intervals of s=a (in FIG. 7A, five times each, for a total of ten times). Furthermore, phase difference information, for θ0 as motor current signal area Is0, is obtained by the following accumulation:

I0+I1+I2+I3+I4.

Furthermore, for θ1, motor current signal area Is1 is obtained by the following accumulation:

I5+I6+I7+I8+I9.

Furthermore, the ratio between the motor current signal areas (Is0/Is1) is calculated. The process is as shown in FIGS. 5A and 5B.

Thus, as described above, a sampling timing in a phase period and that in another can be symmetrical in phase with respect to a motor voltage phase of 90° to facilitate designing the control. Furthermore, the motor current can be sampled over two phase periods at a timing equidistant from another to further reduce the load of setting a timer interrupt value.

Figure 7B:
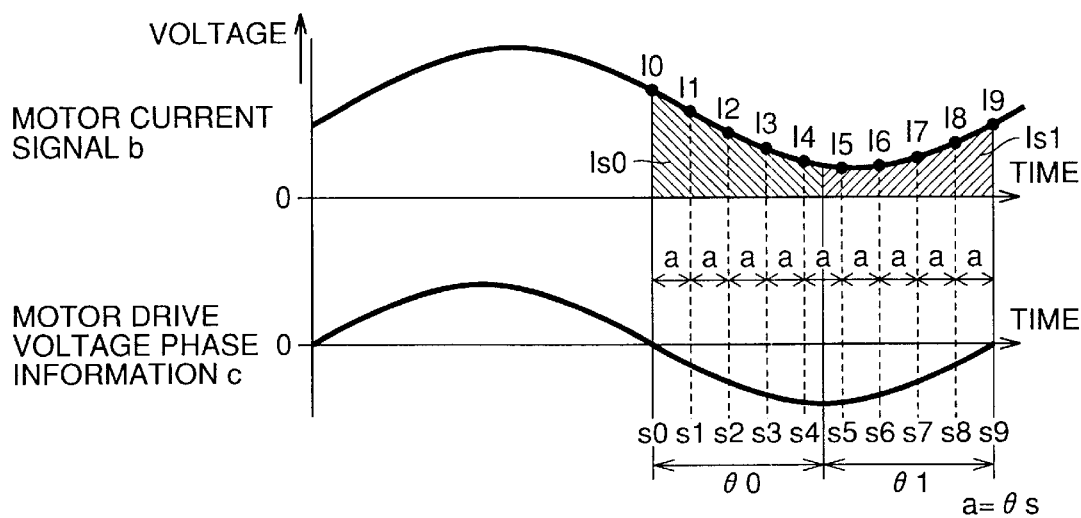

FIG. 7B represents a sampling timing when another phase of interest is set, i.e., with a motor voltage phase of 270° serving as the center a first phase period is set at a motor voltage phase of 180° to 270° and a second phase period is set at 270° to 360°. Needless to say that this example is also as effective as described with reference to FIG. 6(a).

Furthermore, combining FIGS. 7A and 7B processes, sampling the current at the constantly same phase intervals θs=a° and detecting both of the phase difference information from FIG. 7A and that from FIG. 7B to provide control, can also reduce the time required for detecting the phase difference information to achieve an enhanced control capability.

It should be noted however that the phase difference information in the 0° to 180° period in FIG. 7A and that in the 180° to 360° period in FIG. 7B are opposite in polarity, so that either one of the phase difference information must be inverted in polarity when it is used. In this scenario, sampling interval θs is calculated in a manner described below, wherein, as has been described above, the motor rotates once for two periods of a sine wave, the motor has a rotation rate of 3000 rpm, a current-sampling timer counts with a resolution of 1 μsec and the current is sampled n times in each of two phase periods for a total of ten times.

Since the motor voltage has a sine wave period T of 100 Hz, the phase period of 0° to 180° requires a time period of 5 msec and in this period ten sampling operations are performed. Since there are nine intervals between the sampling operations, one sampling interval is obtained as follows:

5 [msec]/9=0.55 [msec].

Thus, a timer interrupt value can be determined as follows:

0.55 [msec]/1 [μsec]=555.

That is, an interrupt value can be set simply by adding 555 to the current timer value at one time.

It should be noted that in the first phase period the first sampling operation s0 is adapted to be performed simultaneously with the start of the first phase period. This can be achieved simply by calculating from the current rotation rate instruction at which time point the first phase period will start, or by exploiting the fact that a sine wave output in effect delays, as will be described later.

In each phase period, sampling rate n is set, as described below.

Figure 8:
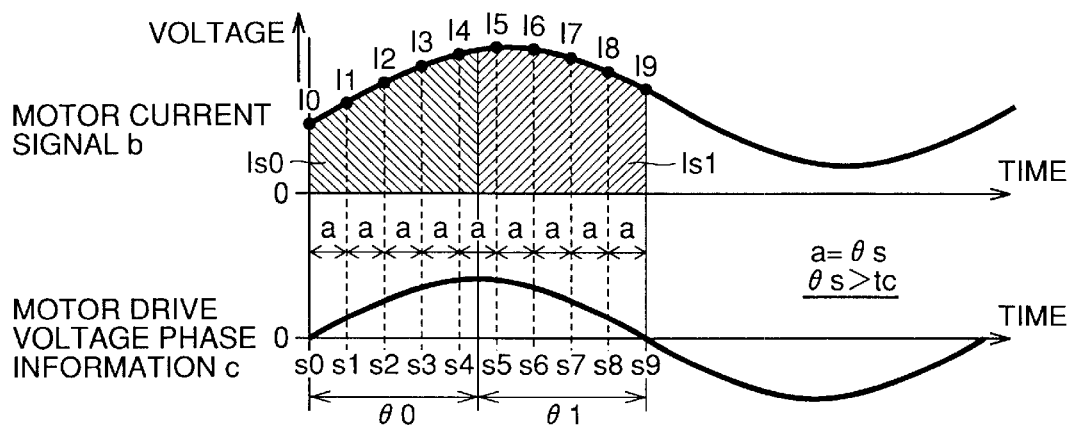
FIG. 8 represents a motor current waveform and a timing of sampling the motor current in the first embodiment of the present invention.

FIG. 8, similar for example to FIG. 4, shows how a phase difference is detected. Herein, sampling interval θs is adapted to be larger in value than a processing time tc of microcomputer 7. Processing time tc is a time period required for the FIGS. 5A and 5B processes and the PI control required for phase difference control, and the PWM creation, and the like.

The PI control and PWM creation processes and the like are often provided as an interrupt routine (hereinafter referred to as a "control interrupt routine") for each PWM carrier and in this control interrupt routine the phase difference detection process and the like are interrupted. As such, if a sampling operation is performed in a period shorter than the time period required for executing, e.g., the FIGS. 5A and 5B phase difference detection routine and the control interrupt routine, then current sample data would not completely be read, which would then prevent a phase difference from being detected accurately and the motor can stop disadvantageously. This, however, can be prevented by grasping control process time tc and reducing sampling rate n to detect a phase difference when control process time tc is shorter than sampling interval θs.

Control process time tc may be various processes'times that are measured and thus obtained previously at an experimentational level or when the device is shipped, and stored in memory. Alternatively, it may be obtained by measuring the time of each process when the device is started. Alternatively, it may also be obtained by reading during each process a timer count value obtained when the process starts and that obtained when it ends and detecting the difference therebetween.

Then, if sampling interval θs calculated as above would be shorter than control process time tc, then in calculating sampling interval θs sampling rate n may be reduced to provide sampling interval θs larger than control process time tc. Since sampling interval θs is proportional to the motor's rotation rate, a sampling rate depending on a rotation rate to allow a sampling interval θs to be larger than control process time tc may be previously stored and depending on a rotation rate a sampling rate may be called to set a sampling timing. It is not necessary to strictly determine a sampling rate for each rotation rate. For example, an approximate sampling rate may be used, such as ten times for 3000 rpm or therebelow, eight times for 3000 rpm to 5000 rpm, and the like. This process is provided in FIG. 5A at SP1. As such, using an inexpensive controlling microcomputer would not result in a process overflow to disadvantageously stop the motor. This ensures that the motor operates reliably.

A motor voltage phase can be detected with higher resolution to detect a phase difference with high precision, as described below.

Figure 9:
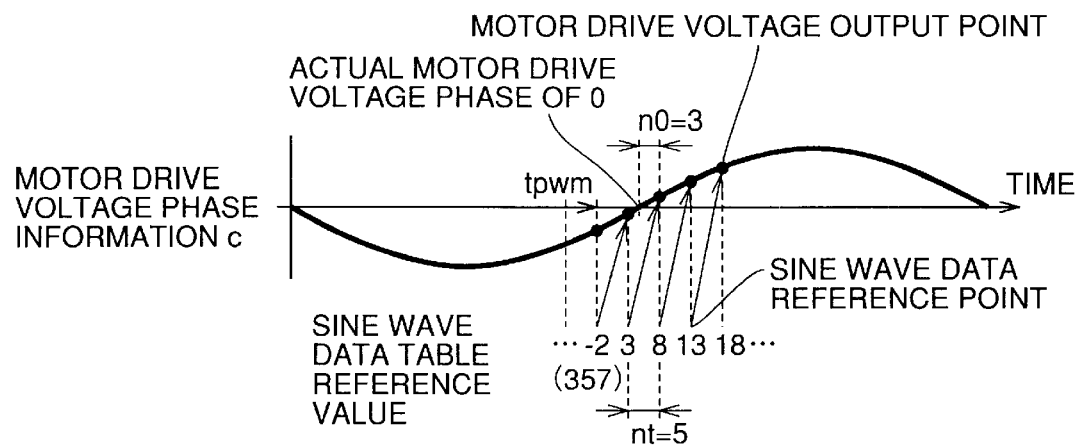
FIG. 9 represents a timing of a sampling operation in the first embodiment of the present invention.

FIG. 9 represents a motor voltage waveform (with sine wave PWM data represented in a sine-wave waveform), and a reference address value of a sine wave data table updated for each PWM carrier period. As shown in FIG. 9, a PWM duty is set for each PWM carrier period tpwm, although in updating it a value in sine wave data table 13 that is to be a phase of zero can be skipped depending on the rotation-rate instruction. Controlling microcomputer 7 detects a reference phase of a motor voltage phase when a reference address value in sine wave data table 13 that is set thereby passes through 0. As such, if the reference address value skips 0 the motor voltage phase would not be obtained accurately, resulting in an error in detecting a phase difference.

This can be effectively prevented by referring to a reference address value of sine wave data table 13 having exceeded zero (in FIG. 9, three), to calculate when a motor voltage phase of zero has in effect been attained, to correct a reference motor-voltage phase.

A reference motor-voltage phase can be corrected under a condition that a reference time point of sine wave data table 13 (in FIG. 9, a sine wave data reference point) precedes an actual sine wave output waveform (in FIG. 9, a motor drive voltage output point) by one period of the PWM carrier, considering that the PWM generator requires a period of time after a PWM waveform duty is set and before according to its period a PWM waveform is output, and that, with a voltage output by the exact PWM waveform that is divided in time in the form of high/low time width (or duty width), the actual PWM output is seen in a sine-wave waveform (as shown in FIG. 9).

More specifically, if under the above condition a reference address value exceeding zero is detected, with the actual PWM output seen as a sine-wave waveform, a phase of zero is subsequently passed through. As such, if a reference address value has already exceeded zero, in the actual reference motor voltage phase of 0° still can be detected. As such, a reference motor-voltage phase can be accurately set and corrected.

More specifically, in setting and correcting a reference phase, for each PWM carrier period a reference address value of a sine wave data table is updated (increased) by nt, although for that having attained no less than zero is updated by a value of n0, and the PWM carrier period is represented by tpwm.

Furthermore, if a reference address value no less than zero has a value of zero, the actual output exceeds exactly by one period of the PWM carrier. Thus, when PWM carrier period tpwm elapses from the reference address value of zero a reference motor-voltage phase of zero is attained. As such, it does not need to be corrected.

If a reference address value no less than zero has a value other than zero, then an actual reference motor-voltage phase of 0° arrives after a reference address value no less than zero has been attained and before PWM carrier period tpwm elapses. In this scenario, it is corrected by the following calculation:

$$tpwm-(n0/nt*tpwm).$$

Setting a reference motor-voltage phase of 0° when tpwm−(n0/nt*tpwm) elapses after a reference address value no less than zero has been attained, would prevent a reduction of a motor voltage phase resolution attributed to a PWM carrier period. Thus, high-precision detection of phase difference information and high-precision phase difference control can be achieved.

The reference motor-voltage phase of 0° can also be obtained accurately by exploiting the fact that a point at which a reference address value no less than zero is attained is obtained from the current rotation-rate instruction. Exploiting this fact, before a reference address value attains zero nt and n0 may be evaluated and when the address value is that immediately preceding zero the correction as described above may be provided to obtain a reference motor-voltage phase of zero accurately. Although this technique requires recorrecting a reference phase when the motor's rotation rate changes, it still can be as effective as described above. It should be noted that with this technique a reference phase can be corrected if any PWM output unit, whether having an output delayed, is used, regardless of the aforementioned condition that a reference time point of sine wave data table 13 precedes an actual sine wave output waveform by one period of a PWM carrier.

A description will now be made of a technique allowing phase difference information to be detected with higher precision. In this technique, m phase difference information detected are averaged and thus provided as true phase difference information to reduce an error in detecting phase difference information.

Figure 10:
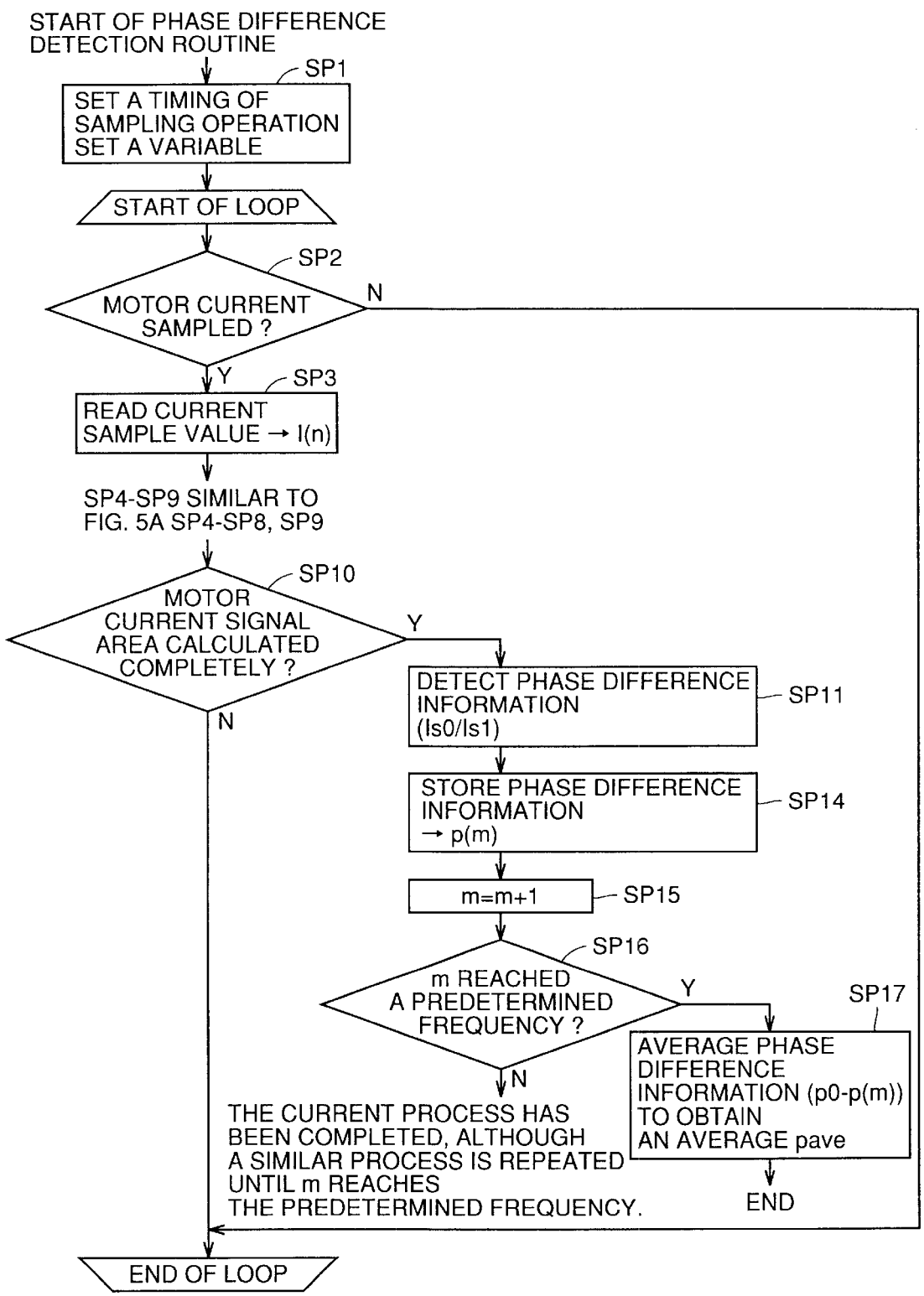
FIG. 10 is a flow chart of an operation of a second embodiment of the present invention.

FIG. 10 represents the above process in the form of a flow chart of a phase difference detection routine. In the figure, SP1 to SP11 will not be described as they are similar to those of FIG. 5. It should be noted, however, that in the variable initialization at SP1 a variable m is reset to zero.

At SP14, detected phase difference information is stored at P(m). At SP15, an averaging frequency m is incremented by one. At SP16, control determines whether the averaging frequency has reached a predetermined frequency and if not then the loop process is once completed although a process similar to that aforementioned is repeated until m reaches the predetermined frequency. At SP17, with an averaging frequency assumed to have reached the predetermined value, phase difference information p0, p1, . . . , p(m) are averaged to calculate averaged phase difference information pave. Thus the process is completed.

Figure 11:
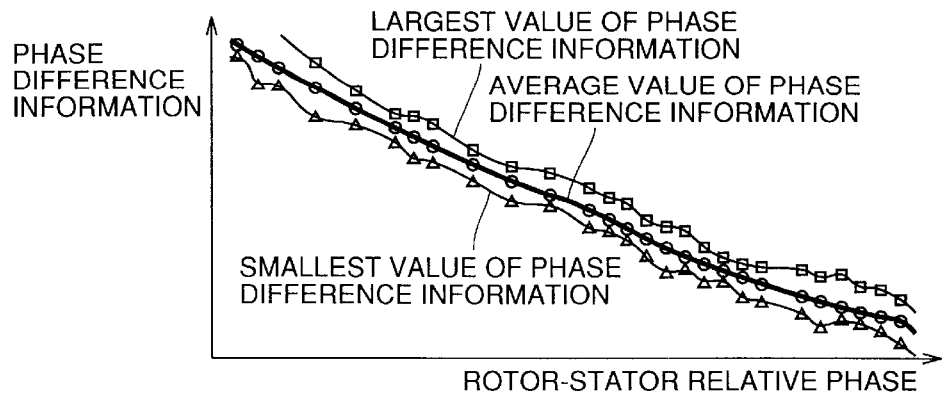
FIG. 11 represents a result of an experiment in the second embodiment of the present invention, a graph of phase difference information versus rotor-stator relative phase.

FIG. 11 is a graph of phase difference information versus rotor-stator relative positional relationship as measured with an encoder when a motor is actually driven and averaged phase difference information are used to perform the phase difference control according to the present embodiment. In the experiment, a noise of DC to 3 kHz is superimposed on a motor current signal.

In FIG. 11, a characteristic represented with circles is that of phase difference information averaged as described above (with an averaging frequency of ten), that represented with squares is that of the largest one of the ten phase difference information, and that represented with triangles is that of the smallest one of the ten phase difference information. It should be noted that the motor had a rotation rate of 1000 rpm and a torque of 15 kgfcm.

It can be seen that however resistant to noise a phase difference control method is, in environments with large noises a range such as from the phase difference information represented with the squares to that with the triangles would associate phase difference information detected. Averaging phase difference information in accordance with the present invention can prevent noise from having negative effect on detecting phase difference information accurately, as shown in the FIG. 11 characteristic represented with the circles. Thus a higher resistance to noise can be achieved. Thus, phase difference information can be detected with high precision and a phase difference control can be achieved with high precision and hence the motor can operate more efficiently. Furthermore, an erroneous detection resulting from a distortion of a motor current can also be prevented so that a phase difference can be detected with high precision.

Figure 12A:
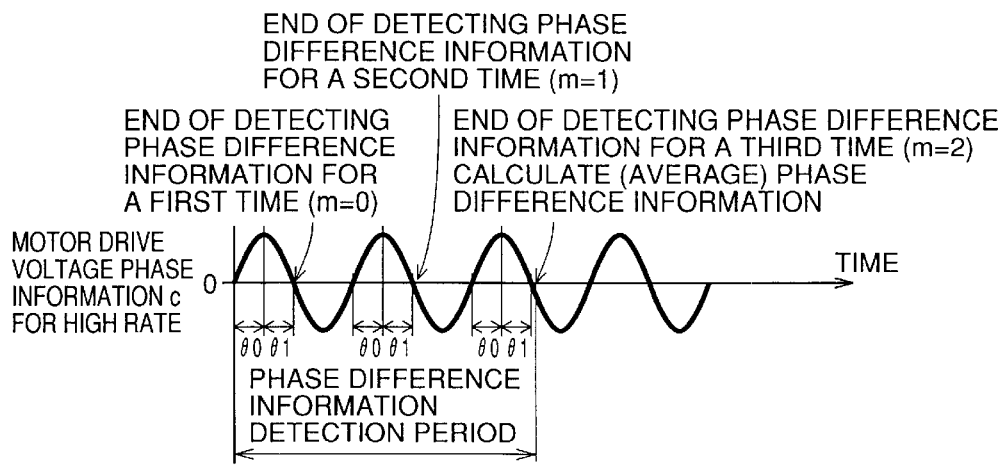
FIGS. 12A and 12B represents a timing of a sampling operation in the second embodiment of the present invention.
Figure 12B:
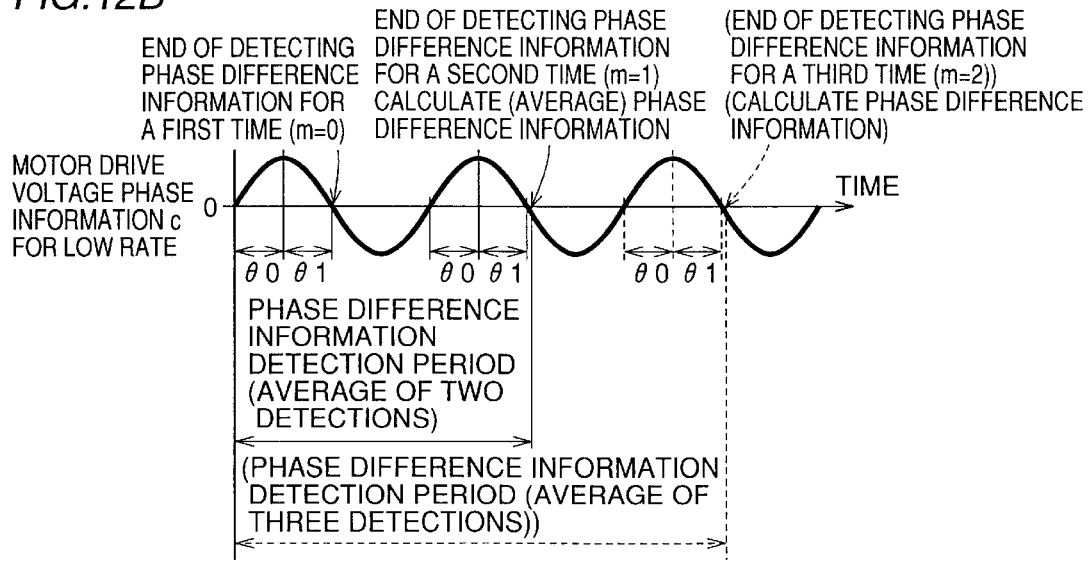

Phase difference information are averaged in order to prevent phase difference information from being erroneously detected due to noises or motor-current distortions, and averaging frequency m may be set for an amount of erroneous detection to fall within a desired specification. Averaging frequency m is effective if it is obtained as described below:

FIGS. 12A and 12B represent detection of phase difference information for a high motor rotation rate and a low motor rotation rate, respectively.

It can be seen that regardless of the rotation rates, with averaging frequency m fixed (at three in the FIGS. 12A and 12B examples), for a low rotation rate it requires a long period of time before phase difference information is detected once. More specifically, for a low rotation rate, a phase difference variation is detected at long intervals and a rapid phase-difference variation component or the like can thus not be detected. This means that the component cannot be restrained with phase difference control. As such, a phase difference variation would result and the motor would not be driven effectively. Furthermore, a product and device specification must be observed that in controlling a motor an external load variation (referred to as "disturbance" hereinafter) should not cause a controlling error exceeding a predetermined value. If a phase-difference variation is detected at longer intervals then disturbance would be restrained at a reduced rate and such specification would not be satisfied.

Furthermore, if a phase difference information is detected in an increased period of time, it would also be converged at a target phase difference in an increased period of time. Since there is also a targeted specification for this convergence, it is possible that phase difference information cannot be converged to a predetermined phase difference within a targeted period of time.

As such, in the present invention, phase difference information averaging frequency m is increased (to three in FIGS. 12A and 12B) when the motor rotates at a high rate, a phase difference information is detected in a short period and a phase difference variation component can be satisfactorily detected, and average frequency m is reduced (for example to two) when the motor rotates at a low rate, phase difference information is detected in a long period and a phase difference variation component cannot be detected, to prevent a phase-difference detection period from being increased when the motor rotates slowly.

Averaging frequency m may be set to any value to allow a variation component desired to be restrained (with a compressor, a load variation component produced at a cycle period) to be sufficiently detected and also controlled, and furthermore to allow phase difference information to be converged within a predetermined period of time. It should be noted that averaging frequency m can be readily set by referring to a table corresponding to a rotation rate.

The phase difference control has PI operation unit 11, as described below.

Figure 13A:
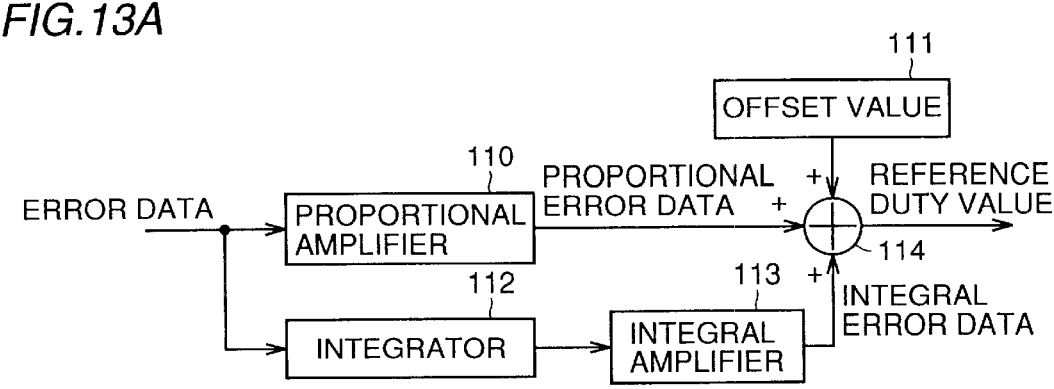
FIGS. 13A and 13B is a block diagram showing a configuration of a PI operation unit in the second embodiment of the present invention.
Figure 13B:
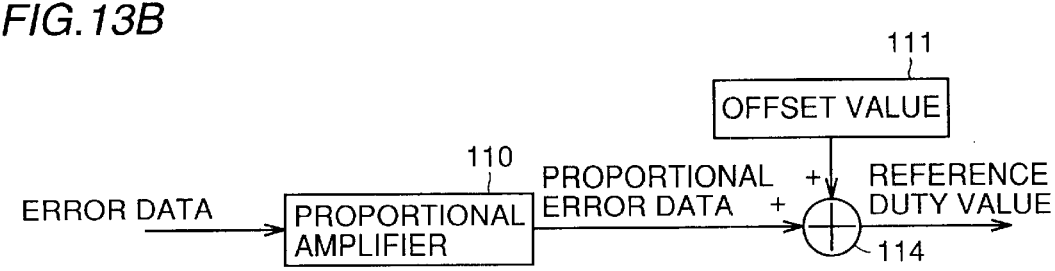

FIG. 13A is a block diagram showing a configuration of a reference duty value calculation through a PI operation, and FIG. 13B is a block diagram showing a configuration of only a normal P control.

Herein, the P control represents a proportional control providing a predetermined amplification to error data as compared to a target and an I control means an integral control, accumulating error data to create integral error data and amplifying it as predetermined for control.

In the PI control the P control and the I control are provided in parallel and added together. As shown in FIGS. 13A and 13B, normally an offset value is added to a result of the operations of the controls to output a reference duty value.

As shown in FIG. 13B, the P control is characterized in that it may be configured of a reduced number of components and thus simply, although it is disadvantageous as in principle the convergence at a target value, (for the present phase difference control, to a target phase-difference information) cannot be achieved. Since the P control and the PI control have been described in detail in various documents, herein they will now be described simply in conception using specific numerical values.

If in order to converge phase difference information at target phase difference information a reference duty value of 100, an offset value (111) of 80 and a proportional amplifier 110 having a gain of ten are applied, the desired reference duty value of 100 minus the offset value of 80, i.e., the remaining 20 must be produced with a proportional error data obtained by amplifying error data. To do so, with the proportional amplifier's gain considered, error data of two would be required. Error data is a difference between actual phase difference information and target phase difference information and it will thus be zero when phase difference information has converged at a target value. However, if it is zero the desired reference duty value of 100 would not be output. Thus, with the P control only, a phase difference would not have its residual portion attaining zero.

By contrast, in the PI control shown in FIG. 13A, the P control creates proportional error data for error data when necessary, as described above, and the I control uses an integrator 112 to calculate an integral value of error data (digitally, accumulate error data when necessary) to create integral error data. Herein, integral error data is 20, which is obtained in an integral amplifier 113 amplifying a steady-state deviation of error data, which is two in the above. Since the integral error data is obtained through integration, it is held after error data has converged at zero. Thus error data of zero can be provided. In other words, phase difference information can converge at target phase difference information.

Herein, if a counter-electromotive force is applied to drive a motor the motor's rotation rate is obtained from a pulse of the counter-electromotive force and controlled to control the motor's speed. By contrast, a conduction timing can be detected from a counter-electromotive force. Thus, a substantially constant conduction timing can be obtained regardless of rotation rate. As such, if the motor speed is controlled simply by the P control, the motor's rotation rate cannot be controlled with precision, although a conduction timing, which affects efficiency, is uniquely determined by a counter-electromotive force.

However, if the phase difference control of the present invention is provided simply by the P control, as shown in FIG. 13B, error data of a phase difference would remain and, for the worst case, conduction is made in a brake torque region, as has been described above, and the motor can stop.

To avoid this, a PI control is required, as shown in the FIG. 13A configuration, and in controlling a phase desirably a PI control operation is performed. Thus, high precision phase difference can be achieved and phase difference information can converge at a target phase information accurately. Thus, the motor can be driven efficiently.

Target phase difference information is optimally set, as described below.

As has been described above, phase difference information and a stator-rotor value in their relative positional relationship have a substantially proportional relationship therebetween. Furthermore, a motor's efficiency varies with a timing of conduction with respect to a stator-rotor relative positional relationship and an optimal timing of conduction exists depending on a condition for the motor rotation, and if such timing of conduction is not achieved the motor's efficiency would be reduced. The timing of conduction allowing optimized efficiency varies with the condition for the motor rotation.

Furthermore, as has been described above, in the phase difference control of the present invention a Stator-rotor relative positional relationship is detected indirectly from phase difference information of a motor current relative to a motor voltage phase. As such, optimal phase difference information exists depending on a condition for the motor's rotation and diverting from the phase difference information would result in the motor operating less efficiently.

Figure 14:
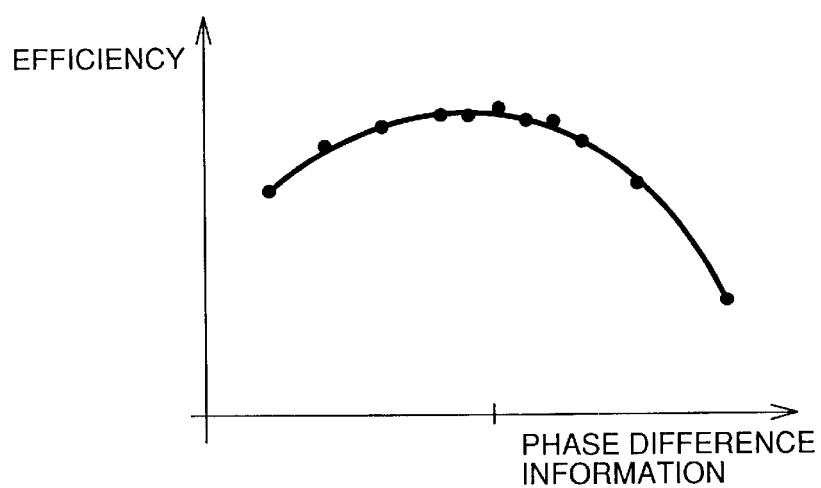
FIG. 14 represents a result of an experiment in the second embodiment of the present invention, a graph of efficiency versus phase difference information.

FIG. 14 is a graph of efficiency versus phase difference information as a result of an experiment when a motor is driven and controlled by the phase difference control in accordance with the present invention. It should be noted that the motor had a rotation rate of 3000 rpm and a torque of 15 kgfcm.

As shown in the figure, the motor is driven less efficiently as phase difference information is offset rightward or leftward from its peak phase difference information. As has been described above, the value of the phase difference information allowing the motor's efficiency to be maximized varies depending on a condition for the motor's rotation.

Furthermore, as has been described above, in the present invention a motor current area is detected, although a motor current waveform can be distorted depending on a condition for the motor rotation and it is possible that if an actual phase difference is zero two phase periods do not achieve a motor current area ratio of one. As such, to drive a motor efficiently, the condition for the motor's rotation should be referred to to set target phase difference information to be phase difference information achieving maximized efficiency. In the present invention, a motor's rotation rate is referred to to set target phase difference information. As such, if the motor is rotated under different conditions it still can be constantly driven with maximized efficiency.

It should be noted that previously storing target phase difference information for different rotation rates in the form of a table with rotation rate as a parameter can simplify the process.

Figure 15:
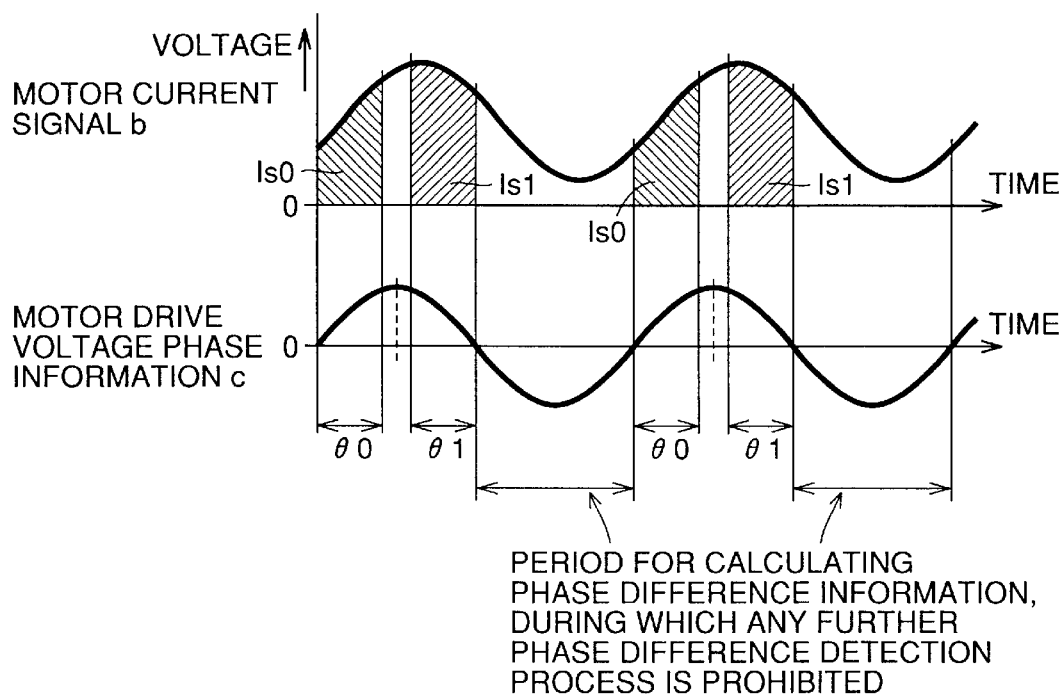
FIG. 15 represents a timing of a sampling operation in the second embodiment of the present invention.

In the phase difference control in the present embodiment, as has been described above, phase difference information calculated corresponds to a ratio between motor current signal areas. This requires a division or an operation for averaging phase difference information. Microcomputers used nowadays have their processing times reduced and are thus not particularly disadvantageous. However, if an inexpensive, low-performance microcomputer is used, the time for an operation required for the division would be a heavy burden. Accordingly the whole microcomputer's process would overflow and would thus be inoperable. However, this can be prevented, as shown in FIG. 15, by sampling a motor current in two phase periods at a predetermined sampling rate and thereafter intentionally providing a time period for detecting phase difference information (or calculating an area ratio) and a time period for performing an operation to average phase difference information while preventing the phase difference detection process from being further performed during those time periods.

Providing a time period for performing such operations as above allows even an inexpensive low-performance microcomputer to provide the phase difference control in accordance with the present invention. Thus, a control system can be reduced in cost. Furthermore, the phase difference control of the present invention can in general be effectively configured in the following manner.

FIG. 16 is a table of items processed in accordance with a control program processed by a controlling microcomputer acting as a main component of the phase difference control of the present invention.

In FIG. 16, the main loop is executed when any interrupt is not serviced. In the loop, an acknowledgement is made of an instruction issued to stop/drive a motor's rotation and, as shown in FIGS. 5A and 5B and 10, phase difference information is detected. The PWM interrupt is serviced for each PWM carrier period and for each, sine wave data is referred to, a reference motor-voltage phase is detected, a timing at which a current is sampled is calculated, the PI operation is performed, and an output duty is set.

Furthermore, the timer interrupt service starts with comparing an interrupt value set by a timing of the current-sampling operation with a timer value for their match. The timer interrupt service provides an instruction to start a sampling operation, as shown in FIG. 4(b), and sets a timing of a subsequent sampling operation. It should be noted herein that in the present invention the phase difference detection process is provided in the main loop.

As has been described above, detecting a phase difference entails a time-consuming operation, such as the division as aforementioned. As such, if this phase difference detection process is performed in an interrupt routine then other interrupt services would be forced to wait before they are serviced. This would prevent a duty from being set accurately and a sampling operation from starting as timed accurately. As such, control would be degraded in performance and the motor would hardly be driven in stable manner.

Accordingly, in an embodiment of the present invention, as shown in FIG. 16, an operation and detection unit's process with a time-consuming operation may be performed in a main loop to implement precision phase difference control without degrading the control's performance.

Figure 17:
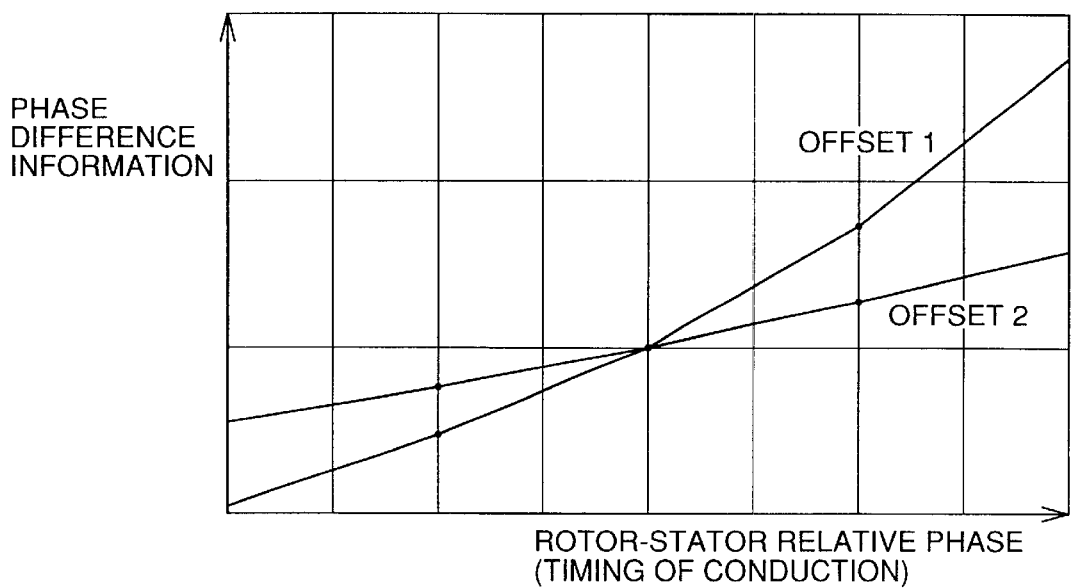
FIG. 17 is a graph of phase difference information versus relative positional relationship between a motor's stator and rotor in a variation of the second embodiment of the present invention.

Phase difference control can be achieved with higher precision if the phase control unit PI operator 11 sets a control gain for each amplifier, as described below:

FIG. 17 is a graph of phase difference information versus relative stator-rotor positional relationship, i.e., timing of conduction, for different amounts of offset superimposed on a motor current signal. As shown in FIG. 17, it can be seen that simply changing an amount of offset would result in the characteristic varying in gradient. That is, if a motor drive voltage (a PWM reference duty value) is changed by a fixed amount and a timing of conduction is thus changed, there would appear in phase difference information detected an amount of variation varying depending on the amount of offset superimposed on the motor current signal.

As has been described above, the phase difference detection of the present embodiment employs a current area. An amount of offset is a steady-state value irrelevant to a phase difference with respect to a current area, so that a phase difference variation of a motor current area would vary the sensitivity of a control system and a phase difference would thus be caused. For example, with a large amount of offset, there hardly appears an exact variation of a motor current area that is attributed to a variation of a phase difference and as a result phase difference information would have a variation detected less than should be.

This means that in the phase difference control a control system has a gain that would vary with the amount of offset superposed on a motor current signal. As such, the control system's oscillation might stop the motor and an insufficient control gain might increase a variation in a phase difference.

To achieve high-precision control and drive a motor in stable manner with an appropriate control gain, desirably the control gain is variably set depending on the amount of offset. In the embodiment of the present invention a control gain may be variably set depending on the amount of offset.

It should be noted that to detect an amount of offset, a motor current signal of one period may be sampled and the sampled values may be averaged to obtain the amount of offset or an offset set value of motor current detection and amplification unit 6 may be used to obtain the amount of offset. To in effect set a control gain variably, a value obtained experimentally with an amount of offset used as a parameter may be stored in memory and a value closest to the current amount of offset may be set as the control gain, or a gain expression with an amount of offset applied as a variable may be calculated when necessary to set the control gain.

It should be noted that since once an amount of offset is initially set it is hardly be changed, there would also be a case where it may be only initially detected to set a control gain.

Thus, a high-precision control can achieved and a motor can be driven in stable manner with an appropriate control gain.

Figure 18:
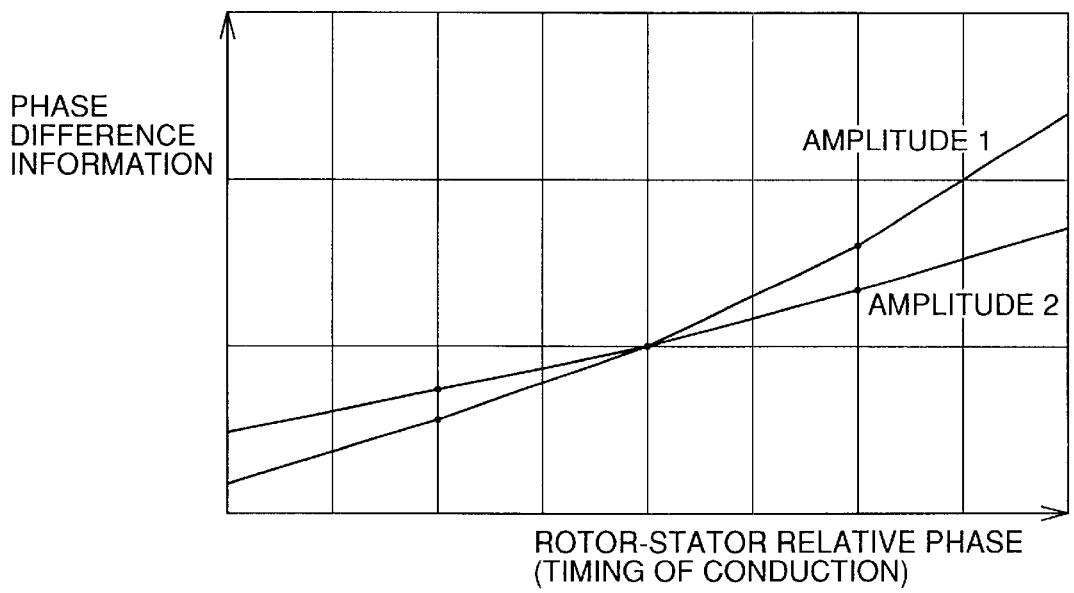
FIG. 18 is a graph of phase difference information versus relative positional relationship between a motor's stator and rotor in a variation of the second embodiment of the present invention.

FIG. 18 is a graph of phase difference information versus absolute motor-stator value, i.e., timing of conduction, with a motor current signal varied in amplitude. As shown in FIG. 18, it can be seen that when a motor current signal simply varies in amplitude the FIG. 8 characteristic varies in gradient. This means that if a motor drive voltage (a PWM reference duty value) is varied by a fixed amount and a timing of conduction is thus changed, there would appear in phase difference information detected an amount of variation varying depending on the motor current signal's amplitude.

As has been described above, the phase difference detection of the present embodiment employs a current area. A motor current signal's amplitude is a value which determines an amount in variation of a phase difference with respect to a current area, so that a phase difference variation of a motor current area would vary the sensitivity of a control system and a phase difference would thus be caused. For example, for a large amplitude, when a phase difference has a variation a motor current area would have an amount of variation amplified and as a result phase difference information would have a variation detected to be larger than in effect is.

This means that in the phase difference control a control system has a gain varying with the amplitude of a motor current signal, and when the control system oscillates the motor might stop and if the control gain is insufficient a phase difference might vary significantly. As such, to apply an appropriate control gain to provide high-precision control and drive a motor in stable manner, desirably the control gain is variably set depending on the amplitude. In the present embodiment the control gain may be variably set depending on the amplitude.

Since a motor current varies depending on a condition for the motor's rotation applied, an amplitude may be best detected from the difference between the largest and smallest values of a motor current signal sampled for one period thereof, although it may also be obtained from a gain set value in motor current detection and amplification unit 6.

To in effect variably set a control gain, a value experimentally obtained with an amplitude applied as a parameter may be stored in memory and a value closest to the current amplitude may be set as the control gain, or a gain expression with an amplitude used as a variable may be calculated when necessary to set the control gain. In this example also, once an amplitude is initially set it would hardly be changed. As such, there may be a case where it may be detected only initially to set a control gain.

Thus, an appropriate control gain can be used to achieve high-precision control and drive a motor in stable manner.

While a motor current signal's amplitude varies a gain of a control system, it is also effective if the amplitude is controlled to have a fixed value to maintain the control gain unchanged.

Figure 19:
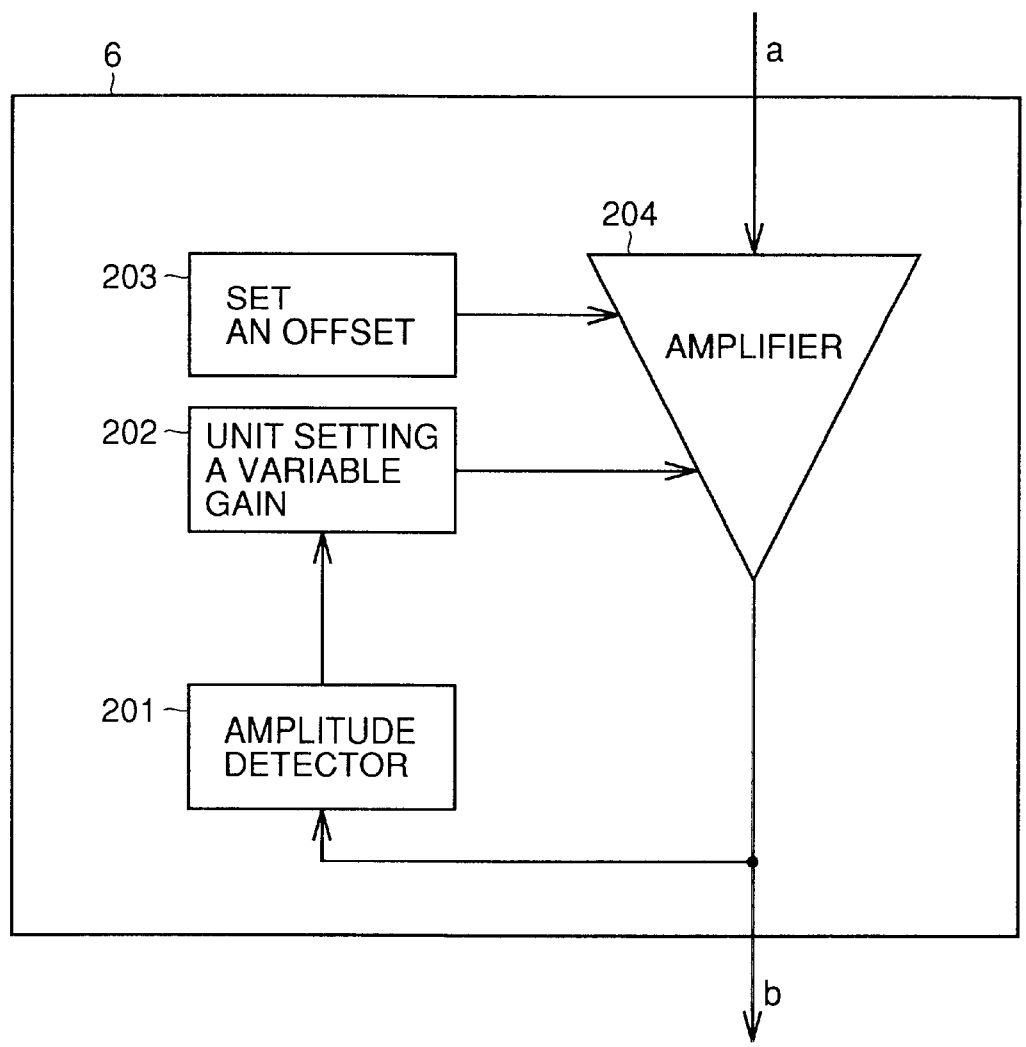
FIG. 19 shows a configuration of a motor current detection and amplification unit in a third embodiment of the present invention.

FIG. 19 shows a configuration of such a motor current detection and amplification unit as described above. In the figure, an offset setting unit 203 set an offset, an amplitude detector 201 detects an amplitude of motor current signal b, and a variable-gain setting unit 202 sets an appropriate gain to fix the detected amplitude to have a constant value. Such a configuration can also provide an appropriate control gain to achieve high-precision control and drive a motor in stable manner.

In the above phase difference control, phase difference information can be detected at a faster timing to detect phase difference information more frequently for one rotation of the motor to detect phase difference information with high resolution to achieve a high-precision control, as described below.

Figure 20:
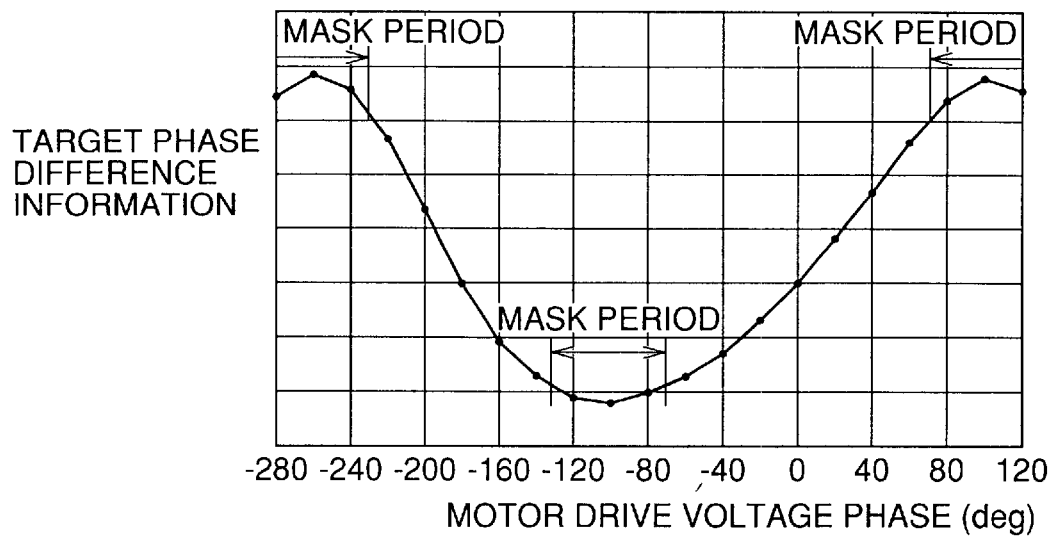
FIG. 20 is a graph of target phase difference information versus motor drive voltage phase in a variation of the third embodiment of the present invention.

FIG. 20 represents a characteristic of target phase difference information for setting a phase difference of zero for each motor drive voltage phase, with motor current signal h having an amplitude and offset set in value as desired.

While a motor drive voltage phase is changed to create a rotating magnetic field, for the current motor drive voltage phase an appropriate target phase difference information may be set to detect phase difference information at shorter intervals. For example, in FIG. 20 each point corresponds to an electrical angle of 20°. As such, for one period of a sine wave, phase difference information can be detected as much as 18 times. In effect, target phase difference information for each motor drive voltage phase may be stored in memory and a corresponding value may be called when necessary to readily set target phase difference information, although any other techniques may also be used to do so.

In FIG. 20, it can also be seen that there exist motor drive voltage phases with target phase difference information reaching upper and lower peaks. For such motor drive voltage phases, phase difference information detected would have a characteristic in the form of a mountain with a phase difference of zero centered. In other words, whether a phase difference delays or advances, phase difference information would change in the same direction. As such, in such motor drive voltage phases and those therearound a phase difference cannot be detected accurately and in the phase difference control the aforementioned PI control and the like cannot operate.

Accordingly, the present invention in an embodiment provides a masking process to prevent phase difference detection or phase difference control for a specific motor drive voltage phase with a small amount of information on phase variation because target phase difference information reaches an upper peak or a lower peak so that phase difference information cannot be obtained accurately.

This masking process hardly affects the control's performance since it only masks the detection of phase difference information approximately once to three times in a configuration with an increased detection frequency.

Figure 21:
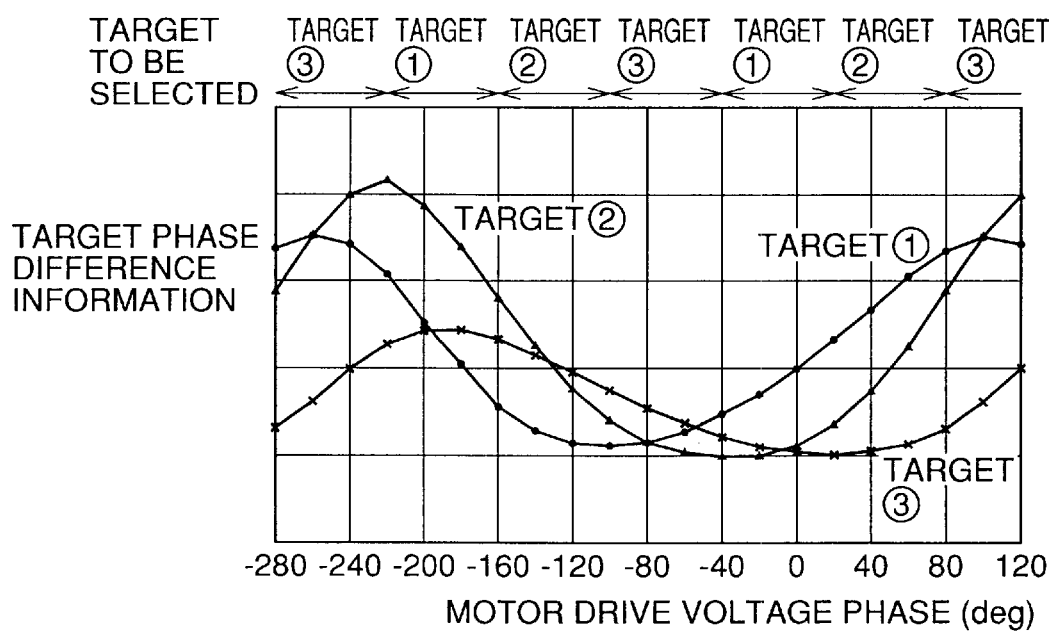
FIG. 21 is a graph of target phase difference information versus motor drive voltage phase.
Figure 22:
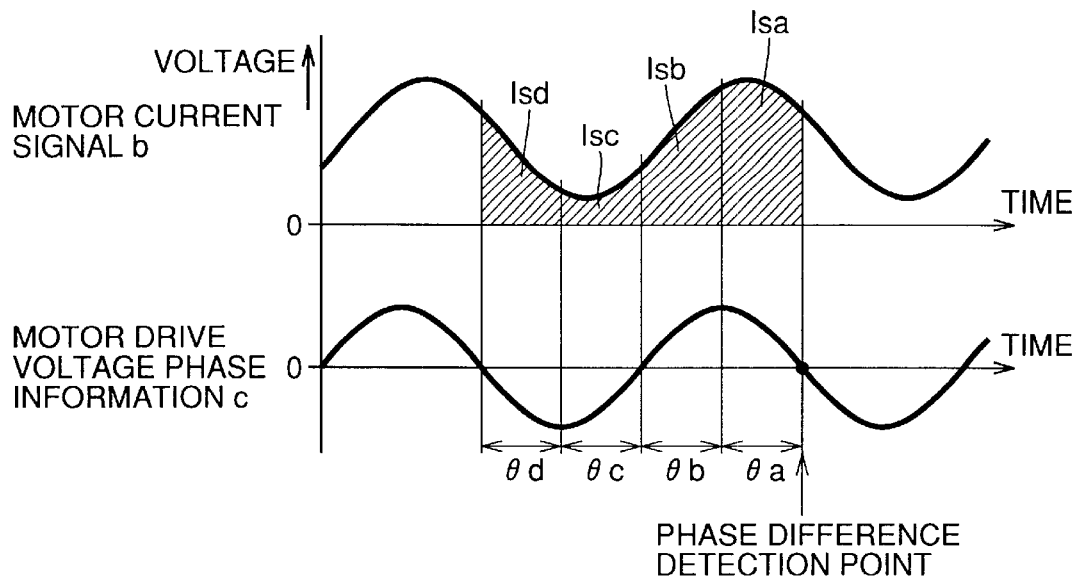
FIG. 22 illustrates an exemplary method of an operation to detect a phase difference in a variation of the third embodiment of the present invention.

FIG. 21 represents a characteristic of target phase difference information for attaining a phase difference of zero for each motor drive voltage phase when a phase difference is detected through a different operation. FIG. 22 is a graph for illustrating an exemplary method of an operation to detect a phase difference.

In FIG. 21, as well as FIG. 20, motor current signal b has an amplitude and offset set as desired. The FIG. 21 method of an operation to detect a phase difference will now be described with reference to FIG. 22. The FIG. 22 operation method is different as it used a different parameter.

With phase difference information detected at a point as shown in FIG. 21, a target ① represents target phase difference information for each motor drive voltage phase when for periods of θb and θa a motor current area ratio of Isb/Isa is calculated to provide phase difference information, i.e., when, with one phase period corresponding to an electrical angle of 90°, a motor current area ratio for adjacent phase periods is used to provide phase difference information. A target ② represents target phase difference information for each motor drive voltage phase when for periods θc and θa a motor current area ratio of Isc/Isa is calculated to provide phase difference information, i.e., when, with one phase period corresponding to an electrical angle of 90°, for two phase periods with another one phase period paused therebetween a motor current area ratio is obtained and used to provide phase difference information. Furthermore, a target ③ represents target phase difference information for each motor drive voltage phase when for periods θd and θa a motor current area ratio of Isd/Isa is calculated to provide phase difference information, i.e., when, with one phase period corresponding to an electrical angle of 90°, for two phase periods with two other phase periods paused therebetween a motor current area ratio is obtained and used to provide phase difference information.

Thus, if an operation method is changed as described above then target phase difference information can also be changed as shown in FIG. 21, and if one targeted characteristic is switched to another whenever necessary to select a targeted characteristic allowing phase difference information to be accurately detected for each targeted characteristic and the operation method is also changed then target phase difference information would not reach an upper peak or a lower peak to result in the control being inoperable. Thus, phase difference information can be accurately detected for any motor drive voltage phase.

It should be noted that for each phase period a motor current area can be readily calculated by accumulating current sample data, as described above. Since a gain varies for each target, desirably it is set whenever a target is switched to another.

Furthermore, it is needless to say that any number other than three of targets may be alternatively used. Two targets may be used as long as a phase difference can be detected accurately. If higher levels of precision are desired then more than three targets may be used to select an optimal target.

It should be noted that the operation method is not limited to the above-described method and may be any methods including for example a configuration with one phase period corresponding to an angle other than 90°.

Figure 23:
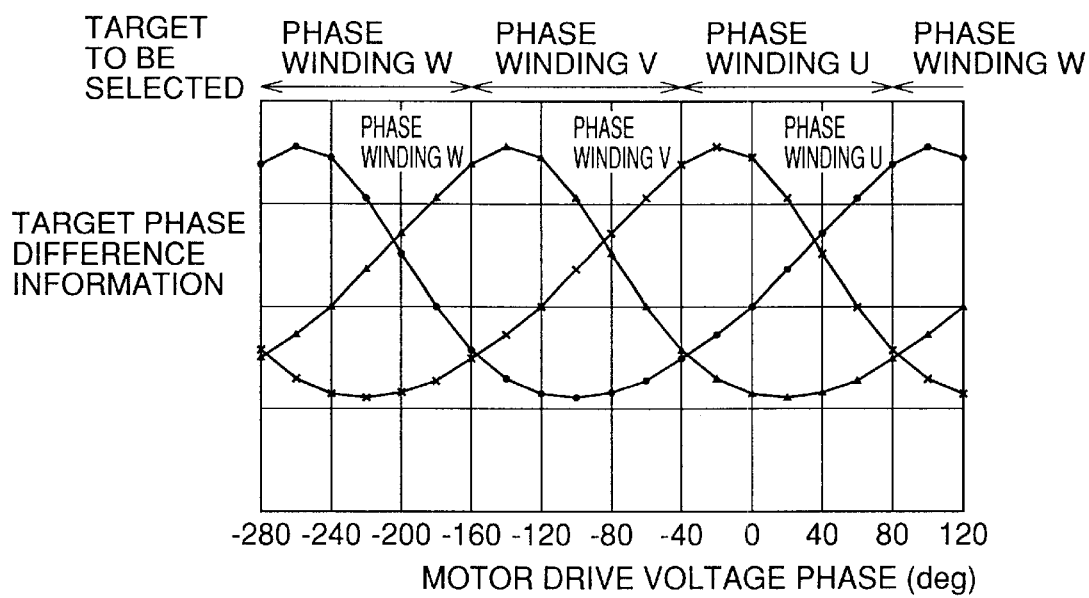
FIG. 23 is a graph of target phase difference information versus motor drive voltage phase.

FIG. 23 represents a characteristic of target phase difference information for achieving a phase difference of zero in each motor drive voltage phase for each of multiple phase windings of a motor coil terminal with current sensor 5 attached thereto to calculate phase difference information for each phase winding.

In this example, as well as FIG. 20, motor current signal b has an amplitude and offset set as desired. As is apparent from FIG. 23 that the target phased difference information are offset in value by a 120° phase. As such, as shown in FIG. 23, a phase winding providing accurate phase difference information can be selected to provide phase difference control to detect phase difference information of high resolution to provide phase difference control with high precision.

As has been described above, in the present embodiment, phase difference information can be detected in a reduced period. As such, a motor's behavior can be detected elaborately and phase difference control can be provided with high precision. Thus the motor can be driven in more stable manner and more reliably.

As such, in the present embodiment a phase difference between a motor drive voltage phase and a motor current may be detected as a motor current area ratio for two phase periods, and to control the phase difference information to be target phase difference information a 180° conduction including a sine wave conduction dispensing with a conduction pause period may be used to drive the motor. Thus, in driving a synchronous motor various characteristics of the sine wave 180° conduction can be effectively achieved, such as reduced noise, reduced oscillation, high efficiency, and reduced power consumption.

Figure 24:
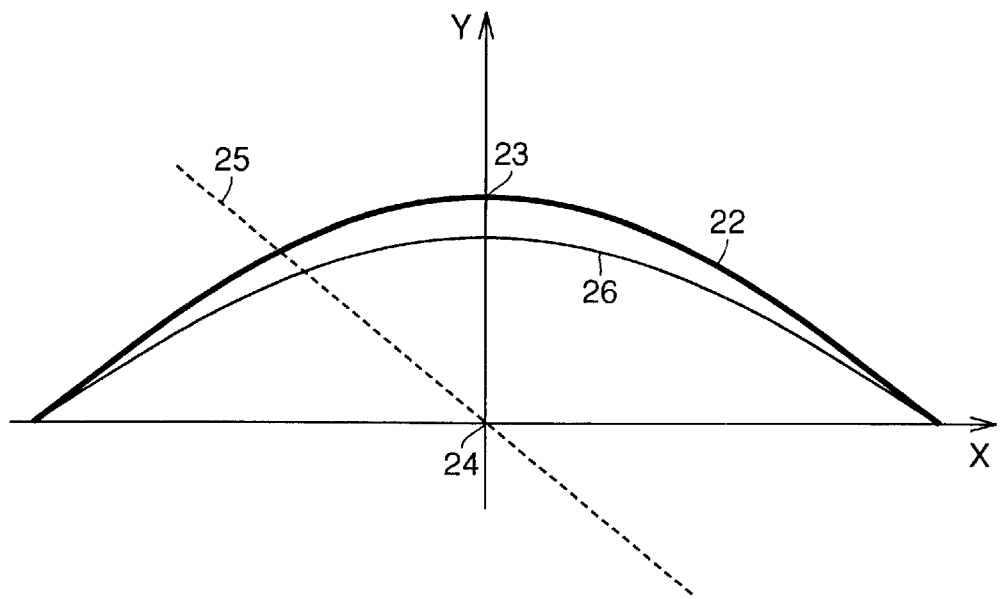
FIG. 24 represents a relationship between Fleming and reluctance torques and conduction phase in a fourth embodiment of the present invention.

FIG. 24 represents a characteristic of a torque with respect to that of a conduction of a typical, Fleming-torque brushless DC motor. In FIG. 24, an axis y 20 represents torque and voltage-current phase difference and an axis x 21 represents a phase of a current conducting through a stator coil with respect to a rotor magnet. The center of the stator coil corresponds in position to the center of the rotor magnet with a conduction current phase of 0°.

A characteristic 22 represents a characteristic of the torque with respect to the conduction current phase. A characteristic 23 indicates the maximal value of the torque. A characteristic 24 indicates a conduction current phase for obtaining the maximal torque value. It can be seen that the torque reduces as the center of the rotor magnet is spaced further apart from that of the stator coil. Furthermore, a characteristic 25 represents a phase of a voltage applied to the coil with respect to that of a current therethrough, i.e., a voltage-current phase difference, and a characteristic 26 represents the magnet's flux-density characteristic.

As shown in FIG. 24, for a typical brushless DC motor, the conduction current phase value maximizing the torque matches that maximizing the flux density. This is because a torque is a product of a magnetic flux and a current, flux 26 is represented in a substantial COS (cosine) curve maximized at 0° and the torque is thus also maximized at 0°, and torque curve 22 has a characteristic (a curve) similar to flux-density characteristic 26.

Furthermore, when a voltage in the form of a sine wave is applied, a magnet flux or induced voltage is also a sine wave. As such, the difference therebetween, corresponding to a current applied to the coil, is represented as a current of a sine wave having a phase difference distinguished from the phase of the voltage applied. The difference between the phase of the voltage applied and the current phase with respect to the conduction current phase, is represented by a phase of the voltage applied to the coil 25. A cosine of the phase difference is used to be represented in general as a power factor and a power factor of one or a phase difference of zero is desirable.

As shown in FIG. 24, for a DC motor employing a conventional magnet torque, torque curve 23 has a peak substantially matching a point of a phase difference of zero. As such, a timing of a voltage applied to a coil can maximize a motor's efficiency and torque by detecting and controlling a magnet flux or induced voltage.

Figure 25:
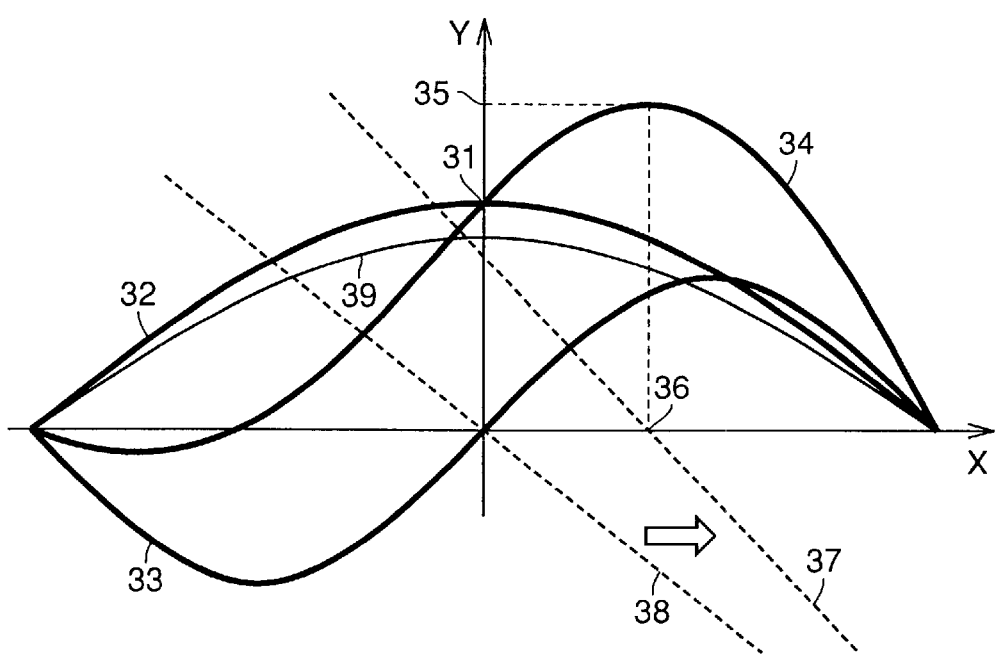
FIG. 25 represents a relationship between Fleming and reluctance torques and conduction phase in the fourth embodiment of the present invention.

FIG. 25 represents a characteristic of an IPM motor also employing a reluctance torque as described hereinbefore. In FIG. 25, an axis y 30 represents torque and voltage-current phase difference and an axis x 31 represents a phase of a current conducting through a stator coil with respect to a rotor magnet. A magnet torque 32 is represented relative to the conduction current phase and a reluctance torque 33 is represented relative to the conduction current phase, and a sum thereof is represented as a total torque characteristic 34. Furthermore, there are also shown a maximal value 35 of the total torque, an optimal conduction current phase 36 achieving the maximal torque value, a voltage-current phase difference 37 of IPM motor 1 with respect to the conduction current phase, a voltage-current phase difference 38 of a DC motor with respect to the conduction current phase, and a magnet flux density characteristic 39.

IMP motor 1 also employing the reluctance torque is characterized in that the total torque is represented as a sum of a Fleming torque and the reluctance torque and has peak 35 larger than a peak 31 (in FIG. 24, peak 23) of the Fleming torque and that there also exists optimal conduction current phase 36 for attaining the maximal value.

It has been found that IPM motor 1 has a voltage-current phase characteristic (the straight line 37) offset relative to conventional characteristic 38 due to an effect of a variation of a magnetic resistance internal to its rotor and thus zero-crossing around optimal conducting-current phase 36. As such, in IPM motor 1, controlling a voltage to obtain a voltage-current phase difference of zero, rather than controlling a conduction current phase to achieve conventional, optimal conduction current phase 36, can provide maximized torque and efficiency.

In the above description a voltage applied to a motor is controlled to achieve a zero phase difference between a current flowing through the motor and the voltage applied to the motor, although desirably a voltage applied to the motor can be controlled depending on the rotation rate or load torque to provide a phase difference between a current flowing through the motor and the voltage applied thereto (hereinafter referred to as a "voltage-current phase difference" when necessary) of a desired value other than zero to obtain maximized torque and efficiency more accurately.

More specifically, in FIG. 25, for the conduction current phase providing maximal torque 35, the voltage-current phase difference is not precisely zero because of a variation in rotation rate or load. In other words, if in such a case control is provided to achieve a voltage-current phase difference of zero then the current torque would, although slightly, be smaller than the maximal torque. As such, if accurately obtaining maximal torque and maximal efficiency of an IPM motor to be controlled is desired a voltage applied to the motor may simply be controlled to achieve a desired voltage-current phase difference attaining maximal torque 35.

An effect of controlling a motor will now be described based on a result of an experiment.

Figure 26:
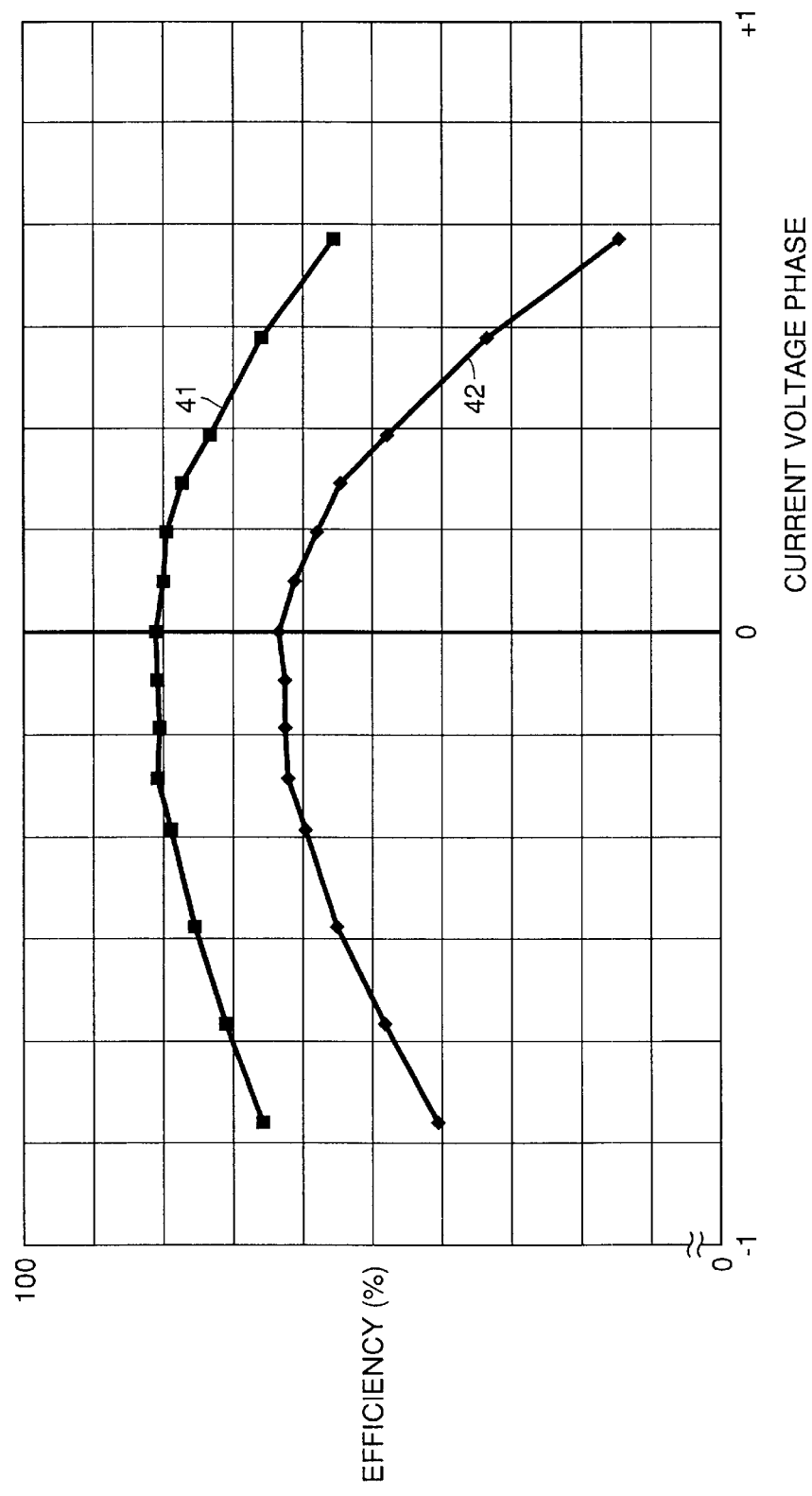
FIG. 26 represents a result of an experiment, a graph of efficiency versus phase difference angle in a phase difference control method in the fourth embodiment of the present invention.

FIG. 26 is a graph of motor efficiency versus voltage-current phase difference as measured in an experiment with an IPM motor having a rotation rate and a load torque fixed as desired. In FIG. 26, the horizontal axis represents the phase difference between a current through the motor and a voltage applied thereto, and the vertical axis represents efficiency. A characteristic 41 represents an efficiency characteristic when an output (W) corresponding to the product of rotation rate and torque is 400 (W), and a characteristic 42 represents an output characteristic for 200 (W).

As shown in FIG. 26, the characteristic of motor efficiency with respect to voltage-current phase difference is similar in tendency to that as conventional. In other words, it can be understood that in the conventional art a timing of conduction is set at an optimal conduction current phase achieving maximized efficiency, whereas in one embodiment of the present invention a voltage applied to a motor may be set to achieve a desired voltage-current phase difference.

Figure 27:
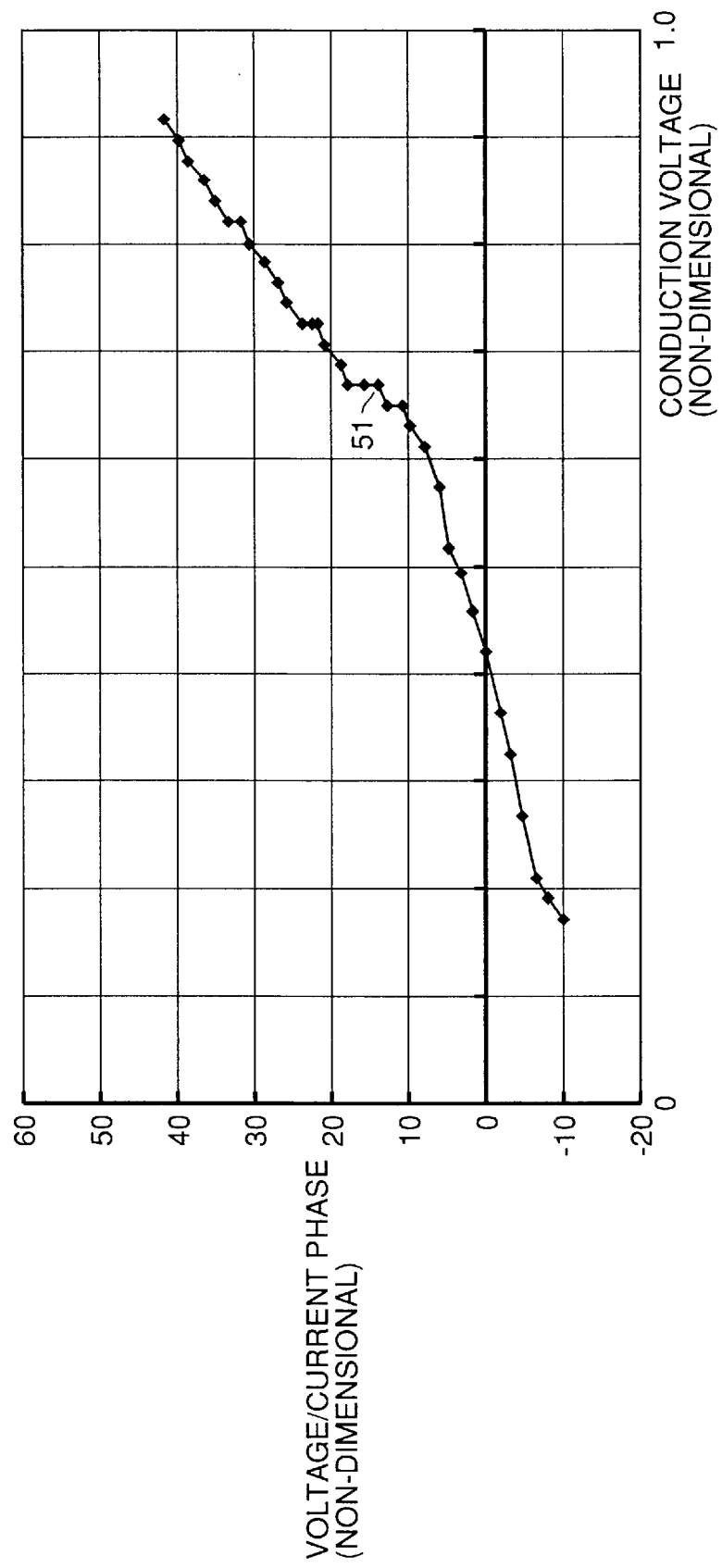
FIG. 27 represents a result of an experiment, a graph of phase difference angle versus conduction phase in the fourth embodiment of the present invention, with an output fixed.

FIG. 27 represents a result of an experiment using an IPM motor with a fixed rotation rate and a fixed load torque, a graph of voltage-current phase difference versus voltage applied to the motor's coil. In FIG. 27, the horizontal axis represents the voltage applied to the motor coil and the vertical axis represents voltage-current phase difference, and a characteristic 51 represents a characteristic therebetween.

As shown in FIG. 27, it can be seen that voltage-current phase difference varies as the voltage applied to the coil varies. More specifically, the FIG. 27 result shows that simply controlling a voltage applied to a motor, as appropriate, while fixing a rotation rate and a torque, can set a desired voltage-current phase difference. As such, in driving an IPM motor, a voltage applied to the motor can be controlled to achieve an optimal voltage-current phase difference to control the motor with maximized efficiency.

Figure 28:
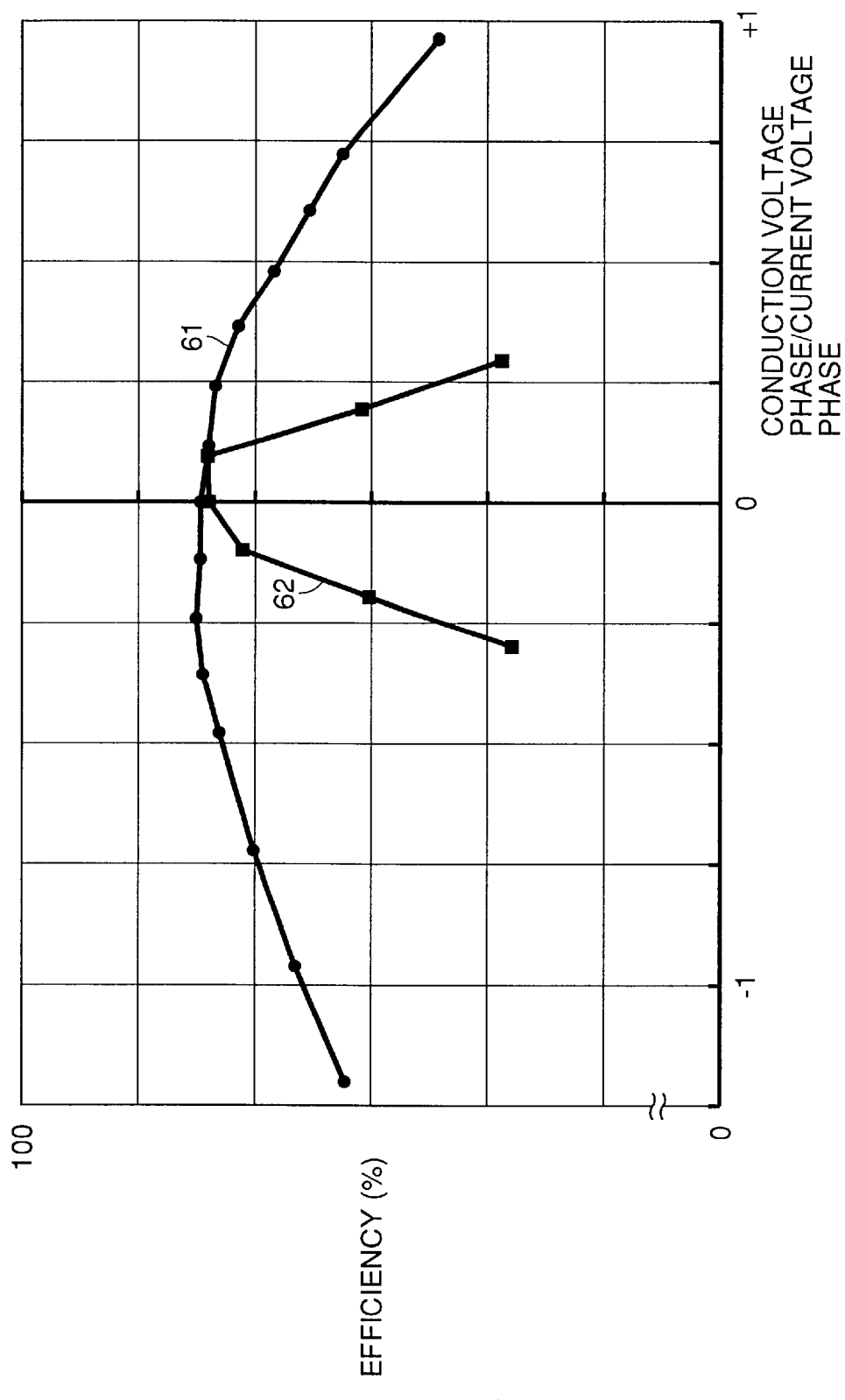
FIG. 28 represents a result of an experiment with respect to efficiency, as compared between a phase difference control system in the fourth embodiment of the present invention and a conventional system.

FIG. 28 represents a result of an experiment, a characteristic of efficiency with respect to voltage-current phase difference in an IPM motor with a rotation rate and a load torque fixed. An efficiency characteristic 61 represents that of one embodiment in accordance with the present invention, and, for comparison, an efficiency characteristic 62 represents that when as a conventional method a position sensor is used to provide control with reference to a voltage applied. The horizontal axis represents relatively a conduction voltage phase for the present embodiment and a voltage-current phase difference for the conventional art, and the vertical axis represents efficiency.

As shown in FIG. 28, the efficiency characteristic of the present embodiment is less steep than that of the conventional system. The subject to be controlled in the conventional art and that in the present embodiment are different, i.e., conduction voltage phase and voltage-current phase difference, although both control a phase. As such, the present embodiment has a wider tolerable range than the conventional system in setting an optimal phase to obtain optimized efficiency, and it can also be seen that if voltage-current phase difference slightly varies, efficiency would hardly varies.

A description will now be made of an effect of controlling a motor in one embodiment of the present invention, mainly based on a simulation result.

Figure 29:
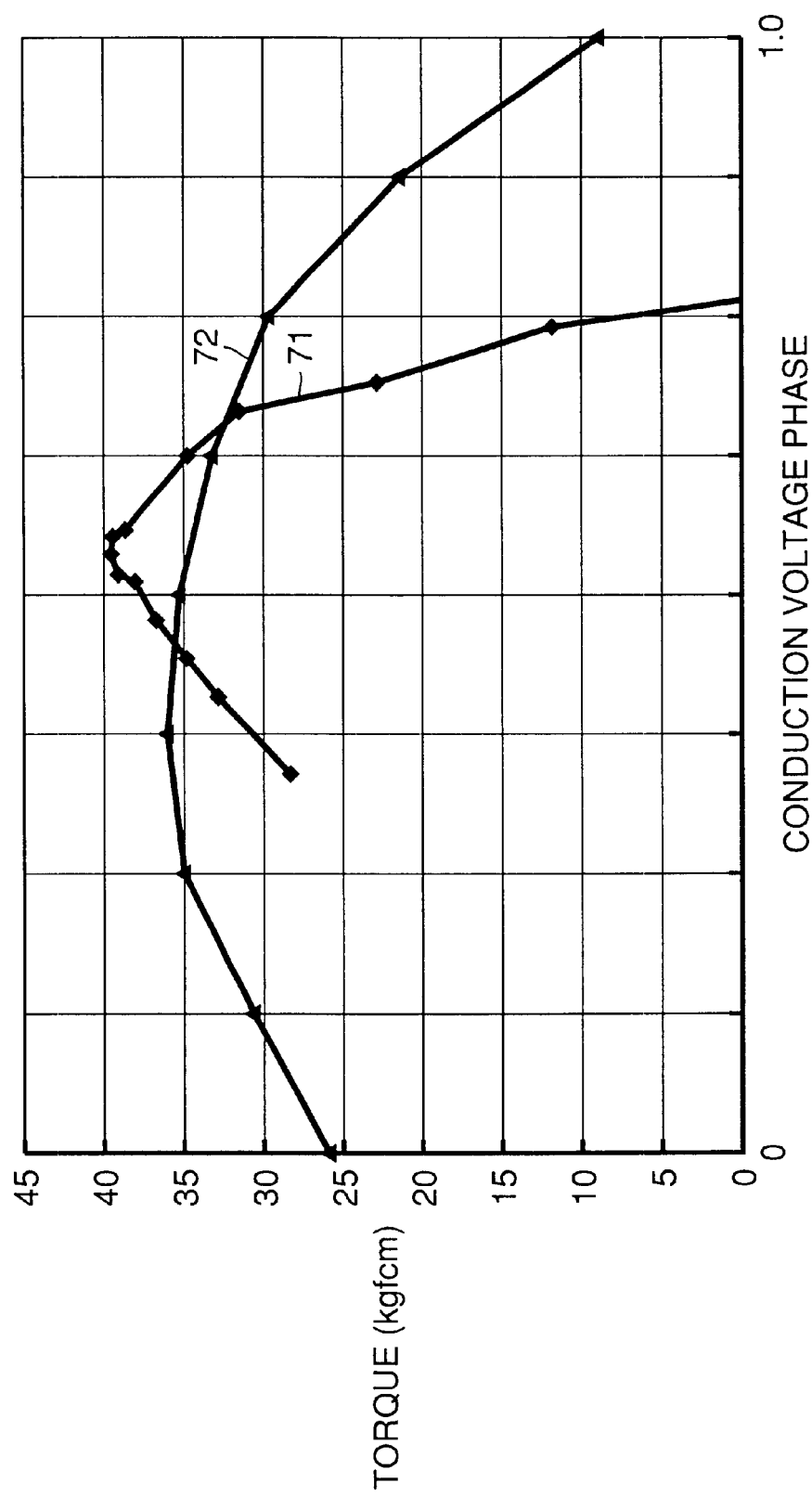
FIG. 29 represents a result of simulating 180° and 120° drive systems.

Initially, for two types of current waveforms, i.e., in a 120° rectangular-wave drive system and a 180° sine-wave drive system, identical IPM motors received a uniform input power to simulate their torque characteristics. FIG. 29 shows the results. In FIG. 29, the horizontal axis represents a phase of a conduction voltage applied to the motor coil and the vertical axis represents torque. A characteristic 71 is a torque characteristic with respect to the conduction voltage phase in the 180° sine-wave drive system and a characteristic 72 represents a torque characteristic in the 120° rectangular-wave drive system.

As has been described above, a conduction voltage phase with torque maximized exists in each system and it can also be seen that when the both systems' maximal torques in their respective, optimal conduction voltage phases are compared with each other the 180° sine-wave drive system has a larger torque than the 120° rectangular-wave drive system. This is because a magnetic flux magnetic field distributes substantially in a sine wave and while a 120° rectangular wave, with a uniform current flowing during a conduction period, passes a uniform current even for a section with a small magnet flux, the 180° sine-wave drive system passes a reduced current if a magnet flux is reduced. Since a motor torque is a product of flux and current, the 180° sine-wave drive system uses current more effectively, resulting in an increased torque. As such, the 180° sine-wave drive system consumes less current and achieves higher motor efficiency than the 120° rectangular-wave drive system when the systems provides the same torque.

Furthermore, the 180° sine-wave drive system provides a steeper characteristic of efficiency with respect to conduction voltage phase. As such, controlling a conduction voltage phase with poor precision would result in a variation in torque. Thus, to control a torque to be maximized, conduction voltage must be controlled accurately.

Figure 30:
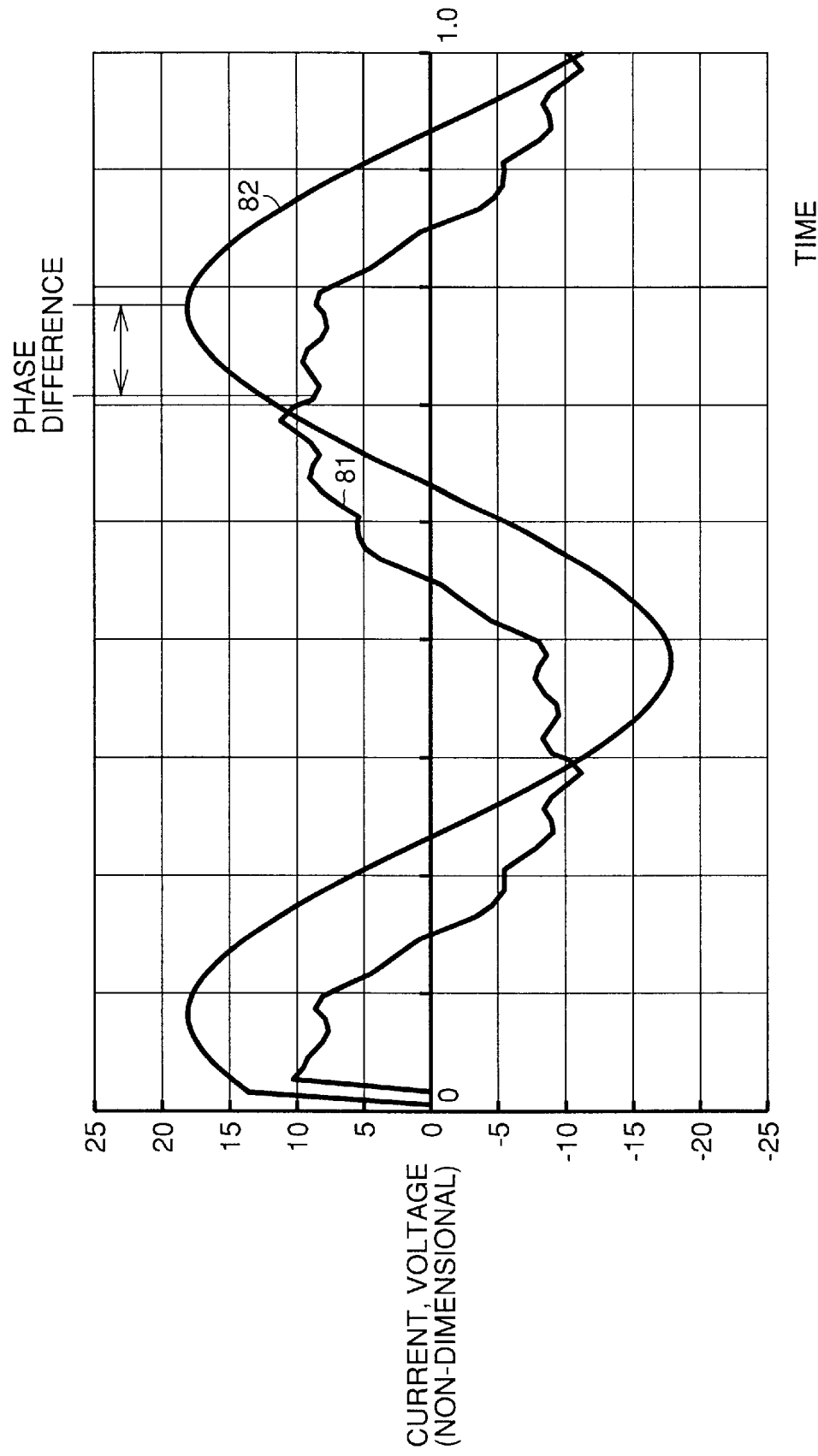
FIG. 30 shows a result of simulating a voltage phase and a current phase in a 180° drive system.

Description will now be made of a relationship between coil terminal voltage and coil current. In FIG. 30, the horizontal axis represents time and the vertical axis represents voltage and current level. In the figure, a characteristic 81 represents a voltage applied to a desired coil and a characteristic 82 represents a waveform of a current flowing through the coil after the voltage is applied to the coil. Since FIG. 8 is based on a simulation with a motor current applied as an input, current waveform 82 has a waveform of a sine wave more neater than voltage waveform 81.

As shown in FIG. 30, there is a phase difference between the waveform of the voltage applied to the motor 81 and the waveform of the current flowing through the motor 82. This phase difference is attributed to the magnet's induced voltage and a magnetic flux as a cause of a reluctance torque.

Figure 31:
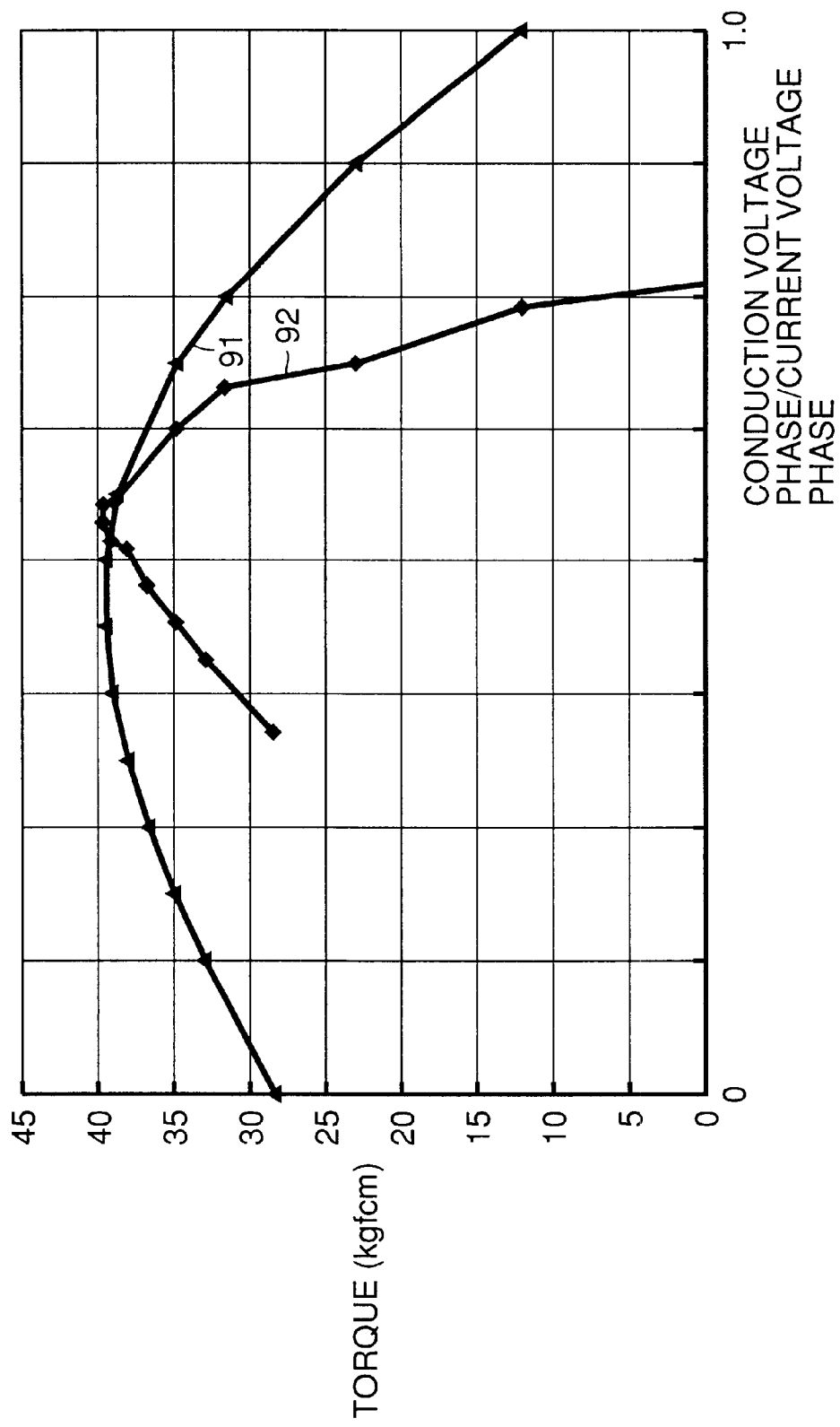
FIG. 31 represents the respective efficiencies of a phase difference control system of the fourth embodiment of the present invention and a conventional system, as simulated.

FIG. 31 shows a result of simulating voltage-current phase difference and motor efficiency when a motor receives a voltage at different timings. In FIG. 31, a characteristic 91 represents a torque characteristic in one embodiment of the present invention, and the vertical axis represents torque and the horizontal axis represents voltage-current phase difference.

For comparison, FIG. 31 also represents a torque characteristic 92 in a conventional 180° drive system, with the vertical axis representing torque and the horizontal axis representing conduction voltage phase. As shown in FIG. 31, the present embodiment has less steep a characteristic of efficiency with respect to conduction and it can be seen even from this simulation that control can be facilitated.

Thus, the present invention can provide a motor control device achieving the following effects: initially, in order to drive a magnet-embedded IPM motor with maximized efficiency, as has been described above, it is important that an optimal current conduction phase angle advance exists and that to set such advance, detecting the rotor's phase is crucial.

A first effect is as follows: the conventional example uses a 180° sine wave conduction and also requires a connection connecting a motor coil connection and a neutral point together, a connection connecting resistance connections 14u, 14v, 14w and a neutral point together, a differential amplifier and other external circuits and additional circuits and the connection connecting the motor coil connection and a neutral point 13d, together also requires that the motor configuration and the terminal configuration be changed, resulting in an increased number of components and an increased cost, whereas in accordance with the present invention a motor is not required to be changed in configuration and its configuration as it is can be applied to a conventional motor.

Furthermore, as a second effect is superior controllability. More specifically, as shown in FIG. 28, showing a result of an experiment representing a characteristic of efficiency with respect to voltage applied and voltage-current phase difference in an IPM motor with a rotation rate and a load torque fixed, the present invention exhibits a less steep efficiency characteristic than the conventional example. Thus, the present invention effectively provides a wider tolerable range of optimal phase angle set to obtain maximized efficiency and if a slight phase variation results in a variation in efficiency, the efficiency variation would be limited.

Furthermore, the 180° sine wave drive system allows current to be used effectively to increase maximal torque and enhance efficiency.

Figure 32:
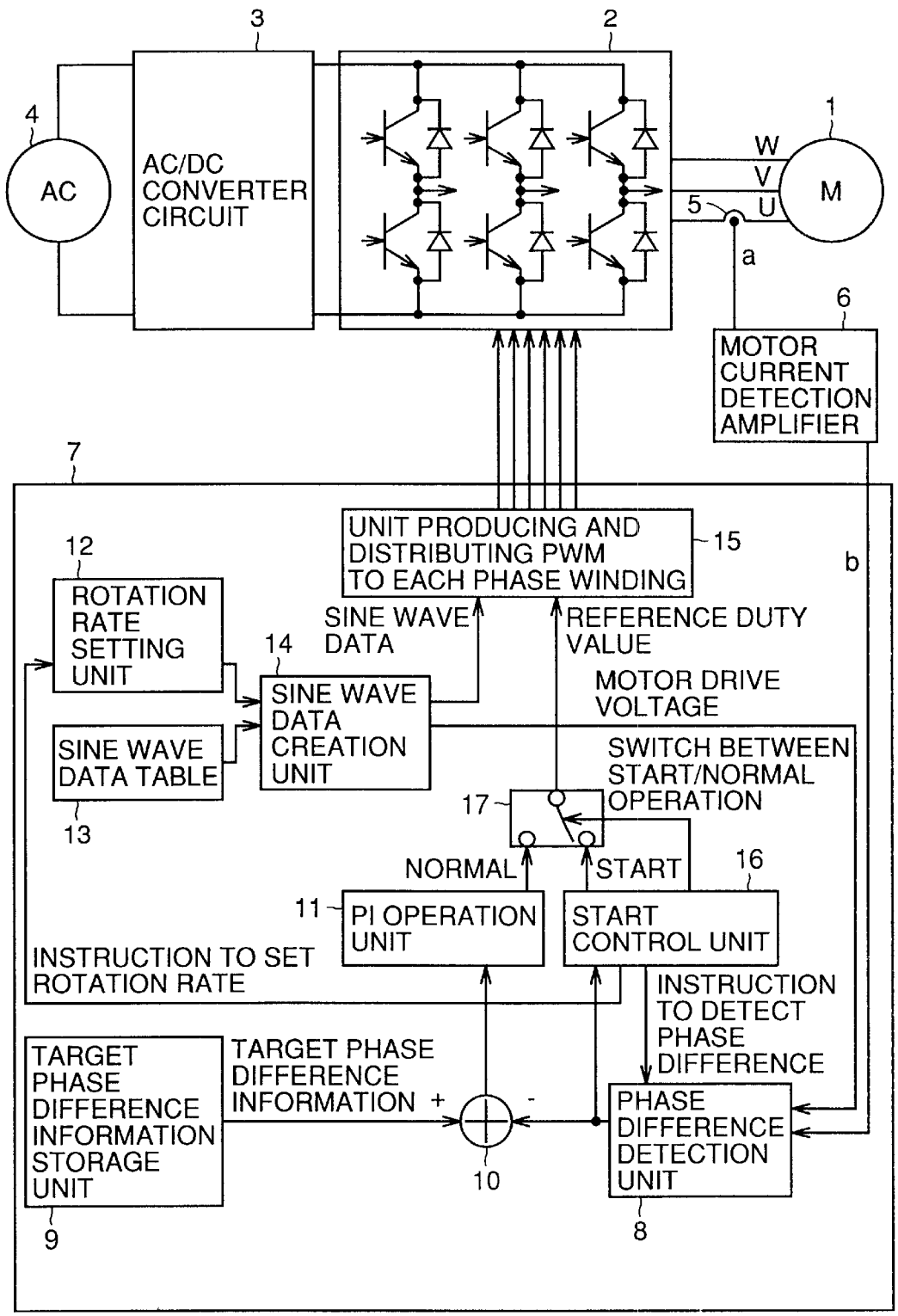
FIG. 32 shows an exemplary configuration of a motor start control device in a fifth embodiment of the present invention.

FIG. 32 is a block diagram showing a fifth embodiment of the present invention.

The FIG. 32 embodiment is similar in configuration to FIG. 1 except for the following: the FIG. 32 configuration is the FIG. 1 configuration plus a start control unit 16 starting synchronous motor 1 in stable manner and a switch 17 switching between the start control (start control unit 16) used when the motor is started and the PI control (PI operation unit 11) used when the motor normally operates.

Start control unit 16 detects whether synchronous motor 1 has been completely started and rotates in stable manner and depending on the detection issues an instruction forcing rotation rate setting unit 12 to prevent a rotation rate from being changed or to change a rotation rate. Furthermore, start control unit 16 functions to control switch 17 to prevent the PI control while it is operating to start the motor. Thus, when the motor is being started, switch 17 allows a reference duty value from start control unit 16 to be input to a unit producing and distributing PWM to each phase winding 15. When the motor operates normally, switch 17 allows a reference duty value from PI operation unit 11 to be input to unit 15.

The FIG. 32 motor control device operates, as will now be briefly described below: when synchronous motor 11 is being started, start control unit 16 controls setting a rotation rate and produces a reference duty value. Switch 17 switches on the starting side (the side connected to an output node of start control unit 16). If a method of detecting phase difference information applied when the motor is controlled to start is switched to that of applied when the motor normally operates, start control unit 16 outputs to phase difference detection unit 8 an instruction to detect a phase difference of the motor being started.

Once start control unit 16 detects that synchronous motor 1 starts to rotate in stable manner and it has thus been completely started, start control unit 16 is prevented from issuing an instruction to set a rotation rate and switch 17 has its normal side (the side connected to an output of PI operation unit 11) switched on. Thus, PI operation unit 16 is permitted to produce a reference duty value.

PI operation unit 11 is feedback-controlled to maintain a constant phase difference between a motor drive voltage and a motor current. Thus, when synchronous motor 1 normally operates it can be rotated with a phase difference as desired.

In this scenario, rotation-rate setting unit 12 and the information stored in sine-wave data table 13 are used to allow sine-wave data creation unit 14 to control the motor's rotation rate and select and create appropriate sine wave data as required. Thus, unit producing and distributing PWM to each phase winding 15 outputting a rotating magnetic field as desired uses the sine wave data and a reference duty value to produce and output a PWM signal corresponding to each driving element. As such, the synchronous motor 1 rotation frequency is synchronized with a rotating magnetic field resulting from conduction. This achieves synchronous operation.

Thus, in the configurations as described above it is not necessary to detect an electromotive force of synchronous motor 1 and it is also not necessary to provide a conduction pause period during the synchronous motor 1 conduction. Thus the motor can be driven efficiently.

Furthermore, when synchronous motor 1 normally operates it is driven depending on a phase difference detected similarly as in starting the motor. In other words, phase difference information similar to that in starting the motor is also used in operating the same normally. This eliminates the necessity of the conventional transition from synchronous operation of a motor being started to counter-electromotive operation. As such, the process can be simplified and the motor can transition from its start to its normal operation smoothly. Accordingly, a torque variation and a speed variation can be eliminated in switching between the start operation and the normal operation. Thus, the motor can be driven with high precision.

Figure 33:
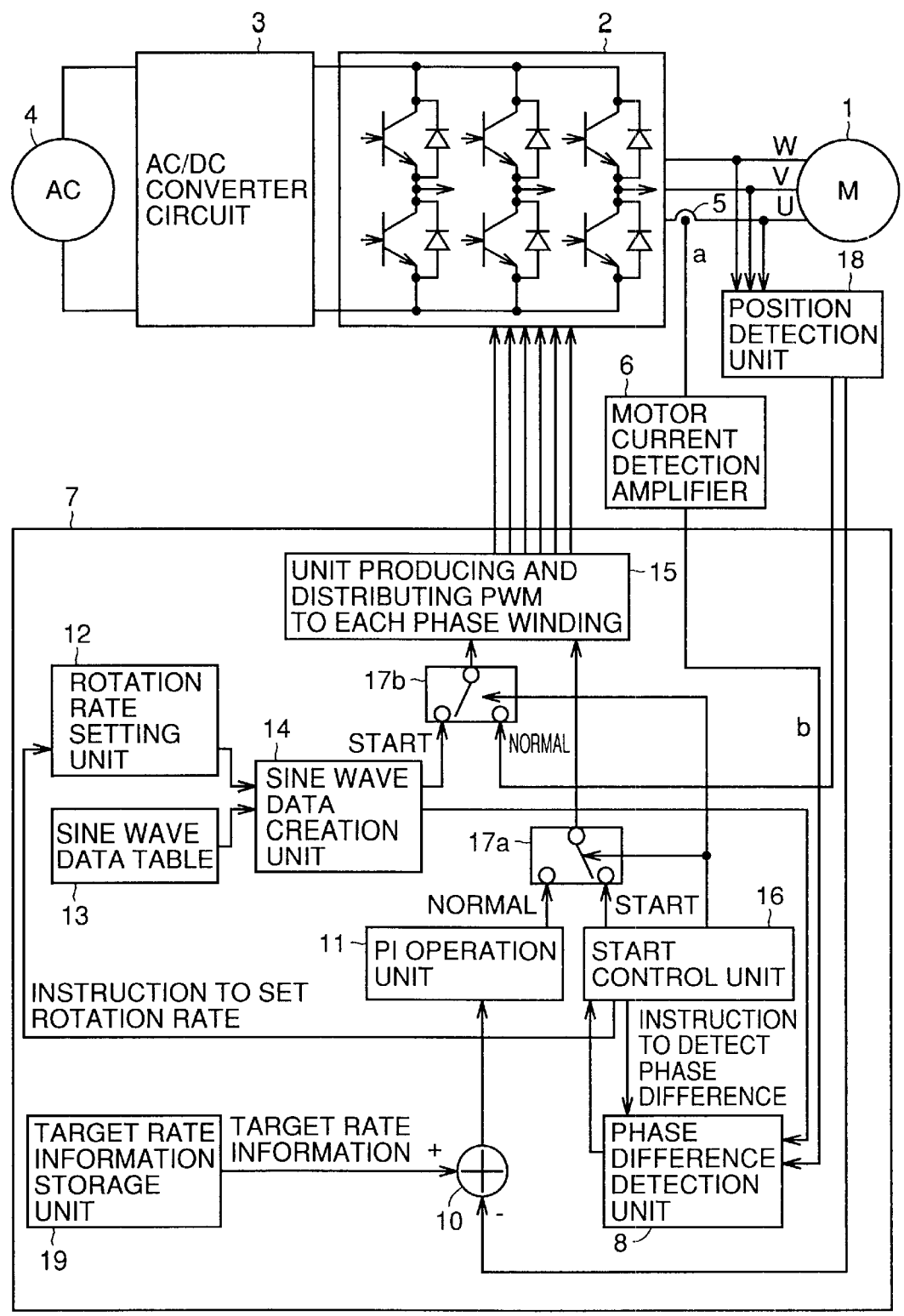
FIG. 33 shows an exemplary configuration of a motor start control device in a sixth embodiment of the present invention.

It should be noted that in normally operating a motor a 120° rectangular-wave drive system may be used. In this example, an exemplary configuration will now be described with reference to FIG. 33. As shown in FIG. 33, a control unit 7 includes switches 17a and 17b. Switches 17a and 17b, as well as switch 17, switch between starting a motor and normally operating the motor.

When it is controlling a motor to start, start control unit 16 controls switches 17a and 17b to prevent the PI control. Switch 17a in starting the motor permits an output from start control unit 16 to be input to unit producing and distributing PWM to each phase winding 15 and switch 17a in normally operating the motor permits an output from PI operation unit 11 to be input to unit 15. Switch 17b in starting the motor permits sine wave data output from sine wave data creation unit 14 to be input to unit 15 and switch 17b in normally driving the motor permits a conduction switch signal from position detection unit 18 to be input to unit 15.

In FIG. 33, position detection unit 18 detects the position of a motor's rotor from a counter-electromotive force in each of phase windings U, V, W during a conduction pause period. As a result of the detection, position detection unit 18 outputs a conduction switch signal (a pulse corresponding to the motor's position in rotation) and rate information (information corresponding to the motor's rotation rate).

In FIG. 33, adder 10 calculates error data between target rate information output from target rate information storage unit 19 storing the motor's rotation rate targeted (or target rate information) and rate information output from position detection unit 18, and outputs a result of the calculation to PI operation unit 11. This error data is used to control PI operation unit 11.

To normally operate the motor, a feedback control is provided to switch a conduction state in response to the conduction switch signal output from position detection unit 18 and set a reference duty value to allow rate information to approach target rate information. Thus, synchronous motor 1 is driven to achieve a targeted rate. Since conduction is switched in response to a counter-electromotive force signal, a drive system can be significantly simply configured.

It should be noted that one state of conduction can be more reliably switched to another if a rotation rate allowing a counter-electromotive force to be accurately detected is set before the motor is switched to the normal operation.

As such, the present invention is not limited by the conduction technique applied in the normal operation and it is applicable in any conduction techniques. While the motor is controlled to start the conduction is provided in the form of a sine wave, because such wave effectively passes a motor current smoothly through the motor coil, creates a rotating field with reduced ripple and smoothly starts the motor's rotation. The present invention, however, is not limited to such waveforms of conduction and the objects of the present invention can be achieved with any waveform of conduction.

Figure 34:
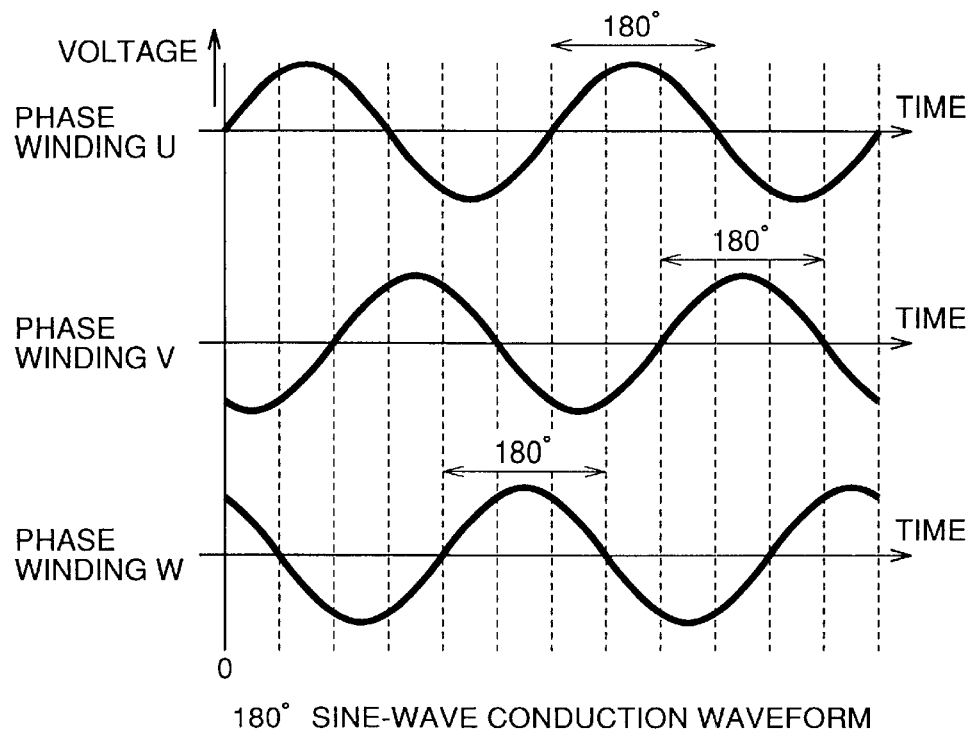
FIG. 34 represents a drive voltage waveform of each phase winding for 180° sine-wave conduction.
Figure 35:
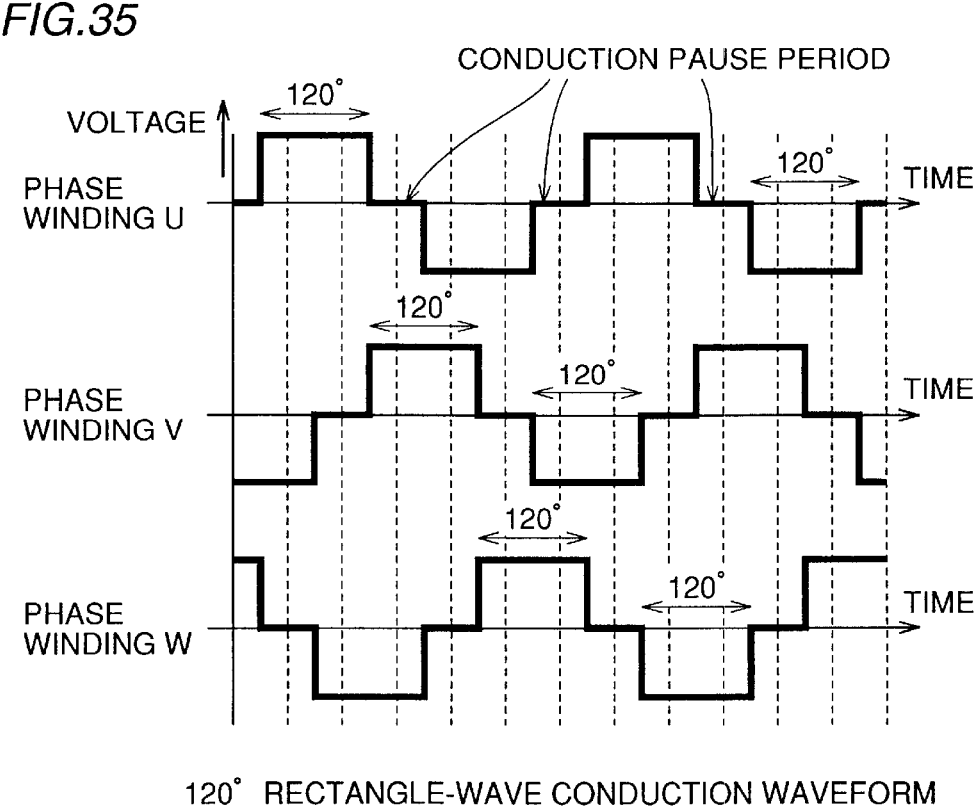
FIG. 35 represents a drive voltage waveform of each phase winding for 120° rectangular-wave conduction.

For comparison, FIG. 34 represents a drive voltage waveform of each phase winding with a 180° sine-wave conduction applied, as one example of a drive waveform not having a conduction pause period, and FIG. 35 represents a drive voltage waveform of each phase winding with a 120° rectangular-wave conduction applied, as an example of a drive waveform having a conduction pause period. In each of FIGS. 34 and 35, the vertical axis represents voltage and the horizontal axis represents time.

Figure 39:
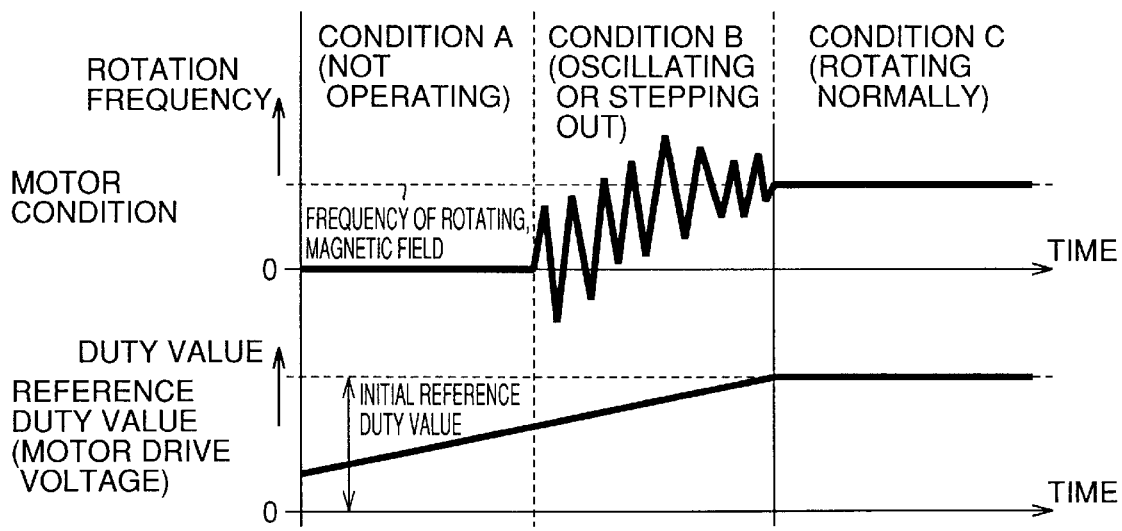
FIG. 39 illustrates the synchronous motor 1 condition in the sixth embodiment of the present invention as a motor drive voltage or a conduction frequency varies.

As shown in FIG. 34, when the 180° sine-wave conduction is applied each phase winding U, V, W has a voltage in the form of a sine wave. By contrast, as shown in FIG. 39, when the 120° rectangular-wave conduction is applied each phase winding U, V, W has a 120° period with a rectangular-wave conduction and has a 60° period corresponding to a conduction pause period.

In an embodiment of the present invention, phase difference detection unit 8 and start control unit 16 operate, as will now be described with reference to FIGS. 36–41B.

Figure 36:
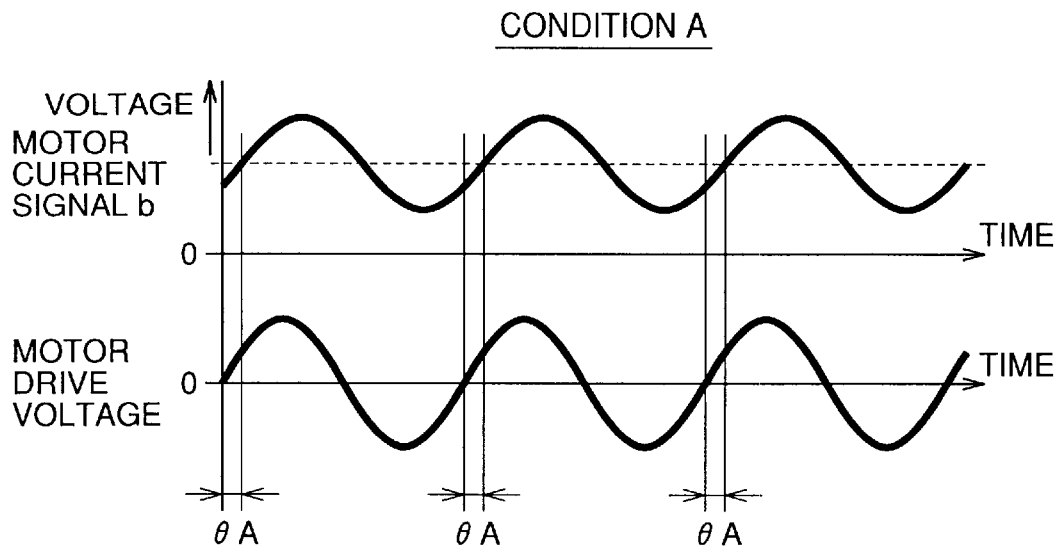
FIG. 36 is timing plots showing a relationship between a motor drive voltage waveform and a motor current signal waveform in the sixth embodiment of the present invention.
Figure 37:
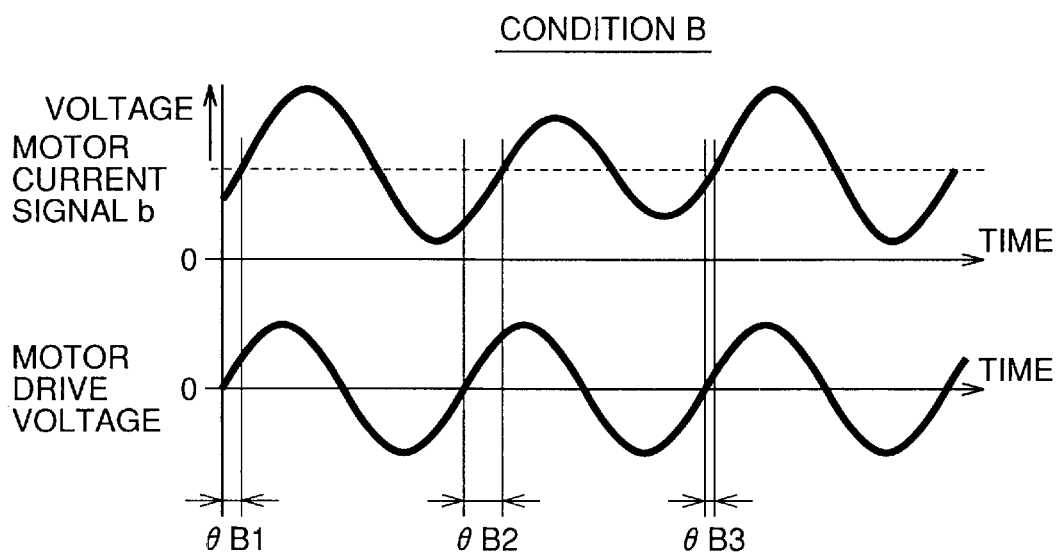
FIG. 37 is timing plots showing a relationship between a motor drive voltage waveform and a motor current signal waveform in the sixth embodiment of the present invention.
Figure 38:
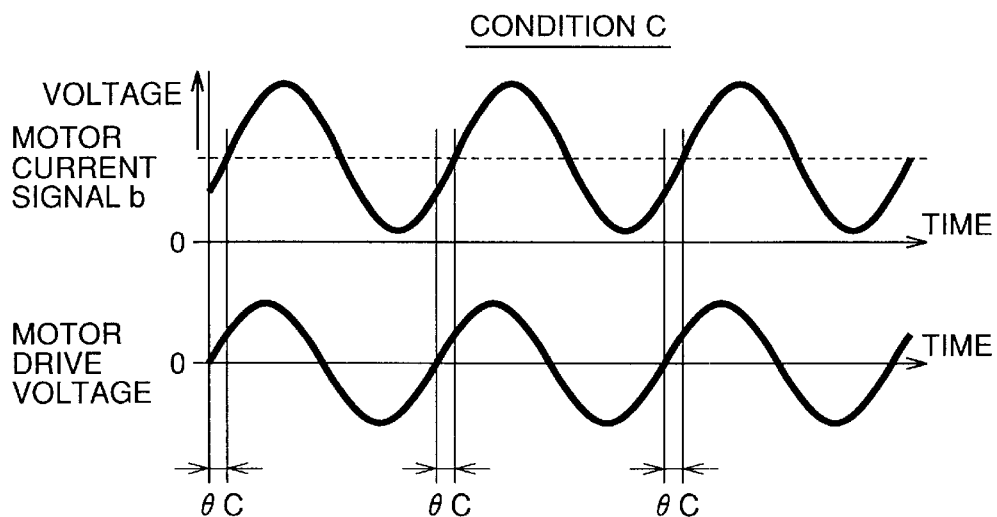
FIG. 38 is timing plots showing a relationship between a motor drive voltage waveform and a motor current signal waveform in the sixth embodiment of the present invention.

FIGS. 36–38 are timing plots representing a relationship between a motor drive voltage waveform and a motor current signal waveform. It should be noted that a motor drive voltage waveform is in effect a PWM-type waveform and phase difference detection unit 8 only receives motor drive voltage phase information, although for the sake of convenience the following description will be made using a motor drive voltage waveform rather than phase information. In the figure, θA, θB1, θB2, θB3, θC each represent a phase difference.

FIG. 36 corresponds to a condition A, in which a reference duty value is significantly small relative to a frequency of a conduction to a motor coil terminal, i.e., a frequency of a rotating-field and a load torque being generated, and synchronous motor 1 thus neither rotates nor oscillates.

FIG. 37 corresponds to a condition B, in which a reference duty value is small relative to a frequency of a conduction to a motor coil terminal, i.e., a frequency of a rotating-field and a load torque being generated, and synchronous motor 1 fails to normally rotate and thus oscillates or steps out.

FIG. 38 corresponds to a condition C, in which a reference duty value is set at an appropriate value relative to a frequency of a conduction to a motor coil, i.e., a frequency of a rotating-field and a load torque being generated, and synchronous motor 1 normally rotates.

As shown in FIGS. 36–38, condition A with synchronous motor 1 not rotating at all and condition C with synchronous motor 1 normally rotating have their respective, constant phase differences θA and θC, respectively, between a motor drive voltage and motor current signal b.

In contrast, condition B with synchronous motor 1 oscillating or stepping out has a phase difference between a motor drive voltage and motor current signal h that is not constant, varying (θB1, θB2, θB3, . . . ).

In condition A, with synchronous motor 1 not operating at all, a motor current is detected as when a motor drive voltage as it is is applied to the coil. Thus phase difference θA is stable. In condition B, with a small PWM duty (a small motor drive voltage), a torque overcoming the motor load cannot be generated and synchronous motor 1 thus oscillates. When synchronous motor 1 oscillates or steps out a variation is introduced in a counter-electromotive force. This would introduce an oscillation in a motor current, which flows depending on the difference between the motor drive voltage and the counter-electromotive voltage. Thus phase differences θB1, θB2, θB3 vary in amplitude or phase. In other words, in this condition, conduction is not made with a uniform positional relationship relative to the motor's rotor. In condition C, synchronous motor 1, normally started, normally rotates in stable manner and a counter-electromotive force waveform and a rotating-field waveform are synchronous with each other. Thus, motor current signal b flows in synchronization with a motor drive voltage and phase difference θC is thus stable.

Figure 40:
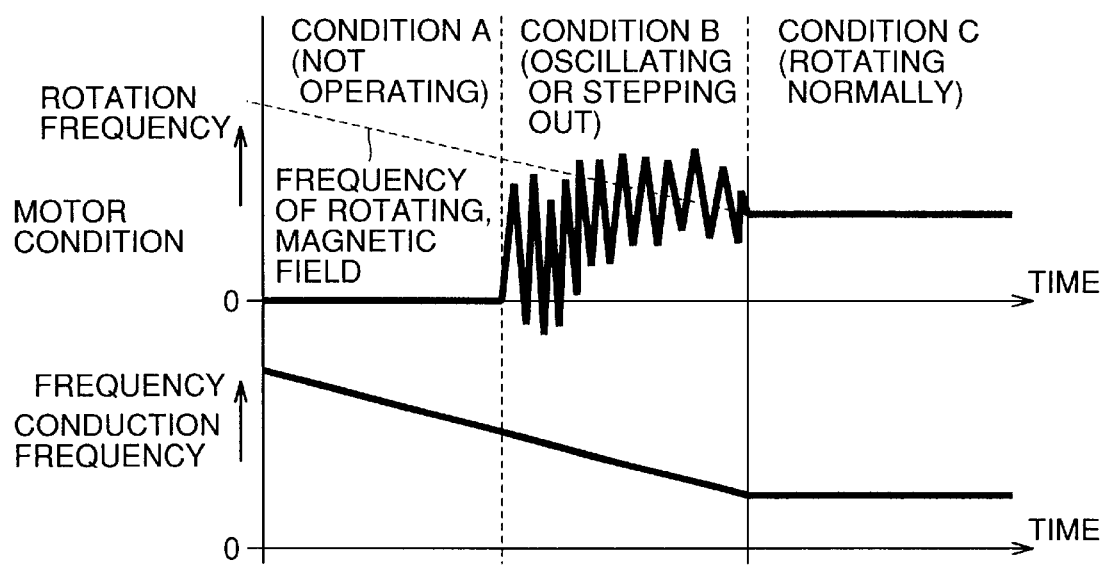
FIG. 40 illustrates the synchronous motor 1 condition in the sixth embodiment of the present invention as a motor drive voltage or a conduction frequency varies.

FIGS. 39 and 40 are graphs for illustrating the synchronous motor 1 condition with a motor drive voltage or a conduction frequency varied. It should be noted that the FIGS. 39 and 40 conditions A, B, C correspond to the FIGS. 36–38 conditions A, B, C, respectively.

FIG. 39 represents a correspondence between a motor's condition and phase difference when a conduction frequency for generating a rotating field is fixed and a reference duty value is increased with time. To fix the conduction frequency, the FIG. 1 rotation-rate setting unit 12 receives from start control unit 16 an instruction to prohibit a rotation rate from being changed. As the reference duty value increases, the motor's condition transitions from conditions A to B and then to C.

FIG. 40 represents a correspondence between the synchronous motor 1 condition and phase difference when a reference duty value is fixed and a conduction frequency is decreased with time. To gradually reduce the conduction frequency, the FIG. 1 rotation-rate setting unit 12 receives from start control unit 16 an instruction to reduce a rotation rate. As the conduction frequency decreases, the motor's condition transitions from conditions A to B and then to C.

A conventional motor start control device does not include a scheme to detect condition C or a stable rotation state. Thus, the motor can be assumed to have been completely started before condition C or in condition A or B and it can thus be switched to the normal mode of operation with reference to a counter-electromotive force or the like, resulting in the motor failing to start.

In condition B, varying phase difference information is detected, as shown in FIG. 37, and if a counter-electromotive force is used it would also be detected varying as the synchronous motor oscillates. As such, it is possible that in condition B or when the motor oscillates, phase difference information or a counter-electromotive voltage is detected as if, depending on the condition of the oscillation, the synchronous motor were rotating in stable manner. Furthermore it is also possible that because of the oscillation, at preceding and subsequent time-points of detection the information in the opposite direction is detected. In other words, an erroneous detection is induced. As such, if in condition B phase difference control is applied to drive a motor or counter-electromotive force detection is applied to drive a motor, not only can the synchronous motor not be driven in stable manner but the motor would step out.

As such, in order to start a motor in stable manner, stable rotation (condition C) should be detected accurately or there should be detected that a motor drive voltage and a motor current signal have therebetween a phase difference as shown in the FIG. 38 condition C.

Accordingly, a motor start drive device of the present invention determines that a motor has been completely started when it detects the FIG. 38 stable phase difference has been obtained a predetermined number of times. Thus the motor can be driven in stable manner. Accordingly, in an embodiment of the present invention, start control unit 16 calculates an average of the predetermined number of phase difference information and determines whether each phase difference information varies within a predetermined range relative to the obtained average value to determine whether the current condition is condition C.

It should be noted that importantly, while the starting process is in progress, synchronous motor 1 oscillates or steps out and there thus exists condition B with an oscillating phase difference, as has been described above. As such, using phase difference information per se to control a drive voltage, determine a condition of a motor being started, performing phase difference control, which is effective in controlling a motor when it normally operates, i.e., using phase difference information per se to control a motor would not start the motor in stable manner. Accordingly, in starting a motor, whether a phase difference has a significant variation (i.e., whether phase difference information has a significant variation) should be detected and a result of such detection should be used to determine a condition of the motor being started and thus control the motor to start.

It is understood from FIGS. 36–40 that in either one of conditions A and C a stable phase difference is detected. As such, to completely start a motor, condition C should be detected reliably.

Accordingly, in an embodiment of the present invention a fixed rotation frequency and a fixed reference duty value may be set as the values allowing a motor to be in condition C and thus rotate in stable manner. Then, whether or not the motor starts to rotate in stable manner is detected to detect whether the motor has been completely started.

Alternatively, a conduction frequency or a reference duty value may be varied to detect condition B transitioning to condition C. If a reference duty value is changed, an initial reference duty value set when a motor is initially started is set lower in value than a reference duty value for the motor to rotate in stable manner or for condition C (i.e., in a range of an initial reference duty value as shown in FIG. 39) and after the motor start process is started the reference duty value is gradually increased while initially there is detected that each phase difference varies (i.e., condition B) and subsequently there is detected that each phase difference is stable. Thus, there can be detected that the motor has been completely started.

It should be noted that a reference duty value has an initial value set to produce a torque small relative to a possible load torque produced when the motor is started.

It should be noted that if a fixed rotation-rate instruction (rotating-field frequency) or initial rotating-field frequency is too high, in condition B the motor might oscillate or step out significantly or rotate in a direction opposite to that as desired. Reasonably, although depending on the synchronous motor used, it is set at a low rate no more than approximately 500 rpm.

Figure 41B:
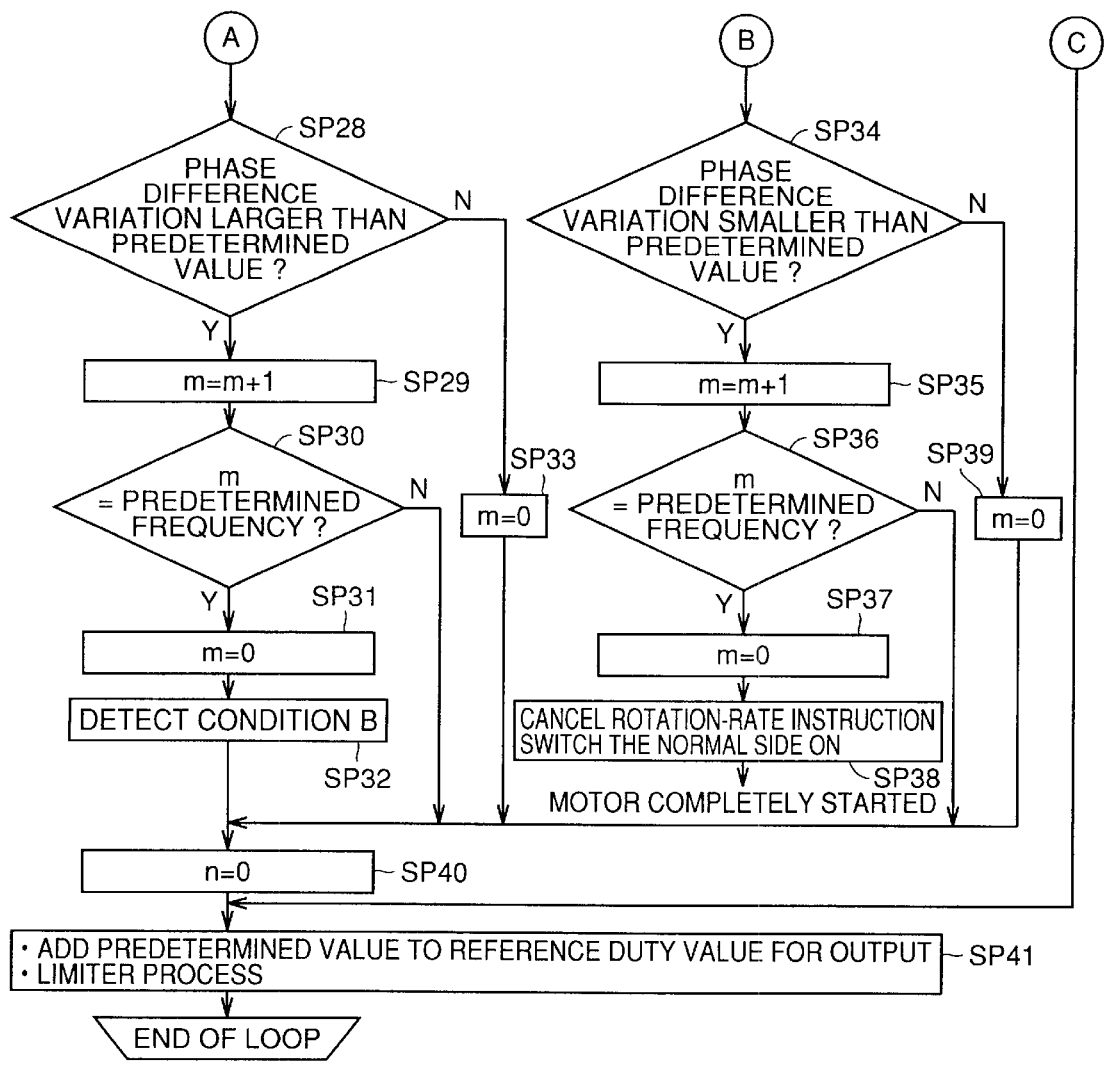

Reference will now be made to FIGS. 41A and 41B to describe a process provided by start control unit 16 to detect while varying a reference duty value whether a motor has been completely started. As shown in FIG. 41A, at SP2 if a motor start instruction is issued a rotation rate instruction of a predetermined value is fixed, a reference duty value of an initial value is set, switch 17 is switched to the starting side, and each variable is also initialized. The initial reference duty value is set to a small value to prevent synchronous motor 1 from abruptly rotating in stable manner. If a reference duty value is not changed in the subsequent steps, then it is set to a value allowing synchronous motor 1 to attain the aforementioned condition C.

At SP22, control determines whether phase difference detection unit 8 has detected phase difference information. If not, control goes back to SP41 and repeats a loop process until new phase difference information is detected.

If phase difference information has been detected then at SP23 the detected phase difference information is stored in arrangement P(n). Subsequently, at SP24, phase difference information detection frequency n is updated (n=n+1). At SP25, control determines whether phase difference information detection frequency n has reached at least a predetermined frequency. If not, control goes back to SP41 and repeats the loop process to detect new phase difference information. If at SP25 phase difference information detection frequency n has reached at least the predetermined frequency then control goes to SP26 to average the phase difference information detected by the predetermined frequency.

Subsequently, at SP27, control determines whether the current condition of synchronous motor 1 is condition A or B. If the motor's initial condition is adapted to be condition A, its current condition is determined through the following process: if the current condition of synchronous motor 1 is condition A then control goes to SP28–SP33 and if it is condition B then control goes to SP34–SP39.

As shown in FIG. 41B, at SP28–SP33, control determines whether synchronous motor 1 in condition A has transitioned to condition B. More specifically, at SP28, control determines whether each phase difference information varies relative to an average of phase difference information, exceeding a range. If it varies significantly (or a phase difference varies) then at SP29 control updates variable m. If not (or a phase difference does not significantly vary) then at SP33 control resets variable m to zero and goes to SP40.

After at SP29 control has updated variable m, at SP30 control determines whether variable m has reached a predetermined frequency. In other words, control refers to the value of variable m to determine whether phase difference information has a large variation the predetermined number of times successively. This allows reliable detection of phase difference variations.

If variable m has reached the predetermined frequency, then at SP31 variable m is reset. Then at SP32 control stores in memory that the current condition of synchronous motor 1 is condition B and control then goes to SP40. At SP40, control resets variable n for averaging subsequent phase difference information.

If control has determined that synchronous motor 1 is currently in condition B, then SP34–SP39 are performed rather than SP28–SP33. More specifically, at SP34, control determines whether each phase difference information varies relative to an average of phase difference information within a range. If so (or a phase difference is stable) then at SP35 control updates variable m. If not then at SP39 control resets variable m to zero and goes to SP40.

After at SP35 control has updated variable m, at SP36 control determines whether variable m has reached a predetermined frequency. In other words, control refers to the value of variable m to determine whether phase difference information has not significantly varied successively by the predetermined frequency. This allows reliable detection of whether a phase difference is stable.

If variable m has reached at least the predetermined frequency, then at SP37 control resets variable m. Furthermore, control determines that synchronous motor 1 has achieved condition C, rotating in stable manner, and at SP38 control cancels the instruction issued to fix a rotation rate and sets switch 17 to the normal side to complete the motor start process.

As has been described above, at SP40 variable n is reset, and subsequently at SP41 the current reference duty value is increased by a predetermined value and PWM is output to gradually increase the current motor drive voltage. Furthermore, if the current reference duty value exceeds a limit value, then an instruction to stop starting the motor or an instruction to restart the motor is issued or increasing the current reference duty value is prohibited, since if a reference duty value is increased too much an excessive current flows through an inverter, synchronous motor 1 and the like and would damage them.

Note that if a reference duty value is fixed, SP41 is not provided. The aforementioned SP22–SP41 loop process is repeated until the motor is completely started.

A value referred to to detect a variation in phase difference information may for example be determined based on a variation detected when synchronous motor 1 neither oscillates nor steps out and thus rotates in stable manner. It should be noted, however, that it is determined to have a value that does not stop synchronous motor 1 when the motor is switched to the normal operation.

Thus, the present invention in an embodiment thereof provides a motor control device exploiting the fact that a motor rotating in stable manner is associated with phase difference information that does not significantly vary. Thus, it can reliably detect whether the motor has been completely started and thus rotates in stable manner. Since the synchronous motor 1 condition is detected continuously, it does not fail to start and can thus be started in stable manner.

Furthermore, at an initial stage of driving synchronous motor 1, the motor receives a motor drive voltage (a PWM duty) initially set to be a low voltage value (or duty) and then gradually rising to prevent synchronous motor 1 from abruptly rotating in stable manner. Furthermore, whether synchronous motor 1 oscillates/steps out (condition B) is detected based on whether a phase difference varies significantly, and thereafter whether synchronous motor 1 rotates in stable manner (condition C) is detected based on whether a phase difference varies less significantly. As such, condition A of synchronous motor 1, completely free of rotation with a stable phase difference, and condition C can be reliably distinguished from each other.

As such, it is not necessary to attach a position detector to synchronous motor 1 to reliably determine whether the motor has been completely started to in effect allow the motor to be completely started. It is also not necessary to detect a counter-electromotive force. As such it is also not necessary to use a conduction waveform including a conduction pause period, such as a 120° rectangular-wave conduction. This can reduce a large torque variation caused when the motor rotates slowly, such as when it is started and thus has a small rotation rate. Furthermore, a driving waveform such as a 180° sine-wave conduction can achieve a smooth rotation and since it does not include a conduction pause period a motor magnet flux can be effectively used to drive the motor efficiently.

It should be noted that even if a conduction frequency is changed as shown in FIG. 40, the initial value is set to a value avoiding condition C and while a procedure similar to the FIGS. 41A and 41B process is performed to vary the value whether or not the motor has been completely started may be determined to reliably detect whether the motor has been started completely.

It should be noted that while in FIG. 39 a reference duty value (a motor drive voltage) increases linearly, it may be fixed while control determines whether a phase difference varies, and after control has determined accordingly the reference duty value may be increased. In this scenario, in FIG. 41B, SP41 is performed immediately before SP40. By gradually increasing a reference duty value, as described above, a phase difference variation can also be accommodated that is attributed to a reference duty value varying while control determines whether a phase difference varies.

Figure 42:
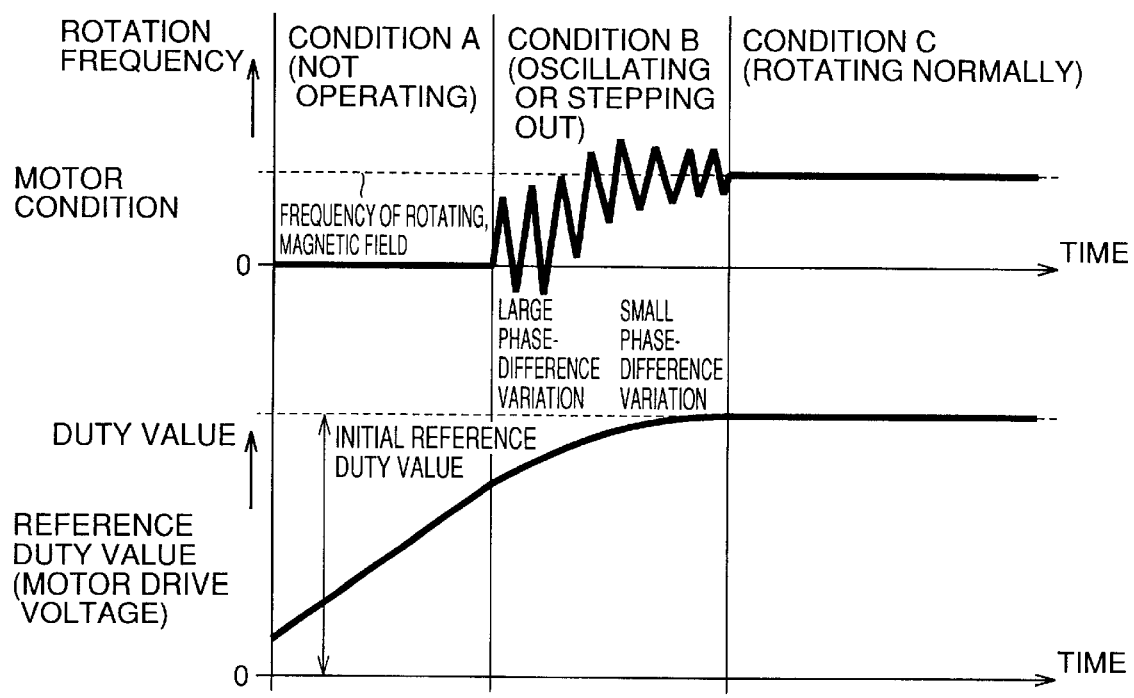
FIG. 42 is an illustration of exemplarily setting a reference duty value to completely start a motor rapidly and in stable manner.

To completely start a motor rapidly, a reference duty value may for example be set, as will now be described with reference to FIG. 42. FIG. 42 is timing plots for illustrating an exemplary method of varying a reference duty value in one embodiment of the present invention. The FIG. 42 conditions A, B, C correspond to the FIGS. 36–38 conditions A, B, C, respectively.

In the present embodiment, as shown in FIG. 42, conditions A, B, C of a synchronous motor or the magnitude of a phase-difference variation is referred to to vary a value added to a reference duty value.

When synchronous motor 1 is in condition A, with a small phase difference introduced immediately after the motor is started, a reference duty value needs to vary significantly to achieve condition C indicating that the motor rotates in stable manner. As such, a large value is added to the reference duty value. If synchronous motor 1 is in condition B, with a large phase difference so that synchronous motor 1 oscillates or steps out, a value to be added is set depending on how significantly the phase difference varies. More specifically, a phase difference with a significantly large variation oftentimes indicates that the motor has just transitioned to condition B and thus oftentimes oscillates or steps out, a value to be added is set to be large. Condition B with a small phase difference oftentimes indicates that the motor less oscillates or steps out and soon transitions to condition C. Accordingly, a value to be added is set to be small. That is, in condition B a value to be added is set depending on the level of phase difference variation.

Since the current variation of phase difference information or the current condition of the synchronous motor may be referred to to vary a reference duty value (or a conduction frequency), the motor can rapidly transitions to condition C, a condition in which the motor rotates in stable manner, to reduce the time required for completely starting the motor. Furthermore, while the oscillation introduced in condition B is not preferable to the motor bearing, devices connected to the synchronous motor and the like, referring to a phase difference variation to set a level of variation, as described above, allows the motor to rapidly pass through condition B oftentimes causing the motor to oscillate or step out. Thus, the motor can be increased in longevity and its peripherals are enhanced in reliability.

Note that if a rotation frequency and a reference duty value are set to have a value allowing synchronous motor 1 to have stable condition C, immediately after it is started it has an unstable conduction position and it thus oscillates. In the FIGS. 41A and 41B process this condition is determined as condition B. Thereafter, however, the conduction position is stabilized and the motor starts to rotate in stable manner. As such, detecting this stable rotation state allows reliably detecting that the motor has been completely started and thus rotates in stable manner.

Figure 43:
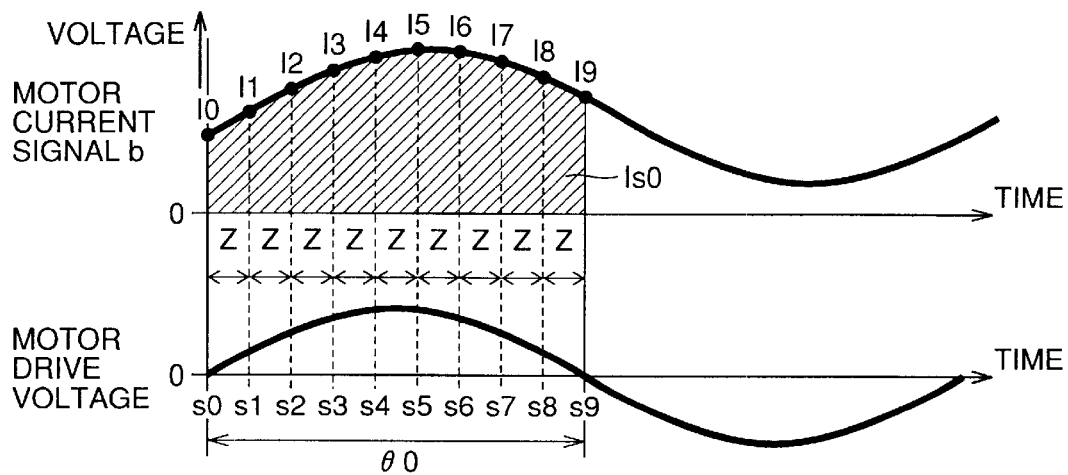
FIG. 43 illustrates one example of detecting phase difference information in a seventh embodiment of the present invention.
Figure 44:
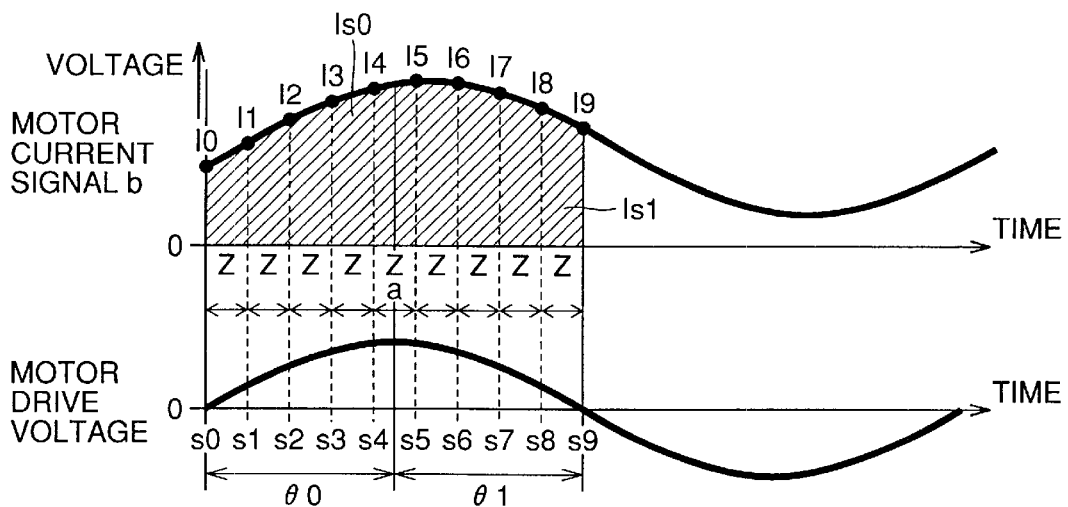
FIG. 44 illustrates one example of detecting phase difference information in the seventh embodiment of the present invention.
Figure 45:
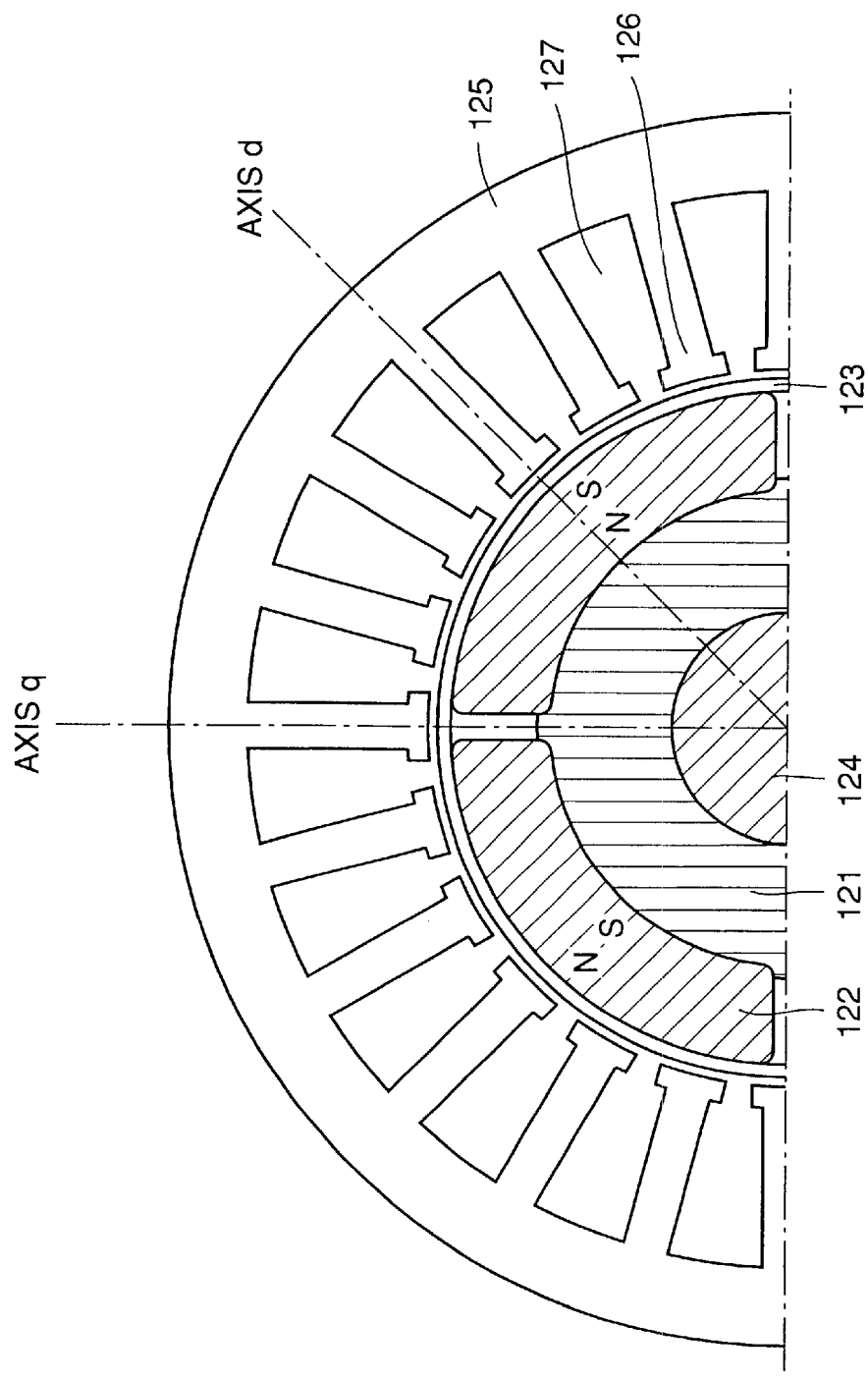
FIG. 45 is a cross section of an SPM motor.

Note that while phase difference information can be obtained for example by zero-cross-edge detecting a motor current signal phase relative to a reference motor drive voltage phase, the FIGS. 43 and 44 detection method allows phase difference information to be detected more accurately. Note that while in effect the motor is driven by a voltage in a PWM waveform and phase difference detection unit 8 receives the information of the phase of the motor drive voltage, with reference to FIGS. 43 and 44 a motor drive voltage will be referred to to provide the following description.

As an exemplary method of phase difference detection, as shown in FIG. 43, levels of motor current signal h are accumulated along a motor drive voltage waveform in a predetermined phase period θ0 (corresponding to 0° to 180° in FIG. 12) to detect and use an area Is0 as phase difference information.

Area Is0 can be obtained, as shown in FIG. 43, simply by performing an A-D sampling operation in phase period θ0 a predetermined number of times (in FIG. 43, corresponding to s0–s9 for a total of ten times) and adding the results together (Is0=Σ(I0:I9) ). The motor drive voltage increases gradually and hence slightly relative to an average of phase differences. As such, area Is0 calculated may be used as phase difference information.

In other words, a variation in area Is0 means an offset of a phase difference. As such, the aforementioned decision as to whether a motor has been completely started may be made by detecting whether area Is0 varies. Since this method is a simple accumulation of sampled motor current signal b levels and it can thus be implemented with a simple circuit configuration or process.

As another exemplary method of phase difference detection, as shown in FIG. 44, an A-D sampling operation is performed along a motor drive voltage waveform at two predetermined phase periods θ0 and θ1 (corresponding to 0°–90° and 90°–180° in FIG. 44) and motor current signal b has areas Is0 and Is1 detected (Is0=Σ(I0:I4), Is1=Σ(I5:I9)). Then the ratio of areas Is0 to Is1 (Is0/Is1) is calculated and thus used as phase difference information.

Using such an area ratio allows phase difference information to be detected accurately and hence with high precision. Then, how the phase difference information varies is determined to determine whether the motor has been completely started and thus rotates in stable manner.

It should be noted that, as shown in FIGS. 43 and 44, setting an interval for taking in motor current signal b can be facilitated by setting a fixed interval z as an interval for sampling the motor current signal b current.

Thus, the present invention provides a motor control device obtaining phase difference information from an area of a motor current signal. Thus it is more resistant to noise, an oscillation of the motor current signal and the like than an edge detection method such as zero-cross detection. Thus, phase difference information can be detected accurately and with high precision. Thus, the motor can be started in further stable manner.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motor control device for controlling a synchronous motor comprising:
   motor current detection means for detecting a motor current flowing through a coil of a synchronous motor;
   detection means for detecting phase difference information between said motor current and a drive voltage supplied to said coil; and
   control means for referring to said phase difference information and thereby detecting a condition of said synchronous motor, and for referring to said condition of said synchronous motor to control said drive voltage applied to a terminal of said coil and a frequency of a conduction to the terminal of said coil, wherein said phase difference information is a ratio between a first area of a waveform of said motor current in a first predetermined phase period of a waveform of said drive voltage and a second area of a waveform of said motor current in a second predetermined phase period of a waveform of said drive voltage.

2. The motor control device of claim 1, wherein:

said first area is an accumulation of values obtained by analog-digital sampling of said motor current at predetermined intervals; and said second area is an accumulation of values obtained by analog-digital sampling of said motor current at predetermined intervals.

3. The motor control device of claim 1, wherein said control means refers to a variation of said phase difference information to detect that said synchronous motor has been completely started and thus rotates in stable manner.

4. The motor control device of claim 1, wherein said control means refers to a variation of said phase difference information to detect that said synchronous motor rotates in unstable manner, and in response to said synchronous motor rotating in unstable manner having been detected said control means refers to a subsequent variation of said phase difference information to detect that said synchronous motor has been completely started and thus rotates in stable manner.

5. The motor control device of claim 3, wherein said control means compares a variation of said phase difference information with a predetermined value to detect whether said synchronous motor has been completely started and thus rotates in a stable manner.

6. The motor control device of claim 1, wherein said control means compares a variation of said phase difference information with a first predetermined value to detect whether said synchronous motor rotates in unstable manner and said control means compares a variation of said phase difference information with a second predetermined value to detect whether said synchronous motor has been completely started and thus rotates in stable manner.

7. The motor control device of claim 1, wherein after starting said synchronous motor is started and until said synchronous motor has been completely started and thus rotates in stable manner, said control means maintains said conduction frequency at a predetermined value and varies a reference duty value of said drive voltage with time.

8. The motor control device of claim 1, wherein after starting said synchronous motor is started and until said synchronous motor has been completely started and thus rotates in stable manner, said control means maintains said drive voltage at a predetermined value and varies said conduction frequency with time.

9. The motor control device of claim 1, wherein after starting said synchronous motor is started and until said synchronous motor has been completely started and thus rotates in stable manner, said control means maintains each of said conduction frequency and said drive voltage at a value corresponding to said synchronous motor having been completely started and thus rotating in stable manner.

10. The motor control device of claim 1, wherein in starting said synchronous motor said control means refers to a variation of said phase difference information to set an amount of variation in a reference duty value of said drive voltage.

11. The motor control device of claim 1, wherein in starting said synchronous motor said control means refers to a condition of said synchronous motor to set an amount of variation in a reference duty value of said drive voltage.

12. The motor control device of claim 1, wherein said control means limits a reference duty value of said drive voltage to a value.

13. The motor control device of claim 1, wherein in starting said synchronous motor said control means refers to a variation of said phase difference information to set an amount of variation in said conduction frequency.

14. The motor control device of claim 1, wherein in starting said synchronous motor said control means refers to a condition of said synchronous motor to set an amount of variation in said conduction frequency.

15. The motor control device of claim 1, wherein after said control means detects that said synchronous motor has been completely started and thus rotates in stable manner, said control means drives said synchronous motor to allow said phase difference information to attain a predetermined value.

16. The motor control device of claim 1, wherein after said control means detects that said synchronous motor has been completely started and thus rotates in stable manner, said control means increases a rotation rate of said synchronous motor to a rotation rate allowing a counter-electromotive force to be detected in said coil and refers to said counter-electromotive force to switch a conduction to drive said synchronous motor.

17. The motor control device of claim 1, wherein at least in starting said synchronous motor said control means drives said synchronous motor with a 180° conduction.

18. A motor control device for driving and controlling a synchronous motor having a motor coil including a plurality of phase windings, comprising:

drive wave data creation means, responsive to the issuance of an instruction to set a rotation rate, for creating drive wave data for each of said plurality of phase windings to drive said synchronous motor;

motor current detection means for detecting a motor current in any specific one of said plurality of phase windings to output a motor current signal;

phase difference detection means for detecting a motor drive voltage phase of said any specific phase winding from the drive wave data created by said drive wave data creation means, and for detecting a phase difference between the motor drive voltage phase of said any specific phase winding and the motor current signal output from said motor current detection means, to output phase difference information;

phase difference control means for calculating a reference duty value for controlling the phase difference information output from said phase difference detection means to attain a target value of phase difference;

duty value calculation means for multiplying the drive wave data of each phase winding output from said drive wave data creation means by the reference duty value output from said phase difference control means, to calculate an output duty value for each phase winding; and inverter means including a plurality of switching elements, for referring to the output duty value calculated by said duty calculation means for each phase winding, to produce a pulse-width modulated signal so as to control a conduction of each switching element to provide a conduction to each motor coil, wherein said phase difference detection means obtains a motor current signal area in each of two phase periods with reference to the motor drive voltage phase of said any particular phase winding, and calculates a ratio between motor current signal areas in said two phase periods and uses said area ratio as phase difference information, and wherein said phase difference detection means samples a motor current signal n times for each of the two phase periods with reference to said motor drive voltage and accumulates each current sample data for outputting as said motor current signal area, wherein n represents an integer no less than one.

19. The motor control device of claim 18, wherein said sampling rate n is set based on a rotation rate.

20. The motor control device of claim 18, wherein the two phase periods with reference to said motor drive voltage phase include a first period selected to be a motor drive voltage phase period of 0° to 90° and a second period selected to be that of 90° to 180°.

21. The motor control device of claim 18, wherein the two phase periods with reference to said motor drive voltage phase include a first period selected to be a motor drive voltage phase period of 180° to 270° and a second period selected to be that of 270° to 360°.

22. The motor control device of claim 18, wherein said phase difference control means performs a proportional and integral control operation on data corresponding to an error between said phase difference information and a target phase difference information.

23. The motor control device of claim 18, wherein said phase difference control means sets a control gain depending on a condition for rotation of said motor or target phase difference information.

24. The motor control device of claim 18, wherein said target value of said phase difference information is set to an optimal value depending on a condition for rotation of said motor.

25. The motor control device of claim 18, wherein after the two phase periods have elapsed with reference to one said motor drive voltage phase, a period of time is provided to calculate a ratio between said motor current signal areas and average phase difference information while a process for phase difference detection is not performed.

26. The motor control device of claim 18, wherein at least said phase difference detection means utilizes a process performed in a main loop of a process routine of a controlling microcomputer.

27. The motor control device of claim 18, wherein said drive wave data corresponds to a sine wave.

28. The motor control device of claim 18, wherein said drive wave data is set so as to provide a current and a magnetic flux of a rotor magnet substantially identical in waveform.

29. The motor control device of claim 18, wherein said phase difference control means sets a control gain depending on an offset value set by said motor current detection means.

30. The motor control device of claim 18, wherein said phase difference control means sets a control gain depending on a value of an amplitude of said motor current signal.

31. The motor control device of claim 18, wherein said motor current detection means sets a degree of amplifying the motor current to allow said motor current signal to have a constant amplitude.

32. The motor control device of claim 18, wherein target phase difference information corresponding to a targeted value of a phase difference obtained in said phase difference control means is set depending on a point at which said phase difference information detected.

33. The motor control device of claim 18, wherein said phase difference detection means calculates phase difference information in a manner similar to that applied in setting said target phase difference information, i.e., depending on a point at which phase difference information is detected.

34. The motor control device of claim 18, wherein in said phase difference control means, the calculation of a reference duty value is canceled at a point at which an amount in variation in phase difference information detected is small relative to a variation of a motor current phase.

35. The motor control device of claim 18, further wherein each of the plurality of phase windings have their motor current signals detected and a point at which phase difference information is detected is referred to in selecting a motor current signal to be referred to.

36. A motor control device for driving and controlling a synchronous motor having a motor coil including a plurality of phase windings, comprising:

drive wave data creation means responsive to the issuance of an instruction to set a rotation rate, for creating drive wave data for each of said plurality of phase windings to drive said synchronous motor;

motor current detection means for detecting a motor current in any specific one of said plurality of phase windings to output a motor current signal;

phase difference detection means for detecting a motor drive voltage phase of said any specific phase winding from the drive wave data created by said drive wave data creation means, and detecting a phase difference between the motor drive voltage phase of said any specific phase winding and the motor current signal output from said motor current detection means, to output phase difference information;

phase difference control means for calculating a reference duty value for controlling the phase difference information output from said phase difference detection means to attain a target value;

duty value calculation means for multiplying the drive wave data of each phase winding output from said drive wave data creation means by the reference duty value output from said phase difference control means, to calculate an output duty value for each phase winding; and inverter means including a plurality of switching elements, referring to the output duty value calculated by said duty calculation means for each phase winding, to produce a pulse-width modulated signal to control a conduction of each switching element so as to provide a conduction to each motor coil, wherein said phase difference detection means obtains a motor current signal area in each of two phase periods with reference to the motor drive voltage phase of said any particular phase winding and calculates a ratio between the motor current signal areas in said two phase periods and uses said area ratio as phase difference information; and wherein, said phase difference detection means samples at equal intervals the motor current signal in a phase period with reference to said motor drive voltage phase, and wherein said phase difference detection means refers to a rotation rate to set a sampling interval.

37. A motor control device for driving and controlling a synchronous motor having a motor coil including a plurality of phase windings, comprising:

drive wave data creation means responsive to the issuance of an instruction to set a rotation rate, for creating drive wave data for each of said plurality of phase windings to drive said synchronous motor;

motor current detection means for detecting a motor current in any specific one of said plurality of phase windings to output a motor current signal;

phase difference detection means for detecting a motor drive voltage phase of said any specific phase winding from the drive wave data created by said drive wave data creation means, and detecting a phase difference between the motor drive voltage phase of said any specific phase winding and the motor current signal output from said motor current detection means, to output phase difference information;

phase difference control means for calculating a reference duty value for controlling the phase difference information output from said phase difference detection means to attain a target value;

duty value calculation means for multiplying the drive wave data of each phase winding output from said drive wave data creation means by the reference duty value output from said phase difference control means, to calculate an output duty value for each phase winding; and inverter means including a plurality of switching elements, referring to the output duty value calculated by said duty calculation means for each phase winding, to produce a pulse-width modulated signal to control a conduction of each switching element so as to provide a conduction to each motor coil, wherein said phase difference detection means obtains a motor current signal area in each of two phase periods with reference to the motor drive voltage phase of said any particular phase winding and calculates a ratio between the motor current signal areas in said two phase periods and uses said area ratio as phase difference information; and wherein, after the two phase periods start with reference to said motor drive voltage phase, a first motor current sampling operation starts at a timing set by correcting an amount of drive wave data exceeding a reference phase of drive wave data of said any particular phase winding.

38. A motor control device for driving and controlling a synchronous motor having a motor coil including a plurality of phase windings, comprising:

drive wave data creation means responsive to the issuance of an instruction to set a rotation rate, for creating drive wave data for each of said plurality of phase windings to drive said synchronous motor;

motor current detection means for detecting a motor current in any specific one of said plurality of phase windings to output a motor current signal;

phase difference detection means for detecting a motor drive voltage phase of said any specific phase winding from the drive wave data created by said drive wave data creation means, and detecting a phase difference between the motor drive voltage phase of said any specific phase winding and the motor current signal output from said motor current detection means, to output phase difference information;

phase difference control means for calculating a reference duty value for controlling the phase difference information output from said phase difference detection means to attain a target value;

duty value calculation means for multiplying the drive wave data of each phase winding output from said drive wave data creation means by the reference duty value output from said phase difference control means, to calculate an output duty value for each phase winding; and inverter means including a plurality of switching elements, referring to the output duty value calculated by said duty calculation means for each phase winding, to produce a pulse-width modulated signal to control a conduction of each switching element so as to provide a conduction to each motor coil, wherein said phase difference detection means obtains a motor current signal area in each of two phase periods with reference to the motor drive voltage phase of said any particular phase winding and calculates a ratio between the motor current signal areas in said two phase periods and uses said area ratio as phase difference information, and wherein, said phase difference information is obtained by averaging m ratios between said motor current signal areas, wherein m represents an integer no less than one.

39. A motor control device for driving and controlling a synchronous motor having a motor coil including a plurality of phase windings, comprising:

drive wave data creation means responsive to the issuance of an instruction to set a rotation rate, for creating drive wave data for each of said plurality of phase windings to drive said synchronous motor;

motor current detection means for detecting a motor current in any specific one of said plurality of phase windings to output a motor current signal;

phase difference detection means for detecting a motor drive voltage phase of said any specific phase winding from the drive wave data created by said drive wave data creation means, and detecting a phase difference between the motor drive voltage phase of said any specific phase winding and the motor current signal output from said motor current detection means, to output phase difference information;

phase difference control means for calculating a reference duty value for controlling the phase difference information output from said phase difference detection means to attain a target value;

duty value calculation means for multiplying the drive wave data of each phase winding output from said drive wave data creation means by the reference duty value output from said phase difference control means, to calculate an output duty value for each phase winding; and inverter means including a plurality of switching elements, referring to the output duty value calculated by said duty calculation means for each phase winding, to produce a pulse-width modulated signal to control a conduction of each switching element so as to provide a conduction to each motor coil, wherein said phase difference detection means obtains a motor current signal area in each of two phase periods with reference to the motor drive voltage phase of said any particular phase winding and calculates a ratio between the motor current signal areas in said two phase periods and uses said area ratio as phase difference information, and wherein, wherein in obtaining said phase difference information, an averaging count m is set depending on a rotation rate.

40. The motor control device of claim 18, wherein said target difference phase information is set so as to have a value maximizing motor efficiency.

41. The motor control device of claim 18, wherein said synchronous motor is a motor having a rotor with a magnet embedded therein, i.e., an IPM motor.

42. A method of controlling a synchronous motor by means of a control device including means for detecting a motor current flowing through a coil of said motor and means for detecting phase difference information from a ratio between a first area of a waveform of said motor current in a first predetermined phase period of a waveform of a drive voltage supplied to said coil, and a second area of said waveform of said motor current in a second predetermined phase period of said waveform of said drive voltage supplied to said coil, such that when said motor starts, said control device supplies said coil with a preselected drive voltage that is constant in conduction frequency, and with time said control device may increase said drive voltage in amplitude at a predetermined rate, and further wherein said control device refers to variations in said phase difference information among sequential drive voltage waveforms to detect over time the manner in which said motor rotates, said method comprising the steps of:

determining that said motor is providing unsteady rotation when the detected phase difference information from a present drive voltage waveform has a significant variation from the detected phase difference information of the previous drive voltage waveform; and after said first step, determining that said motor is providing steady rotation when the detected phase difference information from a present drive voltage waveform no longer has a significant variation from the detected phase difference information of the previous drive voltage waveform.

* * * * *